United States Patent
Berntorp et al.

(10) Patent No.: US 12,078,972 B2
(45) Date of Patent: Sep. 3, 2024

(54) MODEL-BASED CONTROL WITH UNCERTAIN MOTION MODEL

(71) Applicant: Mitsubishi Electric Research Laboratories, Inc., Cambridge, MA (US)

(72) Inventors: Karl Berntorp, Cambridge, MA (US); Marcel Menner, Cambridge, MA (US)

(73) Assignee: Mitsubishi Electric Research Laboratories, Inc., Cambridge, MA (US)

(*) Notice: Subject to any disclaimer, the term of this patent is extended or adjusted under 35 U.S.C. 154(b) by 362 days.

(21) Appl. No.: 17/654,580

(22) Filed: Mar. 12, 2022

(65) Prior Publication Data
US 2023/0288886 A1    Sep. 14, 2023

(51) Int. Cl.
G05B 13/04    (2006.01)
G06N 7/01    (2023.01)

(52) U.S. Cl.
CPC ......... G05B 13/048 (2013.01); G05B 13/042 (2013.01); G06N 7/01 (2023.01)

(58) Field of Classification Search
None
See application file for complete search history.

(56) References Cited

U.S. PATENT DOCUMENTS

| 11,662,731 B2 * | 5/2023 | Nishimura | B25J 9/1666 700/253 |
| 2019/0188592 A1 | 6/2019 | Merl | |
| 2020/0293010 A1 | 9/2020 | Merl | |

OTHER PUBLICATIONS

Y. Liu and P. M. Djurić, "Gaussian Process State-Space Models with Time-Varying Parameters and Inducing Points," 2020 28th European Signal Processing Conference (EUSIPCO), 2021, pp. 1462-1466, doi: 10.23919/Eusipco47968.2020.9287481.

Jidling et al. Int. Conf. Neural Information Process. Syst. In Proceedings, Linearly constrained {G}aussian processes, Dec. 2017}{Long Beach, CA}.

\* cited by examiner

*Primary Examiner* — Ryan A Jarrett
(74) *Attorney, Agent, or Firm* — Gene Vinokur; Hironori Tsukamoto

(57) ABSTRACT

A probabilistic feedback controller for controlling an operation of a robotic system using a probabilistic filter subject to a structural constraint on an operation of the robotic system is configured to execute a probabilistic filter estimates a distribution of a current state of the robotic system given a previous state of the robotic system based on a motion model of the robotic system perturbed by stochastic process noise and a measurement model of the robotic system perturbed by stochastic measurement noise having an uncertainty modeled as a time-varying Gaussian process represented as a weighted combination of time-varying basis functions with weights defined by corresponding Gaussian distributions. The probabilistic filter recursively updates both the distribution of the current state of the robotic system and the Gaussian distributions of the weights of the basis functions selected to satisfy the structural constraint indicated by measurements of the state of a robotic system.

20 Claims, 37 Drawing Sheets

| Structural Constraint |
|---|
| Asymmetric |
| Symmetric |
| Neumann boundary |
| Dirichlet boundary |
| Linear operator |

FIG. 6D

| Structural Constraint | Type of Basis Function | Example of basis function |
|---|---|---|
| Asymmetric | Odd functions | $\phi_{j_1,\ldots,j_{n_X}} = \prod_{n=1}^{n_X} \frac{1}{\sqrt{L_n}} \sin\left(\frac{\pi j_n (x_n + L_n)}{2L_n}\right)$, $j = 2, 4, \ldots$ |
| Symmetric | Even functions | $\phi_{j_1,\ldots,j_{n_X}} = \prod_{n=1}^{n_X} \frac{1}{\sqrt{L_n}} \sin\left(\frac{\pi j_n (x_n + L_n)}{2L_n}\right)$, $j = 1, 3, \ldots$ |
| Neumann boundary | Cosine functions | $\phi_{j_1,\ldots,j_{n_X}} = \prod_{n=1}^{n_X} \frac{1}{\sqrt{L_n}} \cos\left(\frac{\pi j_n (x_n + L_n)}{2L_n}\right)$ |
| Dirichlet boundary | Sine functions | $\phi_{j_1,\ldots,j_{n_X}} = \prod_{n=1}^{n_X} \frac{1}{\sqrt{L_n}} \sin\left(\frac{\pi j_n (x_n + L_n)}{2L_n}\right)$ |
| Linear operator | Combining sine and cosine | $\frac{\partial \phi_j()}{\partial x_2} = \frac{\pi j}{2L_2 \sqrt{L_1}} \sin\left(\frac{\pi j (x_1 + L_1)}{2L_1}\right) \cos\left(\frac{\pi j (x_2 + L_2)}{2L_2}\right)$ |

FIG. 6E

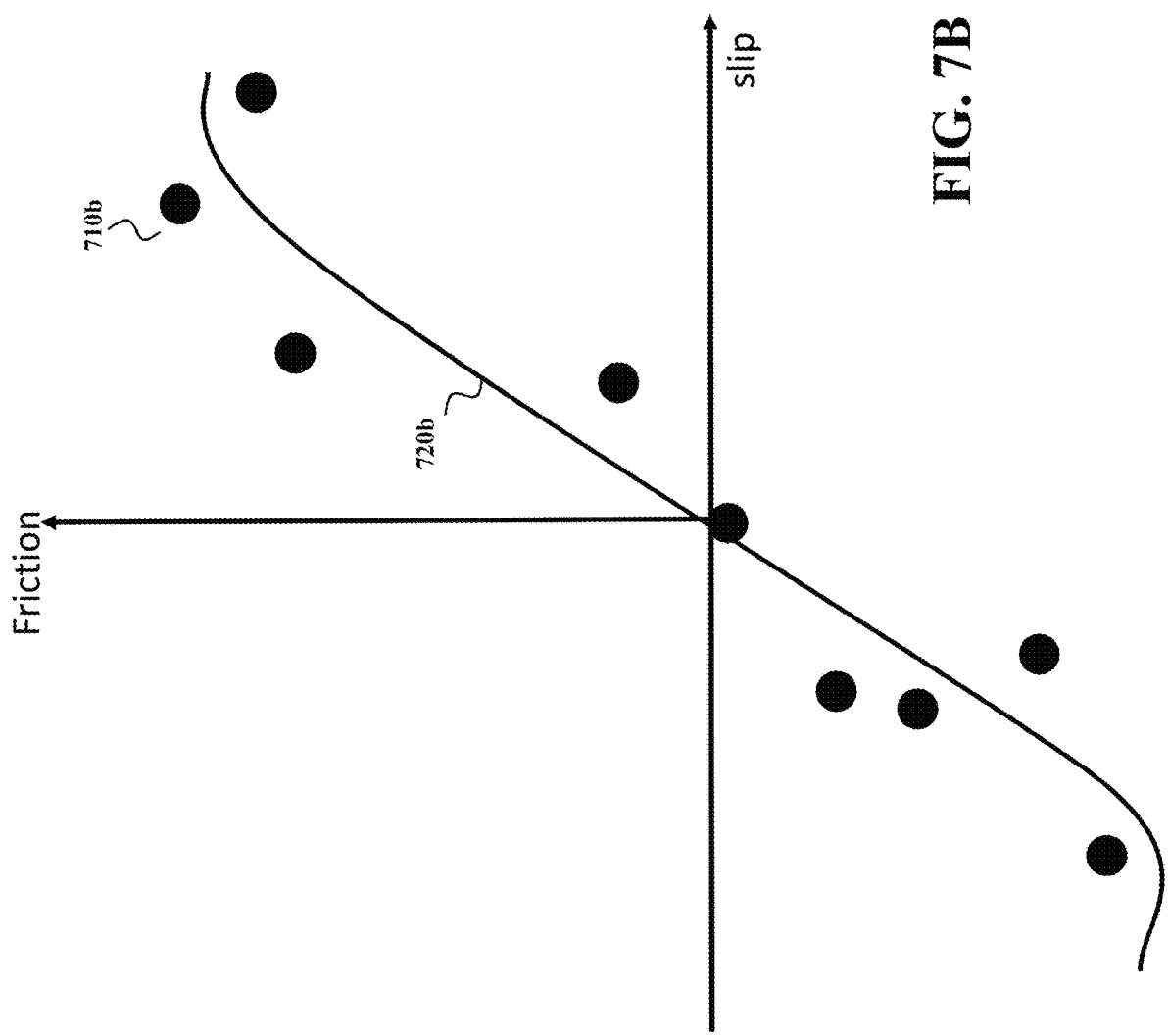

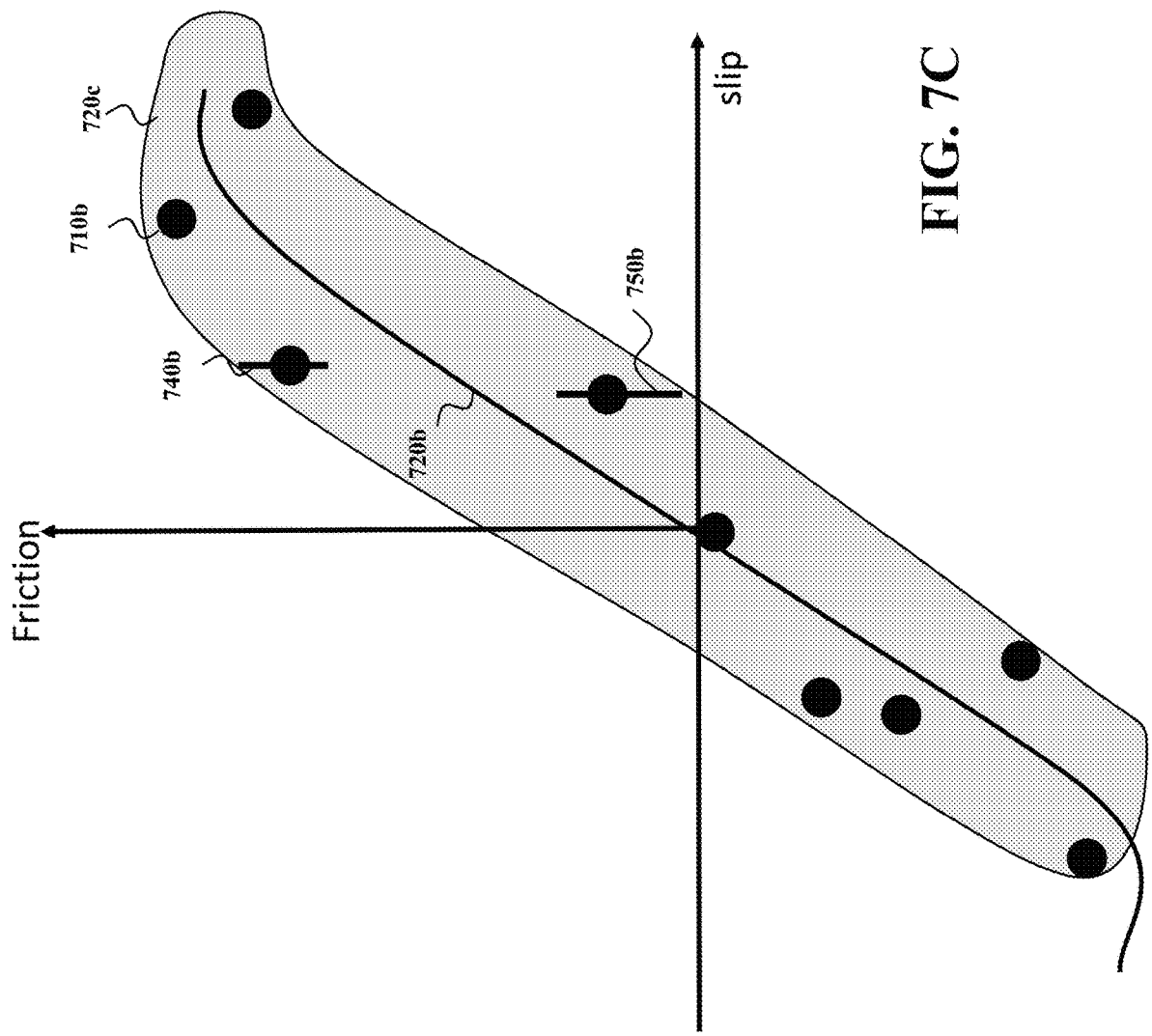

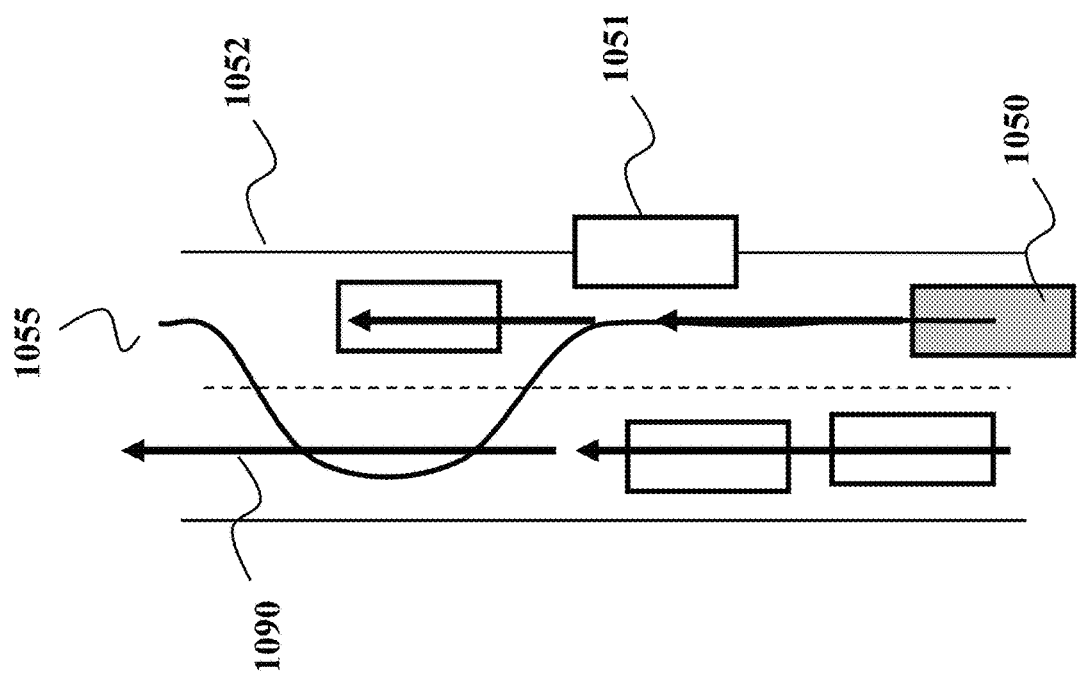

MODEL-BASED CONTROL WITH UNCERTAIN MOTION MODEL

TECHNICAL FIELD

The invention relates generally to model-based control, and more particularly to a probabilistic control for controlling operation of robotic systems using a probabilistic filter subject to constraints.

BACKGROUND

Optimization based control, such as model predictive control (MPC) or state-feedback control, allows a model-based design framework in which the system dynamics and state and input constraints can directly be taken into account. MPC is used in many applications to control dynamical systems of various complexities. Examples of such systems include production lines, car engines, robots, numerically controlled machining, satellites and power generators.

For example, MPC is based on a real time finite horizon optimization of a model of a system. MPC has the ability to anticipate future events, and to take appropriate control actions. This is achieved by optimizing the operation of the system over a future finite time-horizon subject to state and input constraints, and only implementing the control over a current time step.

MPC can predict the change in state variables of the modeled system caused by changes in control variables. The state variables define a state of the system, i.e., a state of a controlled system is a smallest set of state variables in state-space representation of the control system that can represent the entire state of the system at any given time. For example, if a controlled system is a robotic system, such as an autonomous vehicle, the state variables may include position, velocity and heading of the vehicle. Control variables are inputs to the system designed to change a state of the machine. For example, in a chemical process, the control variables are often pressure, flow, temperature, opening of the valves, and stiffness of dampers. State variables in these processes are other measurements that represent either control objectives or process constraints.

The MPC uses models of the system, the current system measurements, current dynamic state of the process, and state and control constraints to calculate future changes in the state variables. These changes are calculated to hold the state variables close to target subject to constraints on both control and state variables. The MPC typically sends out only the first change in each control variable to be implemented, and repeats the calculation when the next change is required.

The performance of a model-based control inevitably depends on the quality of the prediction model used in the optimal control computation. The prediction models describe the dynamics of the system, i.e., evaluation of the system in time. For example, the prediction model is a nonlinear function describing the dynamics of the system to connect previous and current states of the controlled system based on a control input to the system.

However, in many applications the motion model of the controlled system is partially unknown or uncertain, and in addition, the part of the controlled system that is unknown is often subject to structural constraints. In such cases the application of the control on the uncertain model can lead to suboptimal performances or even to instability of the controlled system. For example, in some situations, some parameters of the motion model are not measured precisely. Thus, the controller may need to estimate unknown parameters of the model of the machine. The conventional approaches to handle such problems include adaptive or learning-based MPC, where an MPC control problem is augmented with a closed-loop identification scheme in order to learn the unknown machine parameters. By learning the unknown parameters, the operation of the machine achieved by the controller is improved. See, e.g., U.S. 2011/0022193.

However, additionally or alternatively to the uncertainty of parameters of the motion model, in some situations, the dynamics of the system are changing, i.e., the functional relationship between the consecutive states of the controlled system. In those situations, adaptive or learning-based method for estimating parameters of the models can be insufficient.

In addition, because the dynamics of the system are changing, the learning that accompanies the controller should be done recursively, i.e., in real time. However, when the controlled system is subject to structural constraint and such constraint is not incorporated into the learning process, either the learning becomes inefficient, or it learns a system that is not physical and can therefore not be used for subsequent control Accordingly, there is a need for a model-based controller that can learn the motion model of dynamics of the control system in real time by incorporating the structural constraint into the learning process.

SUMMARY

It is an object of some embodiments to provide probabilistic control of a robotic system using a motion model describing the dynamics of the system. Additionally or alternatively, it is another object of some embodiments to provide a model-based control of the system using a motion model having an uncertainty. Additionally or alternatively, it is another object of some embodiments to provide a model-based control of the system using a motion model having uncertainty in the dynamics of the system, wherein the operation of the robotic system is subject to a structural constraint. Additionally or alternatively, it is another object of some embodiments to estimate a motion model of the controlled robotic system when the parameters and/or dynamics of the motion of the system are unknown and/or partially known, and when incorporating the structural constraint into the estimation of the motion model.

Typically, a robotic system can be modeled with at least two models (equations). The first model is a motion model of the robotic system relating a state of the system to a previous state of the system and an input to the system. The motion model captures the dynamics of the system. The motion model typically includes noise or disturbance representing the uncertainty of the motion model and/or models external disturbances. This uncertainty is referred to herein as process noise. The second model is a measurement model relating available measurements of the system to the state of the system. The measurement model also includes measurement noise and/or other uncertainties referred to herein as measurement noise. Herein, these uncertainties are referred to as model uncertainties.

In addition, the state of the system is also subject to uncertainty, referred to herein as a state uncertainty. Notably, the process noise and the measurement noise in combination with the model uncertainty cause the state uncertainty. However, while the state and model uncertainties are tightly connected, they are different from the process and measurement noises. Specifically, the state uncertainty is internal to the values of the state and the model of the system, while the process and measurement noises are external disturbances on the state.

When the process noise, measurement noise, and models are known, i.e., the shape and parameters of the distribution of the process noise and the measurement noise and the nonlinear function describing the models are known, various techniques allow to estimate both the state of the system and the state uncertainty, for instance, using a Kalman filter or a particle filter. Both the state of the system and the state uncertainty are important for a number of control applications. For example, the state of the system can be used to determine a control input to the system to accomplish a control objective, while the state uncertainty can be used to adjust the control input to ensure the feasibility of the control.

For example, when the distributions of the process noise and the measurement noise are known and the motion model and measurement model are known, the particle filter can be used to represent the state of the system and the state uncertainty with a set of particles, wherein the state of the system is a weighted combination of the particles, wherein the weights are determined according to the particles' fit with the measurement model.

However, in several applications, the motion model is not entirely known prior to runtime, e.g., for a vehicle driving on a road the surface cannot be sensed unless the vehicle is moving, and any controller is based on a motion model, which in the startup phase is uncertain, or even completely unknown. Additionally or alternatively, the dynamics of the system may be unknown, partially known, or changing over time.

Hence, for some applications, there is a need not only to estimate a distribution of the current state of the system but also to estimate a motion model of the system. To that end, some embodiments estimate the state and the motion model of the system given a previous state, a measurement model, and process and measurement noise perturbing the motion and measurement model, respectively.

The task of estimating the motion model of the system can be seen as a task of reducing the uncertainty of the motion model. The motion model relates parameters of the robotic system representing structural and operational configurations of the robotic system with variables representing inputs and outputs of the operation of the robotic system having the parameters. Hence, reducing the uncertainty of the motion model is to learn the parameters of the motion model with certainty. For example, learning a parameter may be a task to learn the actual mass of a load carried by a robotic arm. While this task is challenging by itself, to complicate this matter further, the parameters of the motion models can be functions varying over time. For example, the friction of a vehicle with the road varies over time based on a number of different factors, such as the velocity and acceleration of the vehicle and/or the type of surface of the road. To that end, it is an object of some embodiments to learn a function of a parameter affecting the operation of the robotic system.

Some embodiments are based on the understanding that the uncertainty of a parameter of the motion model or the uncertainty of a function of a parameter affecting the operation of the robotic system can be represented as a time-varying Gaussian process. Some embodiments are based on a recognition that due to the time-varying nature of the function of the parameter, to update the motion model there is a need to update the Gaussian process, which is a computationally challenging problem. However, some embodiments are based on the understanding that a Gaussian process can be modeled as a set of weighted basis functions, wherein the weights are distributed according to a Gaussian distribution. Doing in such a manner considerably simplifies the learning problem since the problem of learning the model is reduced to learning the weights of the respective basis function. In other words, to update the Gaussian process some embodiments can just update these Gaussian distributions of weights, and to determine a motion model some embodiments can just determine N scalar weights from Gaussian distribution.

In effect, regarding the motion model as a weighted combination of basis functions significantly decreases the computational requirements for estimating the tire friction in a probabilistic manner. For example, in some embodiments, the Gaussian process is represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions.

However, while representing the Gaussian process using the basis functions simplifies the computation, this representation creates an additional problem. Specifically, in a number of situations, the function of the parameter has a structure reflecting the nature of the parameter and/or robotic system. For example, the function of the parameter can be symmetric indicating symmetry of the effect of variation of the parameter on the performance of the system. The structure of the function of the parameter can be asymmetric, like in the tire friction example, which may affect Lyapunov stability of the operation of the robotic system, etc. To that end, the update of the Gaussian process of the uncertainty of the function of a parameter needs to be performed subject to a constraint on the shape of the function. Such a constraint is referred to herein as a structural constraint.

The type of structural constraint is evident from the measurements of the states of the robotic system. Specifically, a sequence of measurements of a state of a robotic system at different instances of time is indicative of a structural constraint on a shape of a function of a parameter affecting the operation of the robotic system. This dependency is probabilistic but exists and varies among different kinds of robotic systems.

To that end, it is an object of some embodiments to update the Gaussian process indicative of the uncertainty of the function of a parameter subject to a structural constraint on a shape of a function of a parameter affecting the operation of the robotic system. Additionally or alternatively, it is an object of some embodiments to perform the tracking of the state of the system using these dual updates, i.e., update the state of the robotic system using the motion and the measurement models of the robotic system and update the time-varying Gaussian process of a potentially time-varying parameter of the motion model.

Unfortunately, the constrained update of the Gaussian process subject to the structural constraint is computationally challenging to the degree that for some applications such a constrained update is impractical.

Some embodiments are based on a realization that when a Gaussian process is represented by the weighted combination of the basis functions, the structural constraint can be imposed on the selection of the shapes of the basic function. That is, if the basis function is selected in a predefined manner based on a structural constraint, any weighted combination of these basis functions would also satisfy the structural constraint. As a simple example, if the structural constraint on the shape of the function of a parameter is that the shape is asymmetric, the basis function needs to be odd. Conversely, if the shape is symmetric, the basis function needs to be selected even. In such a manner, the constrained update is replaced with a selection of basis functions based on structural constraint indicated by the sequence of measurements of the state of a robotic system followed by the unconstrained update of the Gaussian process represented by these selected basis functions, which is computationally much more efficient than the constrained update.

Accordingly, one embodiment discloses a probabilistic feedback controller for controlling an operation of a robotic system using a probabilistic filter subject to a structural constraint on an operation of the robotic system, including: at least one processor; and a memory having instructions stored thereon that, when executed by the at least one processor, cause the controller to: collect digital representations of a sequence of measurements of a state of a robotic system at different instances of time indicative of a structural constraint on a shape of a function of a parameter affecting the operation of the robotic system; execute a probabilistic filter configured to recursively estimate a distribution of a current state of the robotic system given a previous state of the robotic system based on a motion model of the robotic system perturbed by stochastic process noise and a measurement model of the robotic system perturbed by stochastic measurement noise, wherein one or a combination of the motion model, the process noise, the measurement model, and the measurement noise includes the parameter having an uncertainty modeled as a time-varying Gaussian process represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions, wherein the probabilistic filter recursively updates both the distribution of the current state of the robotic system and the Gaussian distributions of the weights of the basis functions, and wherein each of the basis function is selected to satisfy the structural constraint indicated by the sequence of measurements of the state of a robotic system; and execute a control action determined based on an estimate of the distribution of the current state of the robotic system to change the current state of the robotic system according to a control objective.

Another embodiment discloses a method for controlling an operation of a robotic system using a probabilistic filter subject to a structural constraint on an operation of the robotic system, wherein the method uses a processor coupled with stored instructions implementing the method, wherein the instructions, when executed by the processor carry out steps of the method, including collecting digital representations of a sequence of measurements of a state of a robotic system at different instances of time indicative of a structural constraint on a shape of a function of a parameter affecting the operation of the robotic system; executing a probabilistic filter configured to recursively estimate a distribution of a current state of the robotic system given a previous state of the robotic system based on a motion model of the robotic system perturbed by stochastic process noise and a measurement model of the robotic system perturbed by stochastic measurement noise, wherein one or a combination of the motion model, the process noise, the measurement model, and the measurement noise includes the parameter having an uncertainty modeled as a time-varying Gaussian process represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions, wherein the probabilistic filter recursively updates both the distribution of the current state of the robotic system and the Gaussian distributions of the weights of the basis functions, and wherein each of the basis function is selected to satisfy the structural constraint indicated by the sequence of measurements of the state of a robotic system; and executing a control action determined based on an estimate of the distribution of the current state of the robotic system to change the current state of the robotic system according to a control objective.

Yet another embodiment discloses a non-transitory computer readable storage medium embodied thereon a program executable by a processor for performing a method, the method including collecting digital representations of a sequence of measurements of a state of a robotic system at different instances of time indicative of a structural constraint on a shape of a function of a parameter affecting the operation of the robotic system; executing a probabilistic filter configured to recursively estimate a distribution of a current state of the robotic system given a previous state of the robotic system based on a motion model of the robotic system perturbed by stochastic process noise and a measurement model of the robotic system perturbed by stochastic measurement noise, wherein one or a combination of the motion model, the process noise, the measurement model, and the measurement noise includes the parameter having an uncertainty modeled as a time-varying Gaussian process represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions, wherein the probabilistic filter recursively updates both the distribution of the current state of the robotic system and the Gaussian distributions of the weights of the basis functions, and wherein each of the basis function is selected to satisfy the structural constraint indicated by the sequence of measurements of the state of a robotic system; and executing a control action determined based on an estimate of the distribution of the current state of the robotic system to change the current state of the robotic system according to a control objective.

BRIEF DESCRIPTION OF THE DRAWINGS

FIG. 6D shows a table illustrating some of the most common structural constraints used in some embodiments.

FIG. 6E shows the table with a set of basis functions satisfying those constraints and an example of basis functions according to some embodiments.

FIG. 7B illustrates the fitting of the shape to the measurements according to some embodiments.

FIG. 7C illustrates the fitting of the shape to the measurements according to one embodiment.

FIG. 9B shows a block diagram of an SNMPC controller that solves a constrained optimal control structured nonlinear program (OCP-NLP) according to another embodiment.

FIG. 10E and FIG. 11 show an example of vehicles driving on a road network according to some embodiments.

DETAILED DESCRIPTION

Figure 1A:
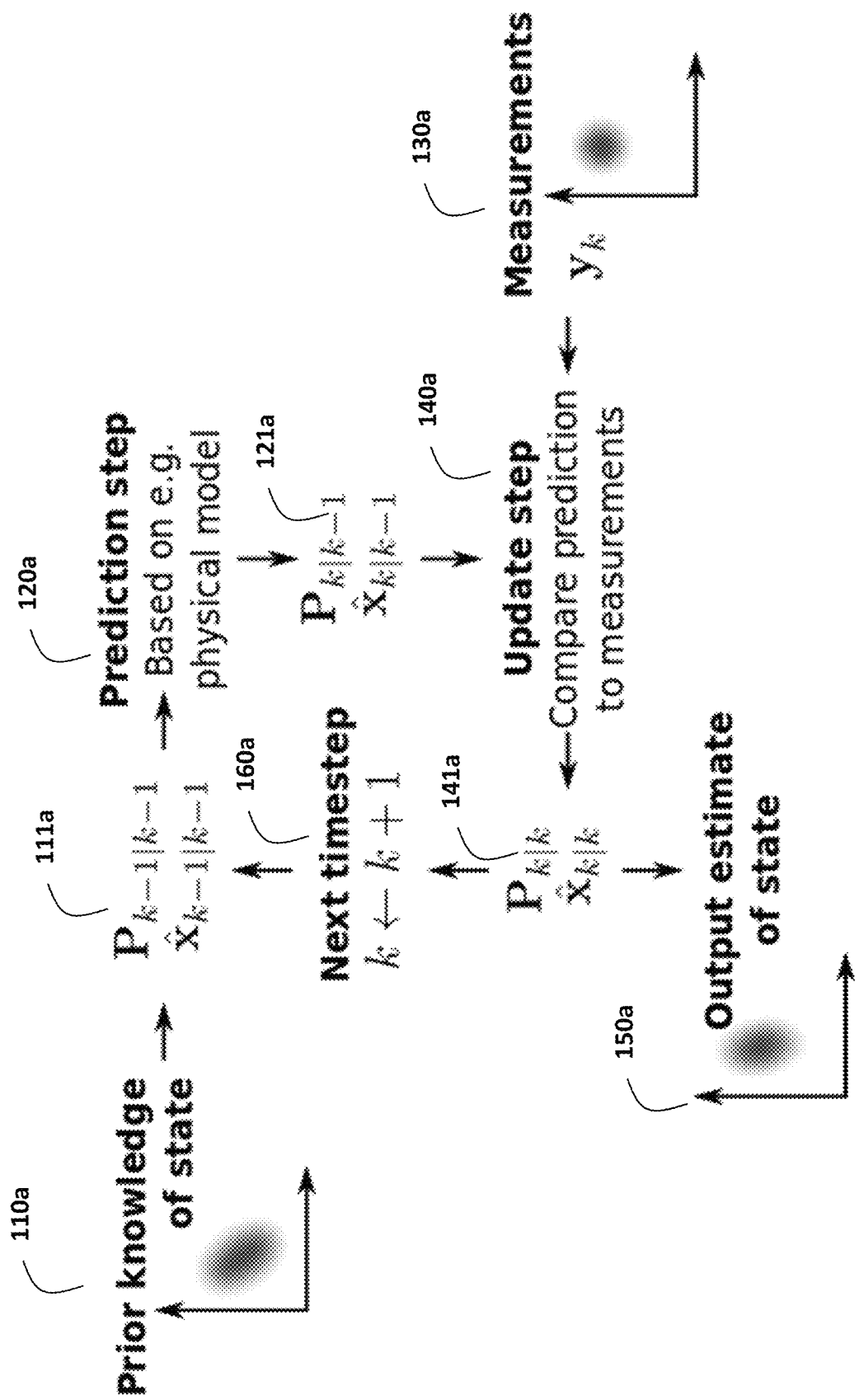
FIG. 1A shows a schematic of the operation of a Kalman filter (KF) according to some embodiments.

It is an object of some embodiments to provide probabilistic control of a robotic system using a motion model describing the dynamics of the system. Additionally or alternatively, it is another object of some embodiments to provide a model-based control of the robotic system using a motion model having an uncertainty. Additionally or alternatively, it is another object of some embodiments to provide a model-based control of the system using a motion model having uncertainty in the dynamics of the system, wherein the operation of the robotic system is subject to a structural constraint. Additionally or alternatively, it is another object of some embodiments to estimate a motion model of the controlled robotic system when the parameters and/or dynamics of the motion of the system are unknown and/or partially known, and when incorporating the structural constraint into the estimation of the motion model.

As used herein, a robotic system can mean any mechanical system that can operate autonomously, e.g., a road vehicle, a stationary robotic manipulator, a mobile robot, a drone, a set of previously said entities, or a combination of previously said entities.

An operation of a robotic system can be modeled with at least two models, each represented by a set of equations. The first model is a motion model of the robotic system relating a state of the system to a previous state of the system and an input to the system. The motion model captures the dynamics of the system. The motion model typically includes noise or disturbance representing the uncertainty of the motion model and/or models external disturbances. This uncertainty is referred to herein as process noise. The second model is a measurement model relating available measurements of the system to the state of the system. The measurement model also includes measurement noise and/or other uncertainties referred to herein as measurement noise. Herein, these uncertainties are referred to as model uncertainties.

An example of the motion model is $x_{k+1}=f(x_k,u_k)+w_k$, wherein $w_k$ is the process noise and $f(x_k,u_k)$ is the nonlinear function describing the relation between the current state and control input with the next state. Also, an example of the measurement model is $y_k=h(x_k,u_k)+e_k$, wherein $e_k$ is the measurement noise and $h(x_k,u_k)$ is the nonlinear function describing the relation between the current state and control input with the current measurement.

An example how to describe the uncertainty of the motion model and measurement model is to model the function of a parameter as samples from a Gaussian process prior $f(x_k) \sim \mathcal{GP}(0,\kappa_\theta(x_k,x_k'))$ for a suitable covariance function $\kappa_\theta(x,x')$ subject to hyperparameters $\theta$. Herein, these uncertainties are referred to as model uncertainties. In addition, the state of the system is also subject to uncertainty, referred herein as a state uncertainty. Notably, the process noise and the measurement noise in combination with the model uncertainty cause the state uncertainty. However, while the state and model uncertainty are tightly connected, they are different from the process and measurement noises. Specifically, the state uncertainty is internal to the values of the state and the model while the process and measurement noises are external disturbance on the state.

When the process noise, measurement noise, and models are known, i.e., the shape and parameters of the distribution of the process noise and the measurement noise and the nonlinear function describing the models are known, various techniques allow to estimate both the state of the system and the state uncertainty, for instance, using a Kalman filter or a particle filter. Both the state of the system and the state uncertainty are important for a number of control applications. For example, the state of the system can be used to determine a control input to the system to accomplish a control objective, while the state uncertainty can be used to adjust the control input to ensure the feasibility of the control.

For example, when the distributions of the process noise and the measurement noise are known and the motion model and measurement model are known, the particle filter can be used to represent the state of the system and the state uncertainty with a set of particles, wherein the state of the system is a weighted combination of the particles, wherein the weights are determined according to the particles' fit with the measurement model.

However, in several applications, the motion model is not known prior to runtime, e.g., for a vehicle driving on a road the surface cannot be sensed unless the vehicle is moving, and any controller is based on a motion model, which in the startup phase is uncertain, because the road surface affecting the tire friction is not entirely known. Additionally or alternatively, the dynamics of the system may be unknown, partially known, or changing over time.

Hence, for some applications, there is a need not only to estimate a distribution of a current state of the system but also to estimate a function of a parameter included in the motion model of the system. To that end, some embodiments estimate the state and the function of a parameter included in the motion model of the system given a previous state, a measurement model, and process and measurement noise perturbing the motion and measurement model, respectively.

Some embodiments are based on the understanding that a function of a parameter affecting the operation of the robotic system can be represented as a time-varying Gaussian process. Some embodiments are based on a recognition that to update the motion model there is a need to update the Gaussian process, which is a computationally challenging problem. This is because the update of the Gaussian process using a set of measurements indicative of the robotic system, with or without structural constraint, grows unfavorably with the length of the sequence of measurements, such that it becomes computationally intractable to perform a recursive update of the Gaussian process for real-world systems, such as robotic systems. Some embodiments are based on the realization that to efficiently update the Gaussian process, the structural constraint on a shape of a function of the parameter should be incorporated into the Gaussian process expression.

To this end, other embodiments are based on the understanding that a Gaussian process can be modeled as a set of weighted basis functions, wherein the weights are distributed according to a Gaussian distribution. Doing in such a manner considerably simplifies the learning problem since the problem of learning the model is reduced to learning the weights of the respective basis function. In other words, to update the Gaussian process some embodiments can just update these Gaussian distributions of weights, and to determine a motion model some embodiments can just determine N scalar weights from Gaussian distribution. In effect, regarding the motion model as a weighted combination of basis functions significantly decreases the computational requirements for estimating the unknown function of the parameter in a probabilistic manner.

Other embodiments are based on the understanding that when there are structural constraints on the operation of a robotic system, if not taken into account during the learning process, the learning problem will be computationally intractable even when said Gaussian process is represented as a set of weighted basis functions, wherein the weights are distributed according to a Gaussian distribution. Furthermore, the learned function of the parameter may not satisfy the underlying structural constraint.

To this end, one embodiment determines the basis functions used in the basis function representation based on guaranteed satisfaction of the structural constraint, such that the learned shape of a function of a parameter affecting the operation of the robotic system satisfies the structural constraint.

In some embodiments, a probabilistic filter recursively updates both the distribution of the current state of the robotic system and the Gaussian distributions of the weights of the basis functions, i.e., the distribution of the weight, and wherein each of the basis functions is selected to satisfy the structural constraint indicated by the sequence of measurements of the state of a robotic system. Such probabilistic filter can e.g. be implemented by means of Kalman filtering, particle filtering, or other nonlinear filtering methods, wherein the probabilistic filter performs a dual update of the state and of the Gaussian distribution of the weights of the basis functions.

FIG. 1A shows a schematic of the operation of a Kalman filter (KF) according to some embodiments. The KF is a particular instance of a probabilistic filter. The KF is a tool for state estimation in linear state-space models, and it is the optimal estimator when the noise sources are known and Gaussian, in which case also the state estimate is Gaussian distributed. The KF estimates the mean and variance of the Gaussian distribution, because the mean and the variance are the two required quantities, sufficient statistics, to describe the Gaussian distribution.

The KF starts with an initial knowledge 110a of the state, to determine a mean of the state and its variance 111a. The KF then predicts 120*a* the state and the variance to the next time step, using a model of the system, to obtain an updated mean and variance 121*a* of the state. The KF then uses a measurement 130*a* in an update step 140*a* using the measurement model of the system, to determine an updated mean and variance 141*a* of the state. An output 150*a* is then obtained, and the procedure is repeated for the next time step 160*a*.

Some embodiments employ a probabilistic filter including various variants of KFs, e.g., extended KFs (EKFs), linear-regression KFs (LRKFs), such as the unscented KF (UKF), and also particle filters. Even though there are multiple variants of the KF, they conceptually function as exemplified by FIG. 1E. Importantly, the KF updates the first and second moment, i.e., the mean and covariance, of the probabilistic distribution of interest, using a measurement 130*a* described by a probabilistic measurement model.

Figure 1B:
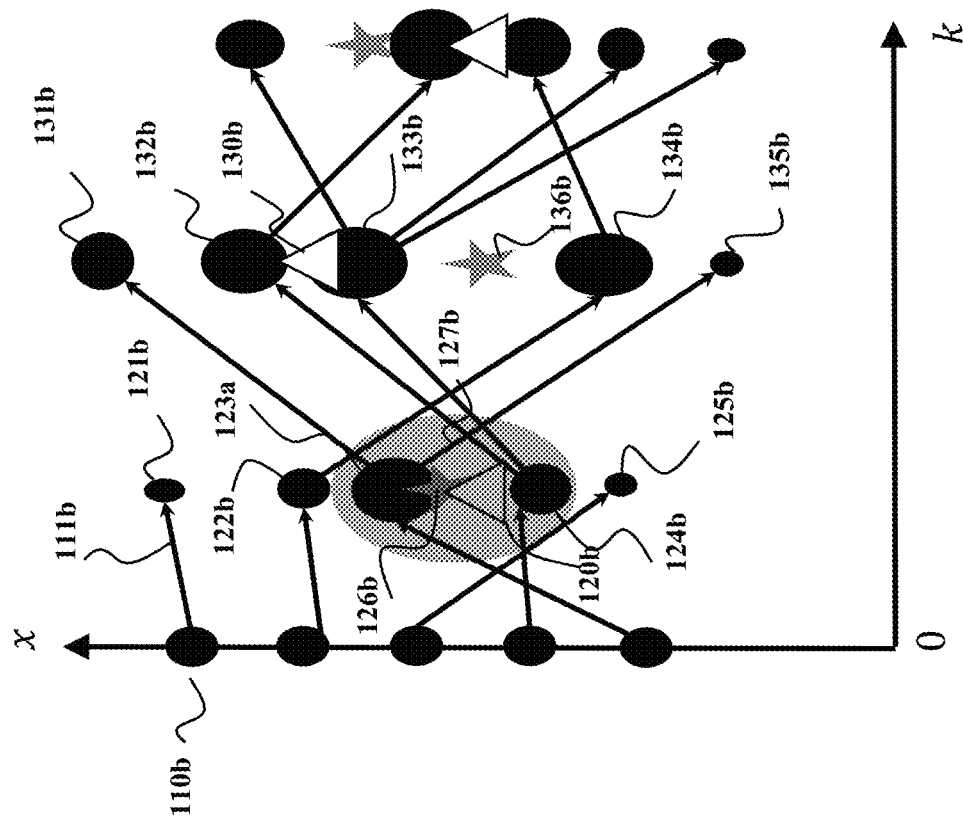
FIG. 1B shows a schematic of the particle filter (PF) used by some embodiments.

FIG. 1B shows a schematic of the particle filter (PF) used by some embodiments. The PF is a tool for state estimation in nonlinear state-space models with stochastic, possibly non-Gaussian, process and measurement noise. The PF recursively estimates the distribution of the state using the measurements at each time step, by propagating particles forward in time, wherein a particle includes a state hypothesis and a weight determining the consistence of the state with the measurement using a measurement model. FIG. 1B shows simplified schematic of the result of three iterations of generating a state trajectory when five particles are generated for each iteration. The initial state 110*b* is predicted forward in time 111*b* using the model of the motion and the inputs to the system, to produce five next states 121*b*, 122*b*, 123*b*, 124*b*, and 125*b*. The probabilities are determined as a function of the measurement 126*b* and the model of the noise source. At each time step, i.e., at each iteration, an aggregate of the probabilities is used to produce an aggregated state 120*b*.

Some embodiments are based on the understanding that probabilistic filters, such as KFs, PFs, and variations thereof, typically operate under the assumption of a known motion model and a known measurement model. The motion model is used for predicting the previous state to a current state based on a control input, and the measurement model is used to update the state by comparing the predicted state with the measurement by inserting the predicted state into the measurement model, determining the difference, and updating to minimize the difference. However, when either of the motion model and the measurement model have an uncertainty different from the process and/or measurement noise, the single update as illustrated in FIGS. 1A and 1B is not applicable.

One embodiment enables the application of KF and PF type methods by incorporating a dual update embedded into the probabilistic filter, i.e., an update of the state and an update of the function of the parameter having an uncertainty affecting the model.

Figure 2:
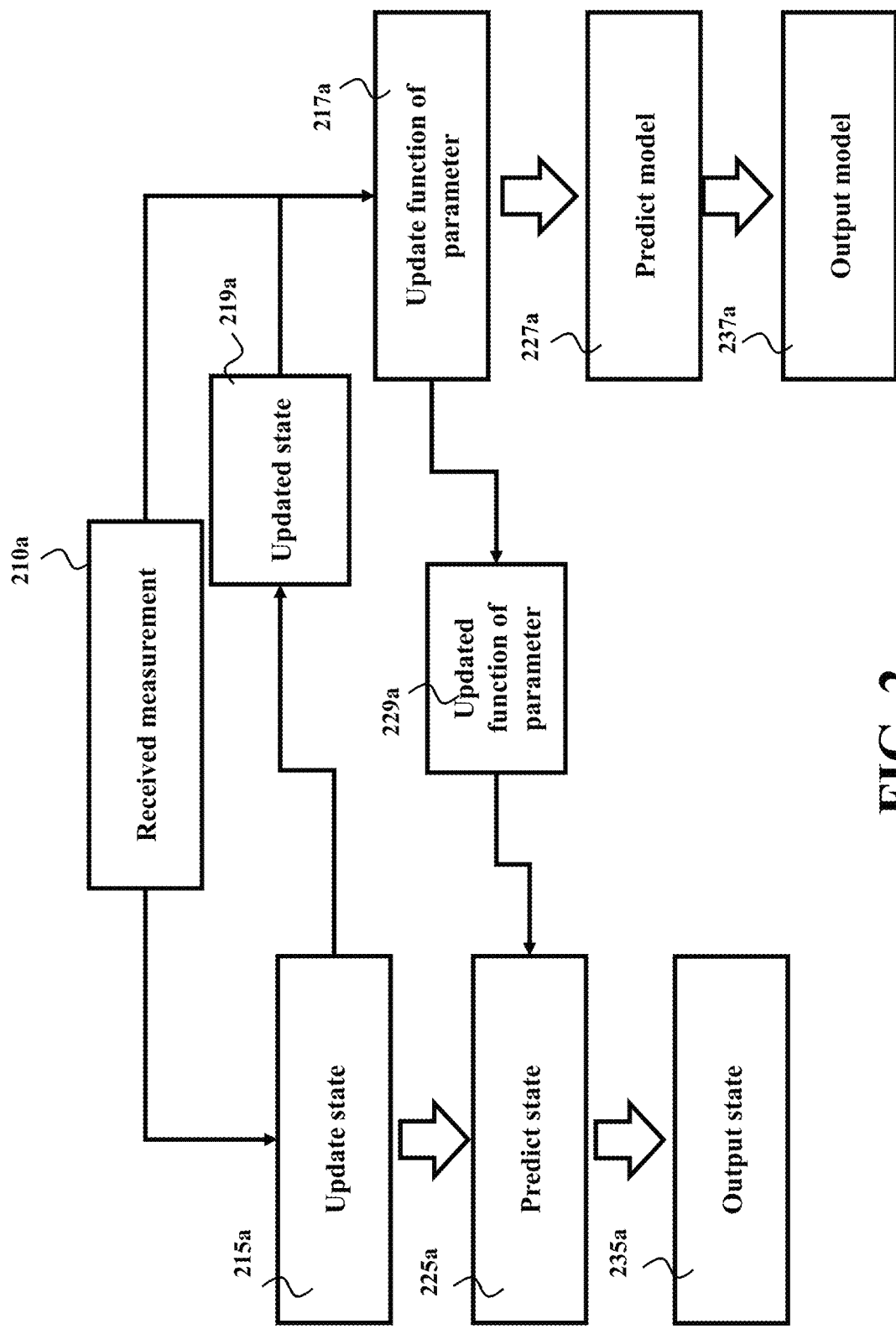
FIG. 2 shows an illustration of the principle of the dual update according to some embodiments.

FIG. 2 shows an illustration of the principle of the dual update according to some embodiments. First, the received 210*a* measurement is used to update 215*a* to the current state. Next, the updated state 219*a*, together with the received measurement 210*a*, is used to update 217*a* the function of the parameter of the robotic system. Then, the updated 229*a* function of the parameter is used when predicting 225*a* the state using a previous state and control input. Next, the function of the parameter is predicted 227*a*, and at least one of the state 235*a* and function of the parameter 237*a* is outputted from the probabilistic filter. In some embodiments, the whole model is unknown and is therefore the function of the parameter that is updated 217*a*. In other embodiments, at least one function of a parameter of the model is updated 217*a*.

Figure 3A:
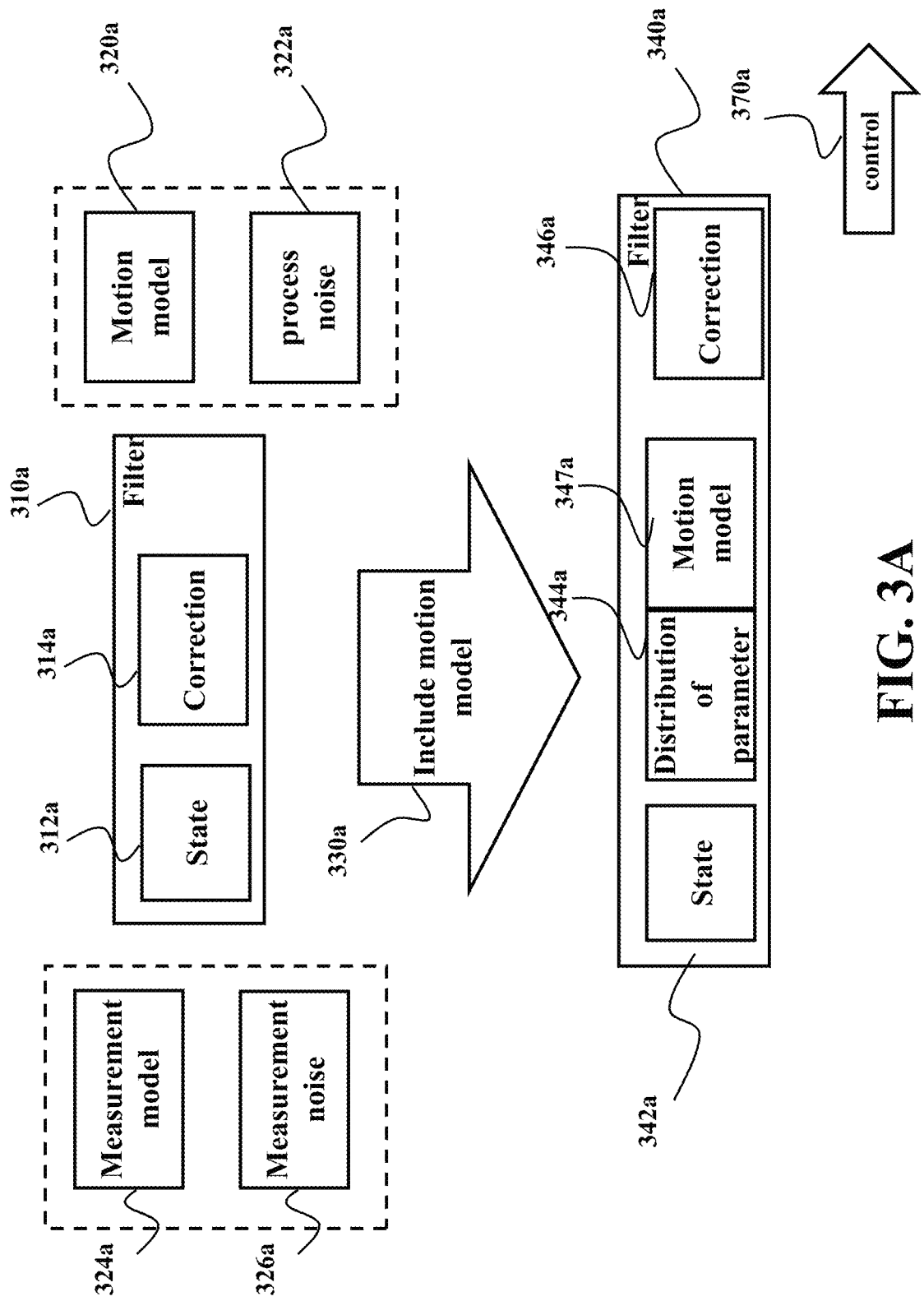
FIG. 3A shows a schematic of a probabilistic filter that recursively performs a dual update according to some embodiments.

FIG. 3A shows a schematic of a probabilistic filter that recursively performs a dual update according to some embodiments. Some embodiments are based on a recognition that probabilistic filters, such as KFs and PFs, can estimate the distribution of the state by including in the filter 310*a* a state 312*a* and a corrective term 314*a* for determining the fitting of the state 312*a* to the measurement using the measurement model 324*a* subject to measurement noise 326*a* and correcting for it. However, inclusion of the state in a filter can update the state only, not the uncertainty that is part of the motion model 320*a*, because in such an arrangement, the motion model 320*a* is outside of the estimator 310*a*, i.e., external to the estimation formulation, such that the prediction step is driven by a deterministic, known, motion model 320*a* and the stochastic uncertainty comes from the process noise 322*a*. In such a manner, the external to the filter motion model 320*a* remains unchanged.

Some embodiments are based on the understanding that a probabilistic filter can also include 330*a* a motion model of the robotic system having a parameter affecting the robotic system model that is uncertain, or unknown. In such a manner, the motion model becomes internal to the filter, i.e., the filter has its own belief of a motion model and the uncertainties included in it. For example, a filter 340*a* can include a motion model 347*a* having a distribution of a function of an unknown parameter 344*a*, effectively meaning the motion model having a probability distribution. In effect, because the a part of the motion model in the filter is uncertain, the modified probabilistic filter can update not only the state of the system but also the function of the parameter affecting the motion model of the system.

Some embodiments are based on a realization that in order to include a motion model into the filter, the filter should include a state 342*a*, a parameter 344*a* included in the motion model 347*a*, a measure of the uncertainty of parameter affecting the motion model, and a correction 346*a* that determines the joint fit of the state and motion model with respect to the measurement model 324*a*. Doing in such a manner ensures that the correcting in the filter 340*a* reflects the quality of the estimated parameter, and thereby in effect the motion model.

Some embodiments are based on realization that an uncertainty of a function of a parameter affecting the motion model can be modeled as a Gaussian process over possible functions of the parameter. The motion model is a function, often nonlinear, describing the evolution of the states in time. Each sample on the Gaussian process over functions of parameters is a sampled function of the parameter.

Figure 3B:
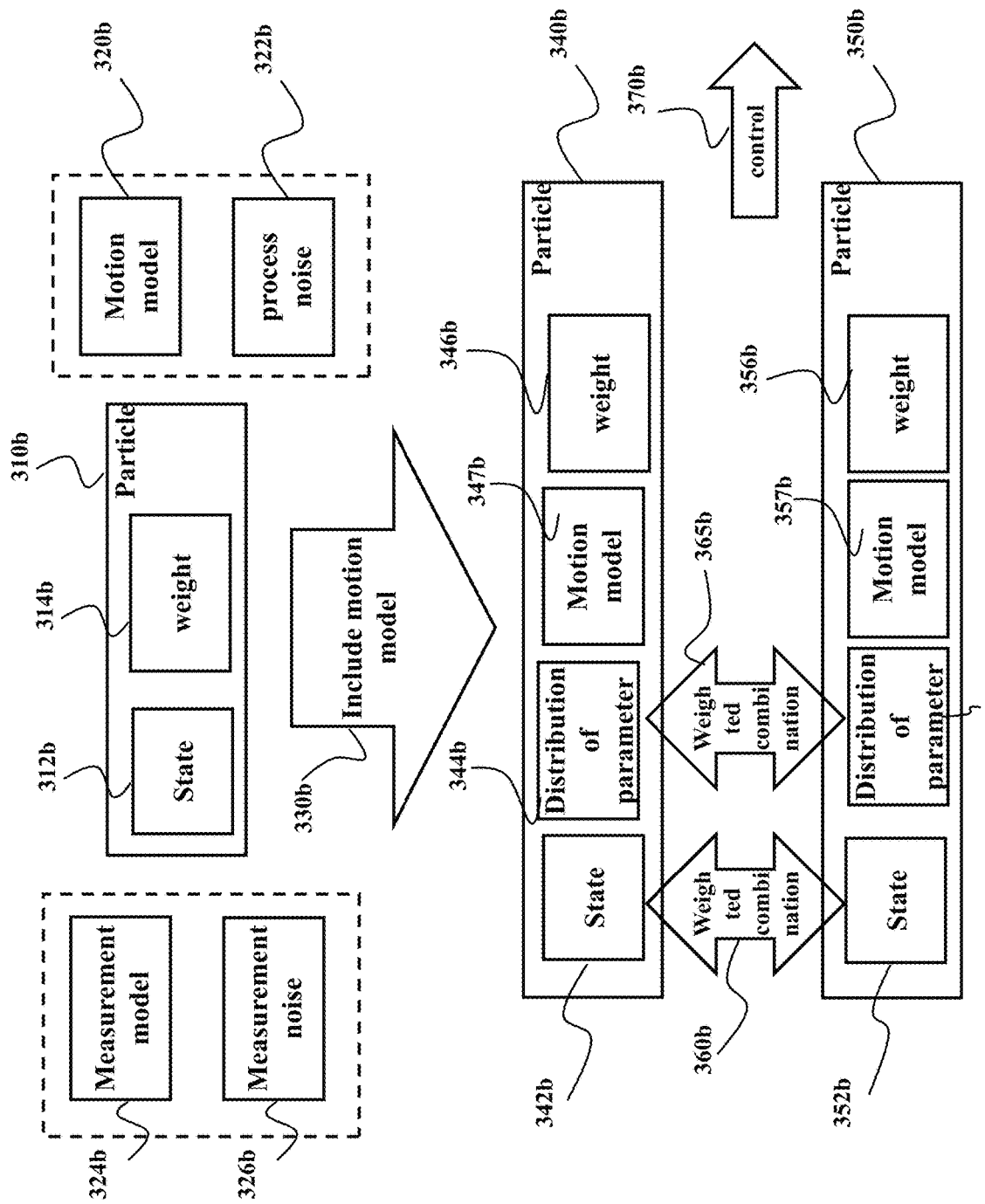
FIG. 3B shows a schematic of a particular instance of a probabilistic filter, i.e., a particle filter (PF).

FIG. 3B shows a schematic of a particular instance of a probabilistic filter, i.e., a particle filter (PF). Some embodiments are based on recognition that PFs can estimate the distribution of the state by including in each particle 310*b* a state 312*b* and a weight 314*b* for determining the fitting of the state 312*b* to the measurement using the measurement model 324*b* subject to measurement noise 126*c*, wherein the weight 314*b* is the correcting term 314*a*. However, an inclusion of the state in a particle can update the state only, not the function of the parameter 320*b*, because in such an arrangement, the motion model 320*b* is external to the particle 310*b*, and the parameter is included in the motion model, such that all particles are driven by the same motion model 320*b* and the stochastic uncertainty comes from the process noise 322*b*. In such a manner, the external to the particles motion model 320*b* remains unchanged.

Some embodiments are based on the understanding that a PF can also include 330b in each particle a motion model having the uncertain parameter. In such a manner, the parameter becomes internal to a particle, i.e., each particle would have its own parameter, and hence its own motion model. For example, a particle 340b can include a parameter 344b included in a motion model 347b, while a particle 350b can include a parameter 354b included in a motion model 357b. In effect, because motions models of different particles can differ, the modified PF can update not only the state of the system, but also the parameter affecting the motion model of the system.

Some embodiments are based on realization that in order to include a motion model into each particle, the particle should include a state 342b and 352b, the uncertain parameter 344b and 354b and hence the motion model 347b and 357b, and a weight 346b and 356b that determines the joint fit of the state and motion model having the uncertain parameter with respect to the measurement model 324b. Doing in such a manner ensures that the weighting of each particle 340b and 350b reflects the quality of the estimate of the parameter.

Some embodiments are based on realization that an uncertainty of a function of a parameter can be modeled as a Gaussian process over possible functions of parameters affecting the robotic system. The parameter is a function, often nonlinear, describing the dependence of the parameter as a function of the states. Each sample on the Gaussian process over possible function of parameters is a sampled function of the parameter, which therefore by effect means a new sample of the motion model. Because the parameters of the Gaussian process, such as mean and variants of the Gaussian process capture the uncertainty of the function of the paramter, the sampled function represents the uncertainty. To that end, when a parameter of of the motion model is unknown, some embodiments model the parameter using a Gaussian process which is a distribution over functions of the state.

Hence, in some embodiments, the parameters 344b and 354b are included in different particles as a distribution of the parameters, i.e., a parameter having an uncertainty modeled as a Gaussian process over possible parameters affecting the system. Hence, different particle can have different parameters by having different distributions. For example, in some embodiments, a distribution of the Gaussian process of the parameter of one particle is different from a distribution of the Gaussian process of the parameter of at least one other particle.

Some embodiments are based on the realization that the unknown parameter can be regarded as a stochastic uncertainty of the model of the motion of the system. In addition, one embodiment recognizes that there are typically other disturbances acting on the motion of the system. For instance, due to uncertainties in the actuators producing the control inputs, or other external disturbances.

One embodiment is based on the realization that a distribution of parameters can be determined as a weighted combination of possible parameters of each particle, weighted according to the weights of the particles.

One embodiment is based on the recognition that a function can be represented as an weighted sum of basis functions, e.g., as a weighted sum of trigonometric functions or a weighted sum of polynomial functions. A Gaussian process is a generalization of the Gaussian distribution, to distributions of functions. Some embodiments realize that therefore, a Gaussian process can be expressed as a weighted sum of basis functions, wherein the weights have a Gaussian distribution.

Figure 4A:
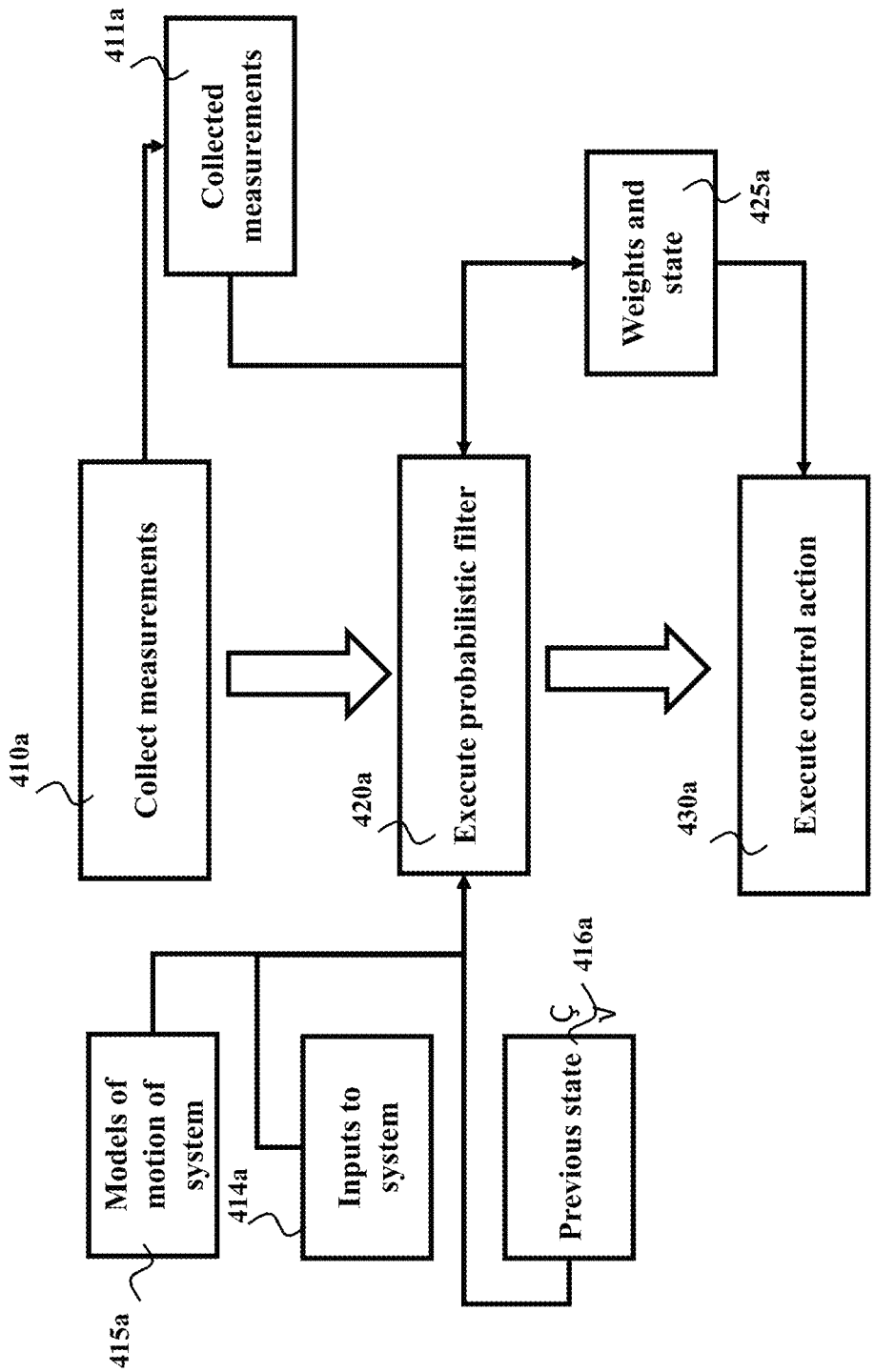
FIG. 4A shows a flowchart for an iteration of a method for probabilistic feedback control for controlling an operation of a robotic system using a probabilistic filter subject to a structural constraint on an operation of the robotic system according to some embodiments.

Consequently, FIG. 4A shows a flowchart for an iteration of a method for probabilistic feedback control for controlling an operation of a robotic system using a probabilistic filter subject to a structural constraint on an operation of the robotic system according to some embodiments. The feedback control can be implemented using a variety of controllers in the literature, e.g., using model-predictive control, linear-quadratic control or any other controller that can utilize the estimation information from a probabilistic filter. The feedback controller comprises at least at least one processor and a memory having instructions stored thereon that, when executed by the at least one processor, the method collects digital representations of a sequence of measurements of a state of a robotic system at different instances of time indicative of a structural constraint on a shape of a function of a parameter affecting the operation of the robotic system. The method retrieves from a memory configured to store a probabilistic filter and executes 420a said probabilistic filter configured to recursively estimate a distribution 425a of a current state of the robotic system given inputs 414a to the system, previous state 416a of the robotic system based on a motion model 415a of the robotic system perturbed by stochastic process noise and a measurement model 415a of the robotic system perturbed by stochastic measurement noise, and the collected measurements 411a. One or a combination of the motion model, the process noise, the measurement model, and the measurement noise includes the parameter having an uncertainty modeled as a time-varying Gaussian process represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions, wherein the probabilistic filter recursively updates both the distribution 425a of the current state of the robotic system and the Gaussian distributions of the weights of the basis functions, i.e., the distribution of the weight, and wherein each of the basis functions is selected to satisfy the structural constraint indicated by the sequence of measurements of the state of a robotic system. Next, the method executes 430a a control action based on an estimate of the distribution 425a of the current state of the robotic system and the function of the parameter of the robotic system to change the current state of the robotic system according to a control objective.

Figure 4B:
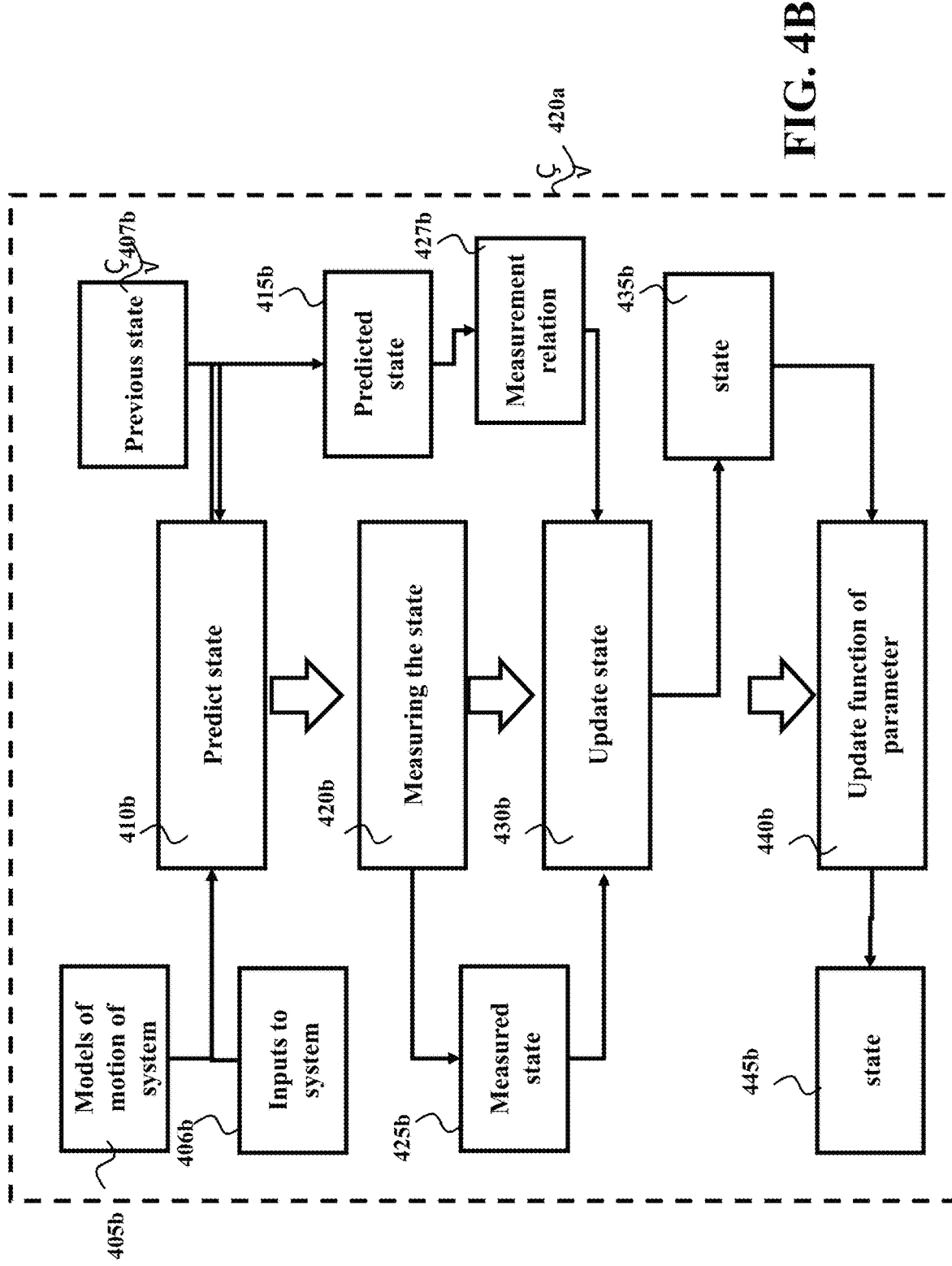
FIG. 4B shows a flowchart of the execution of one iteration of the probabilistic filter according to one embodiment.

FIG. 4B shows a flowchart of an execution of one iteration of the probabilistic filter according to one embodiment. Using the model of motion 405b of the robotic system having the uncertain parameter determined from a previous iteration, the control input 406b determined during a previous iteration, the state 407b, the probabilistic filter updates 410b the state according to the estimated parameter of the vehicle. In some embodiments, the function of parameter included in the motion model 405b is represented with a distribution over states. In those embodiments, the method samples the distribution to produce a sampled function of the parameter and update the state with the corresponding sampled parameter. Then, the probabilistic filter measures 420b the state to produce a measured state 425b. Using the measured state 425b and a measurement relation 427b relating the state to the measured state, the probabilistic filter updates 430*b* the state distribution to produce an updated state 435*b*. Then, the method 420*a* updates 440*b* the parameter included in the model of motion of the robotic system to produce an updated parameter 445*b*.

Updating 440*b* the function of the parameter, i.e., the Gaussian process distribution can be done in several ways. In one embodiment, the updating is done by updating the parameters defining the Gaussian process distribution based on a combination of the state with the uncertainty of the parameter and a state determined without the uncertainty of the parameter, and the parameters determined in a previous iteration.

Figure 4C:
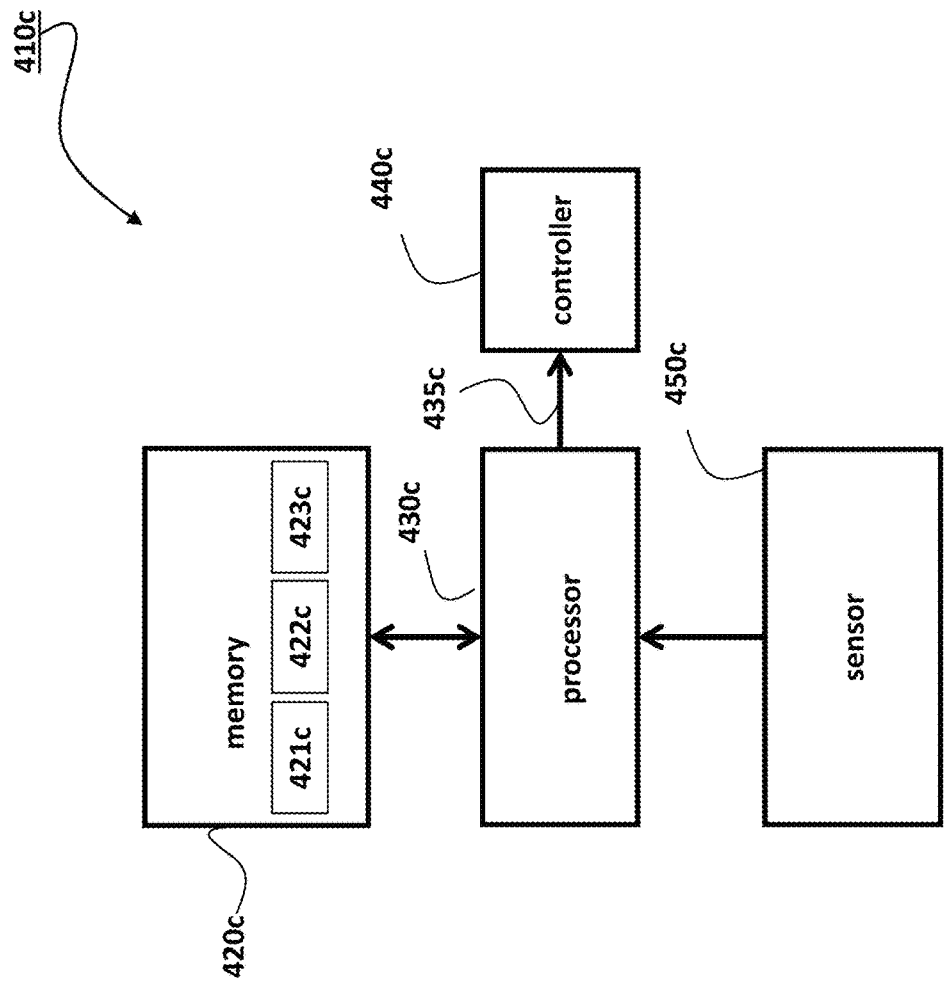
FIG. 4C shows a block diagram of an apparatus for controlling a system according to some embodiments.

FIG. 4C shows a block diagram of an apparatus 410*c* for controlling a system according to some embodiments. The apparatus includes a memory 420*c* to store a probabilistic filter, wherein the filter includes a model 421*c* of the system having an uncertainty, a state of the system 422*c* determined with the uncertainty of the motion model, and a measure of uncertainty 423*c* that determines the joint fitting of the model and state to the measurement.

The apparatus 410*c* also includes at least a sensor 450*c* to measure a signal to produce a digital representation of a sequence of measurements indicative of a state of the system, a processor 430*c* configured to; execute a probabilistic filter that recursively estimates a distribution of a current state given a previous state and the parameter; update the distribution of the function of the parameter based on a difference between the state determined with the uncertainty of the parameter of the particle and said state determined when inserted into the measurement model, wherein a current estimate of the function of the parameter is a weighted combination of the time varying basis functions with weights defined by a Gaussian distribution; and execute a controller configured to generate a value of the control input based on the current estimated distribution of the function of the parameter included in the motion model and the current estimate of the state of the system and control the system using the value of the control input.

Some embodiments are based on realization of a manner of simplification the estimation of the Gaussian process to determine the function of the parameter. Specifically, in some embodiments, the Gaussian process is regarded as a weighted combination of a finite number of basis functions, wherein each basis function is a function of the system state, and Gaussian process of the function of the parameter is captured by Gaussian distributions of weights of basis function. In other words, to update Gaussian process some embodiments can just update these Gaussian distributions of weights, and to determine the motion model some embodiments can determine a weighted combination using these N scalar weights from Gaussian distribution. In effect, regarding the function of the parameter as a weighted combination of basis functions significantly decreases the computational requirements for estimating the function of the parameter in a probabilistic manner, which is crucial for real-time implementations.

Figure 5A:
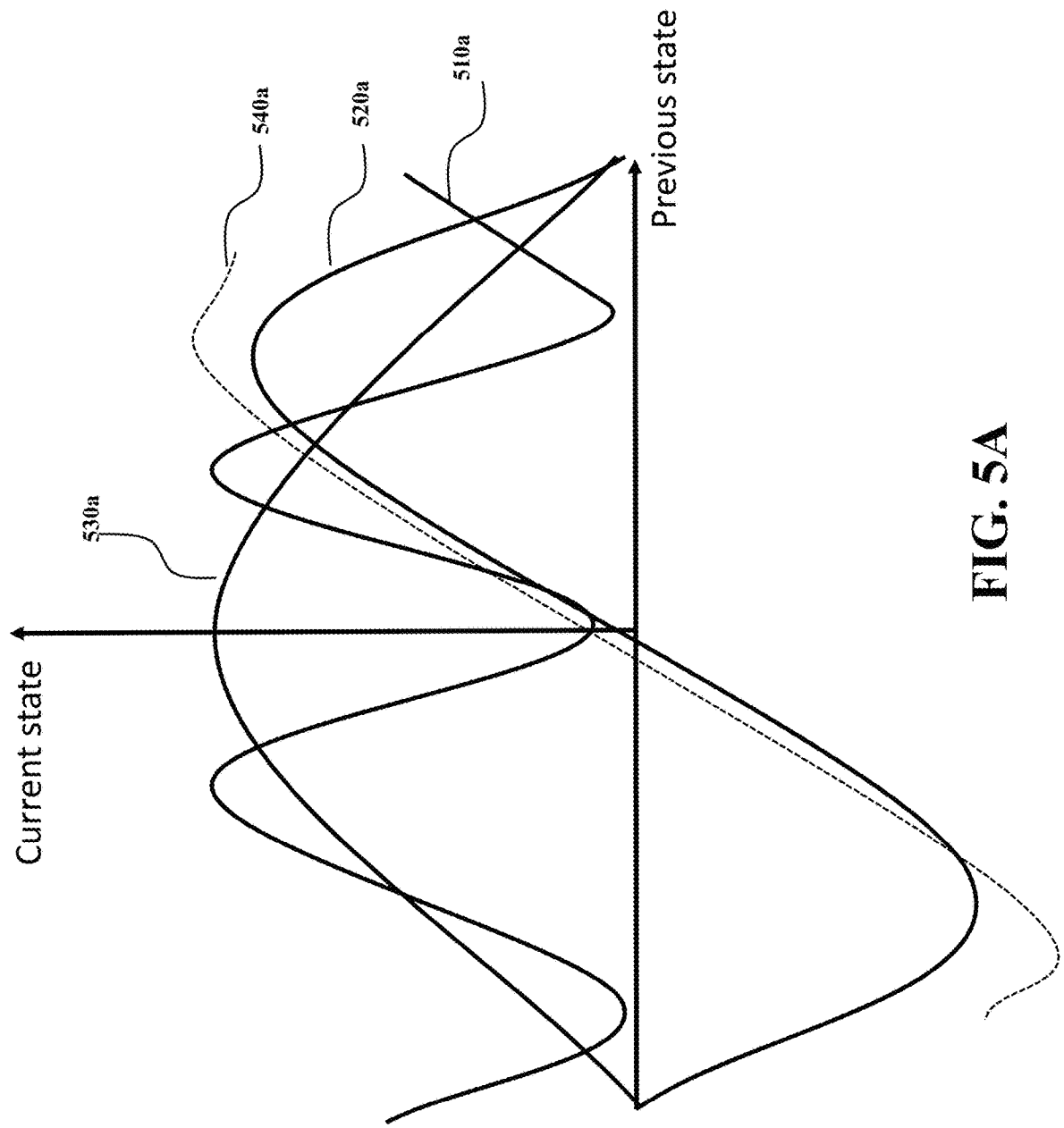
FIG. 5A shows an illustration of the use of weighted basis functions according to one embodiment.

FIG. 5A shows an illustration of the use of weighted basis functions according to one embodiment. In the illustration there are three basis function 510, 520*a*, and 530*a*. Also shown is the true function of the parameter 340*a* that together with the motion model maps a previous state to a current state. By combining the basis functions and using different weights for each basis functions, they can be combined to reproduce the true function of the parameter, hence the true motion model.

Figure 5B:
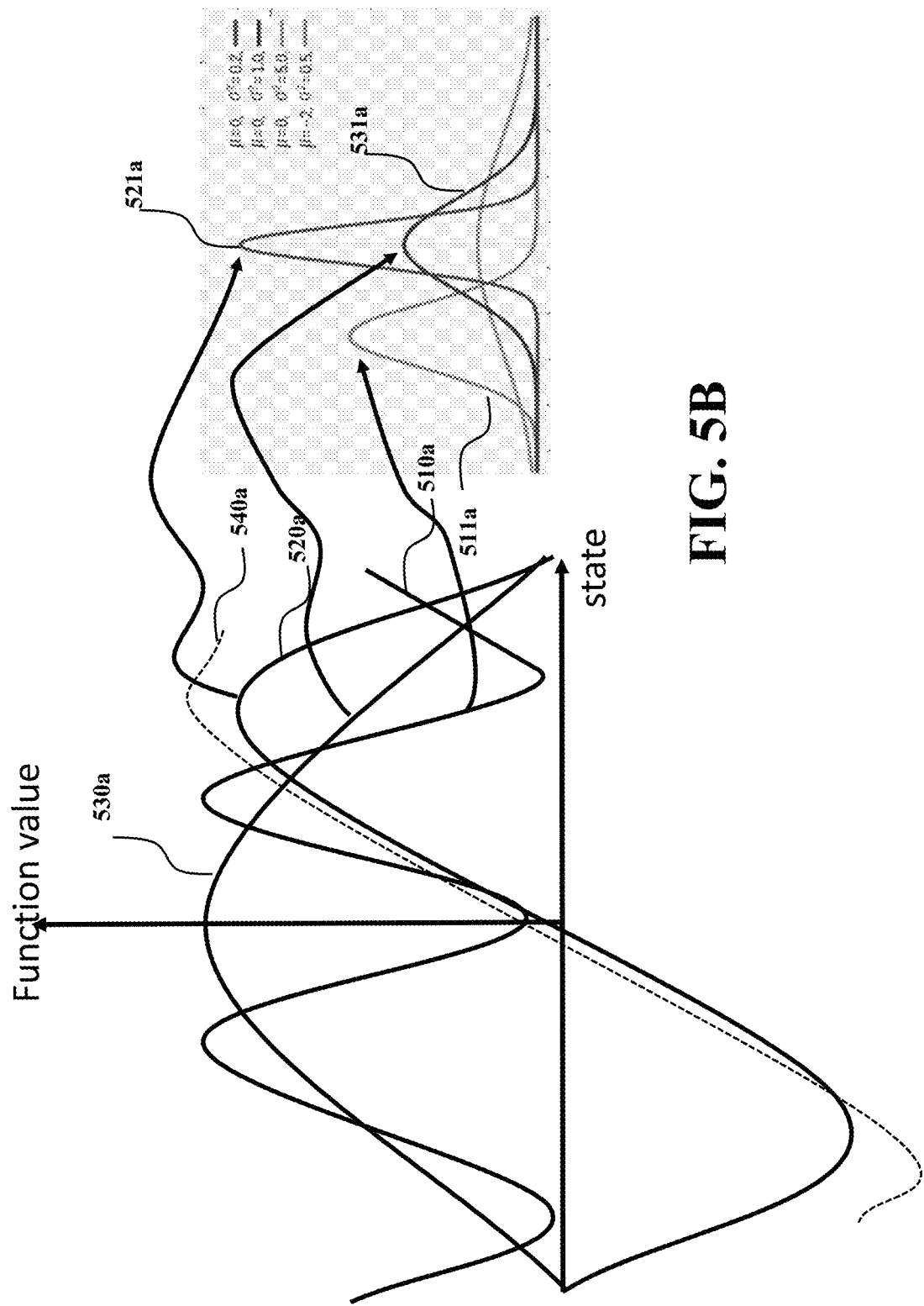
FIG. 5B shows an illustration of the mean value of the weight and the covariance of the weight associated with the different basis functions according to some embodiment.

FIG. 5B shows an illustration of the mean value of the weight and the covariance of the weight associated with the different basis functions according to some embodiment. For example, basis function 530*a* has a weight distribution 531*a*, basis function 520*a* has a weight distribution 521*a*, and basis function 510*a* has a distribution 511*a*.

Figure 5C:
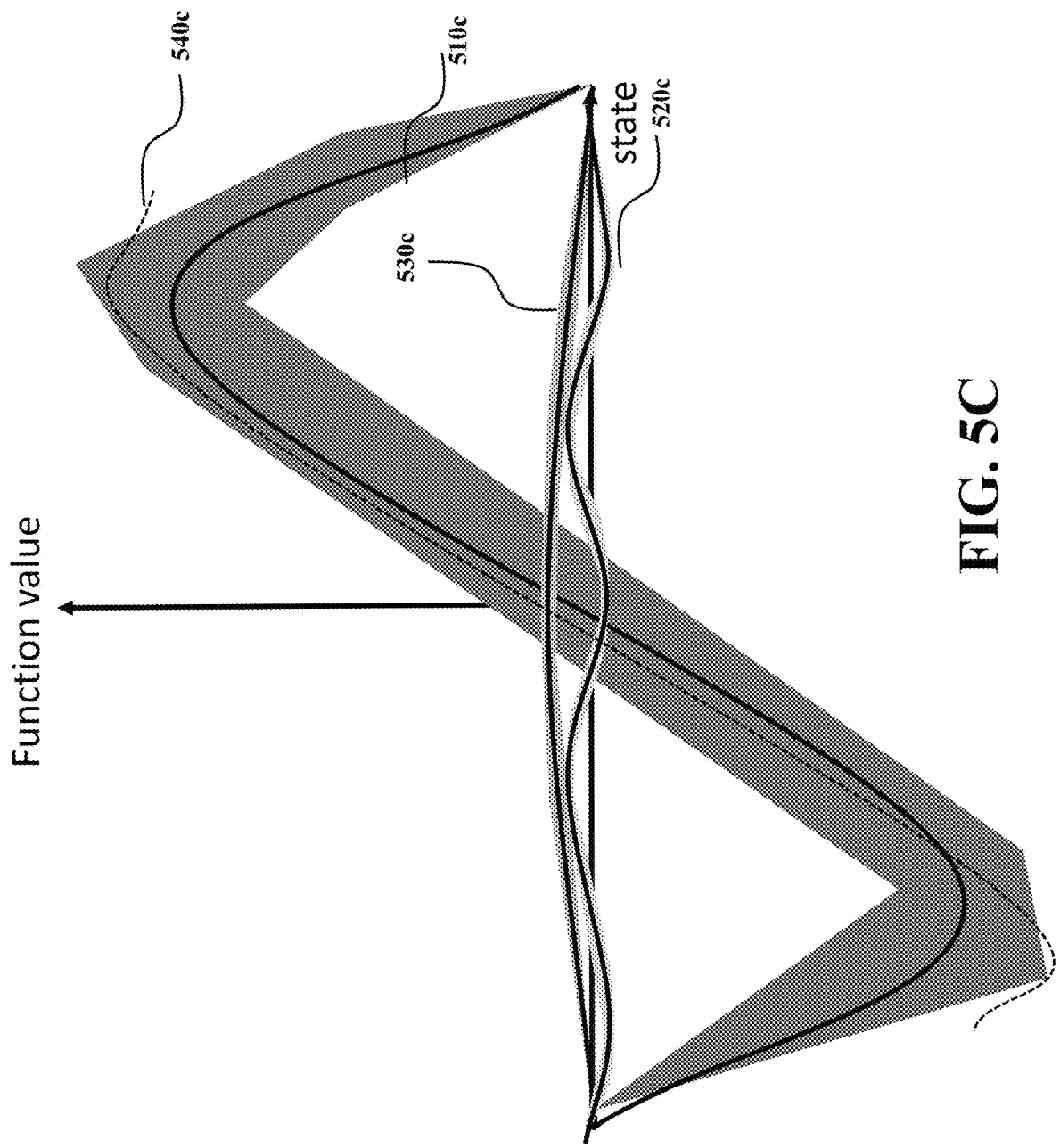
FIG. 5C shows an illustration of the influence of the weights of the basis functions for a subset of the function of the parameter 540c, in accordance with some embodiments.

FIG. 5C shows an illustration of the influence of the weights of the basis functions for a subset of the function of the parameter 540*c*, in accordance with some embodiments. By letting the weights of functions 520*c* and 530*c* be very small, and the weight of 510*c* be large, the basis function expansion can reproduce the function of the parameter 540*c* with only one basis function. Although FIGS. 5A-5C are simplifications of reality, they illustrate the principles of basis functions and the computational efficiency it can have.

In some embodiments, to update the probability distribution of the function of parameter the processor is configured to update the Gaussian probability distribution of at least some weights of the weighted combination of the set of basis functions. For instance, one embodiment models the function of parameter as $f(x) \sim \mathcal{GP}(0, \kappa(x,x'))$, wherein the covariance function $\kappa(x,x')$ of the Gaussian process is formulated in terms of Laplace operators, $$\kappa_\theta(x, x') \approx \sum_{j_i,\ldots,j_d=1}^{\ldots} S_\theta(\lambda^{j_i,\ldots,j_d}) \phi^{j_i,\ldots,j_d}(x) \phi^{j_i,\ldots,j_d}(x').$$

With basis functions $$\phi^{j_i,\ldots,j_d} = \prod_{n=1}^{d} \frac{1}{\sqrt{L_n}} \sin\left(\frac{\pi j_n (x_n + L_n)}{2 L_n}\right),$$

the function of parameter is $$f(x) \approx \sum_j \gamma^j \phi^j(x),$$

where the weights are Gaussian distributed, $\gamma^j \sim \mathcal{N}(0, S(\lambda^j))$.

By a coordinate transformation, one embodiment recognizes that using weighted basis functions can be used to model the motion of the system as $$x_{k+1} = \underbrace{\begin{bmatrix} \gamma_1^1 & \cdots & \gamma_1^m \\ \vdots & & \vdots \\ \gamma_d^1 & \cdots & \gamma_d^m \end{bmatrix}}_{A} \underbrace{\begin{bmatrix} \phi^1(x_k) \\ \vdots \\ \phi^m(x_k) \end{bmatrix}}_{\varphi(x_k)} + w_k,$$

Wherein A is the matrix of weights and $\varphi(x_k)$ is the vector of basis functions as a function of the state of the system. In another embodiment, the function of the parameter can be written as $$f_k = \underbrace{\begin{bmatrix} \gamma_{11} & \cdots & \gamma_{1m} \\ \vdots & & \vdots \\ \gamma_{n_x 1} & \cdots & \gamma_{n_x m} \end{bmatrix}}_{A} \underbrace{\begin{bmatrix} \phi_1(x_k) \\ \vdots \\ \phi_M(x_k) \end{bmatrix}}_{\varphi(x_k)}$$

Which can be inserted into the model of motion of the system.

Figure 5D:
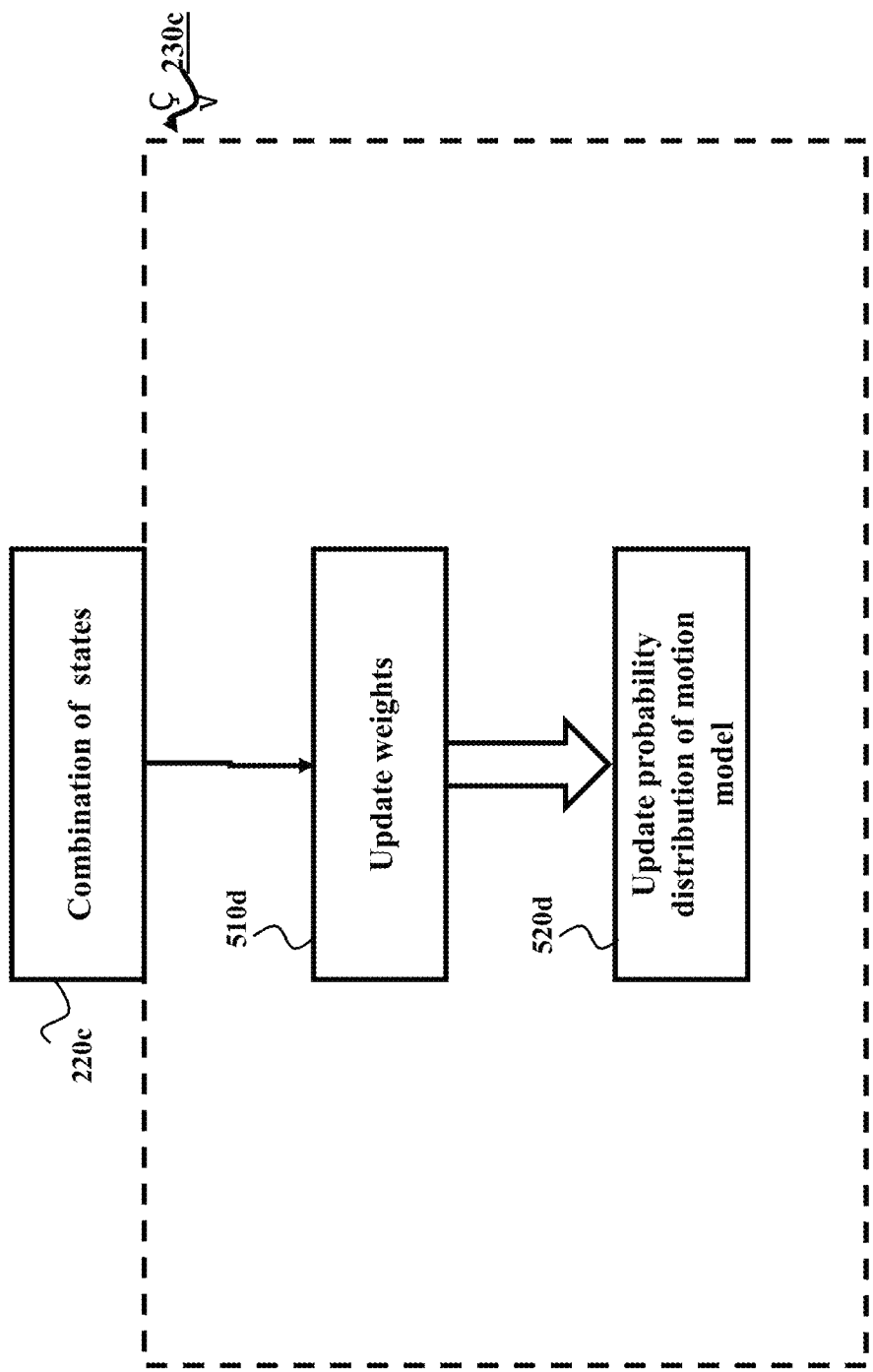
FIG. 5D shows a block diagram of one iteration of a method for updating 440b the probability distribution of weights of the basis functions according to one embodiment.

FIG. 5D shows a block diagram of one iteration of a method for updating 440*b* the probability distribution of weights of the basis functions according to one embodiment. The method updates 510*d* the weights of the weighted combination of basis functions using the determined combination of current and previous state 520*d* and updates the probability distribution 520*d* of the function of parameter according to the weighted combination of the basis functions weighted with the updated weights.

Figure 5E:
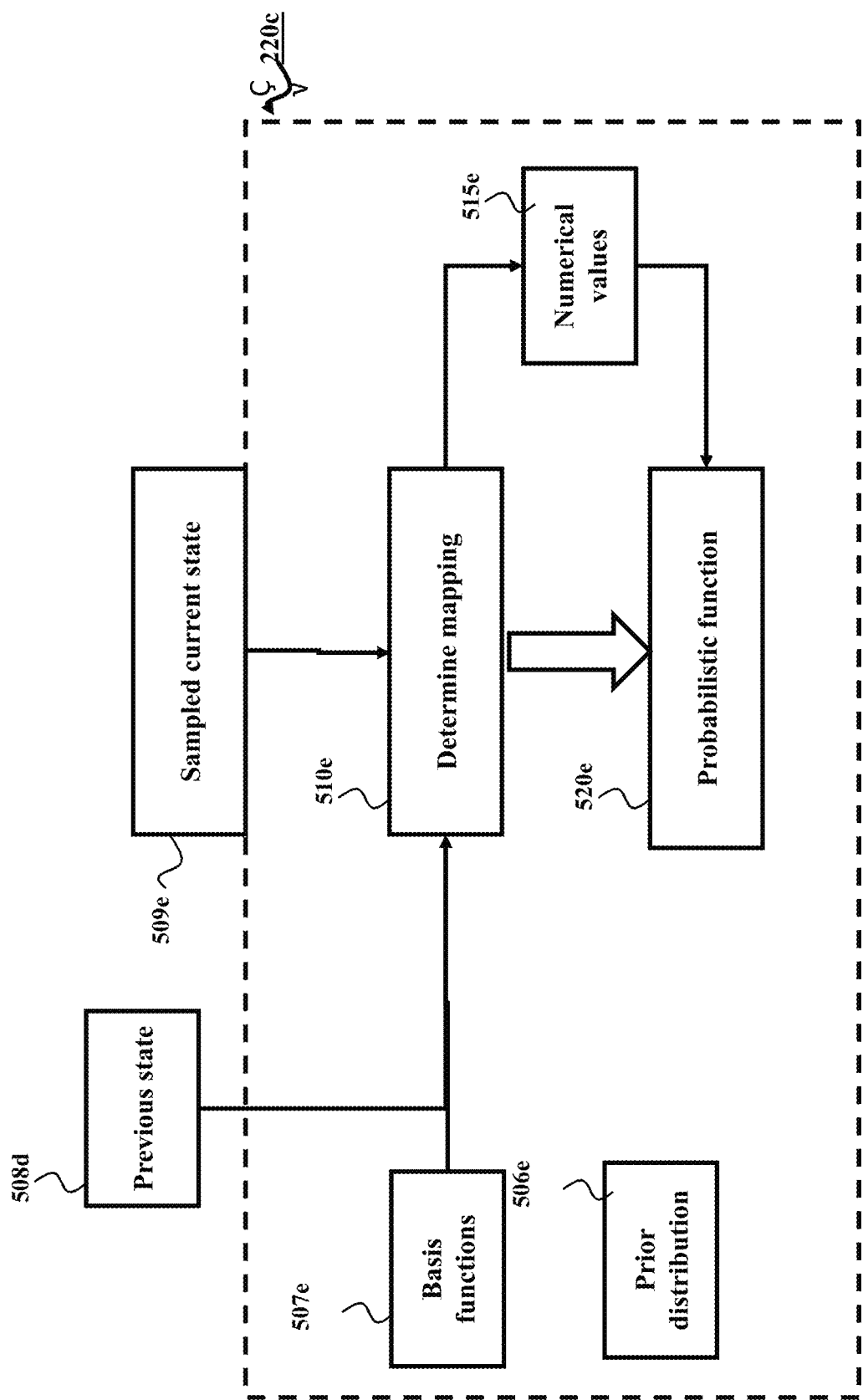
FIG. 5E shows a block diagram of a method for determining a combination of states for updating the weights of the weighted combination of basis functions according to one embodiment.

FIG. 5E shows a block diagram of a method for determining a combination of states for updating the weights of the weighted combination of basis functions according to one embodiment.

Using the current sampled state 509*e* and the previous state 508*e* inserted into the basis functions 507*e*, the method maps current sampled state 509*e* and the previous state 508*e* inserted into the basis functions 507*e* to a set of numerical values 515*e* stored in matrices. Then, the method uses the determined numerical values 515*e* and a probabilistic function 520*e* mapping the numerical values 515*e* to a distribution of the weights.

In one embodiment, the probabilistic function is a matrix-Normal distribution parametrized by the numerical values 515*e*, that is, $A \sim \mathcal{MN}(0, Q \cdot V)$. In another embodiment, the process noise is parametrized as an inverse Wishart distribution, $W \sim \mathcal{IW}(\ell_Q, A_Q)$. Updating the weights of basis functions and possibly also the process noise covariance is updating as a function of the state and measurement sequence as $p(Q_k|x_{0:k}, y_{0:k}) = \mathcal{IW}(Q_k|\overline{v}_{k|k}, \overline{A}_{k|k})$ and $p(A|Q_k, x_{0:k}, y_{0:k}) = \mathcal{MN}(A|\overline{M}_{k|k}, Q_k, \Sigma_{k|k}^{-1})$, with the initialization, $M_0 = 0$, $\Sigma_0 = V$, $\Psi_0 = 0$, $\Phi_0 = 0$, wherein $$\overline{M}_{k|k} = \Psi_{k|k} \overline{\Sigma}_{k|k}^{-1},$$

$$\overline{v}_{k|k} = \overline{v}_{k|k-1} + 1,$$

$$\overline{A}_{k|k} = \Lambda_0 + \Phi_{k|k} - \overline{M}_{k|k} \Psi_{k|k}^T,$$

$$\Sigma_{k|k} = \Sigma_{k|k-1} + \varphi(x_{k-1})\varphi(x_{k-1})^T,$$

$$\Phi_{k|k} = \Phi_{k|k-1} \overline{M}_{k|k-1}^T + x_k x_k^T,$$

$$\Psi_{k|k} = \Psi_{k|k-1} + x_k \varphi(x_{k-1})^T,$$

are determined from the state as a static mapping from the determined state trajectory to updated weights of basis functions.

Some embodiments are based on the recognition that to satisfy the structural constraint on the operation of the robotic system is accomplished by enforcing constraints onto the basis functions themselves. In other words, by choosing a particular set of basis functions, the structural constraint is enforced on the basis functions, and therefore also on the Gaussian process that models the function of the parameter affecting the robotic system.

Various embodiments are based on the recognition that the sequence of measurements indicates the structural constraint affecting the operation of the robotic system. Specifically, the sequence of measurements of the state of the robotic system relates to a value of the parameter affecting the operation of the robotic system through one or a combination of the motion model and the measurement model, such that the sequence of measurements of the state of the robotic system relates to a sequence of values of the parameters statistically conserving the structural constraint on the shape of the function of the parameter.

Other embodiments are based on the notion that in order to determine basis functions satisfying the structural constraint, the structural constraint by itself must be determined. Sometimes it is obvious from the physical construction of the robotic system what the structural constraint is, but often the structural constraint is unknown and must be determined.

Figure 6A:
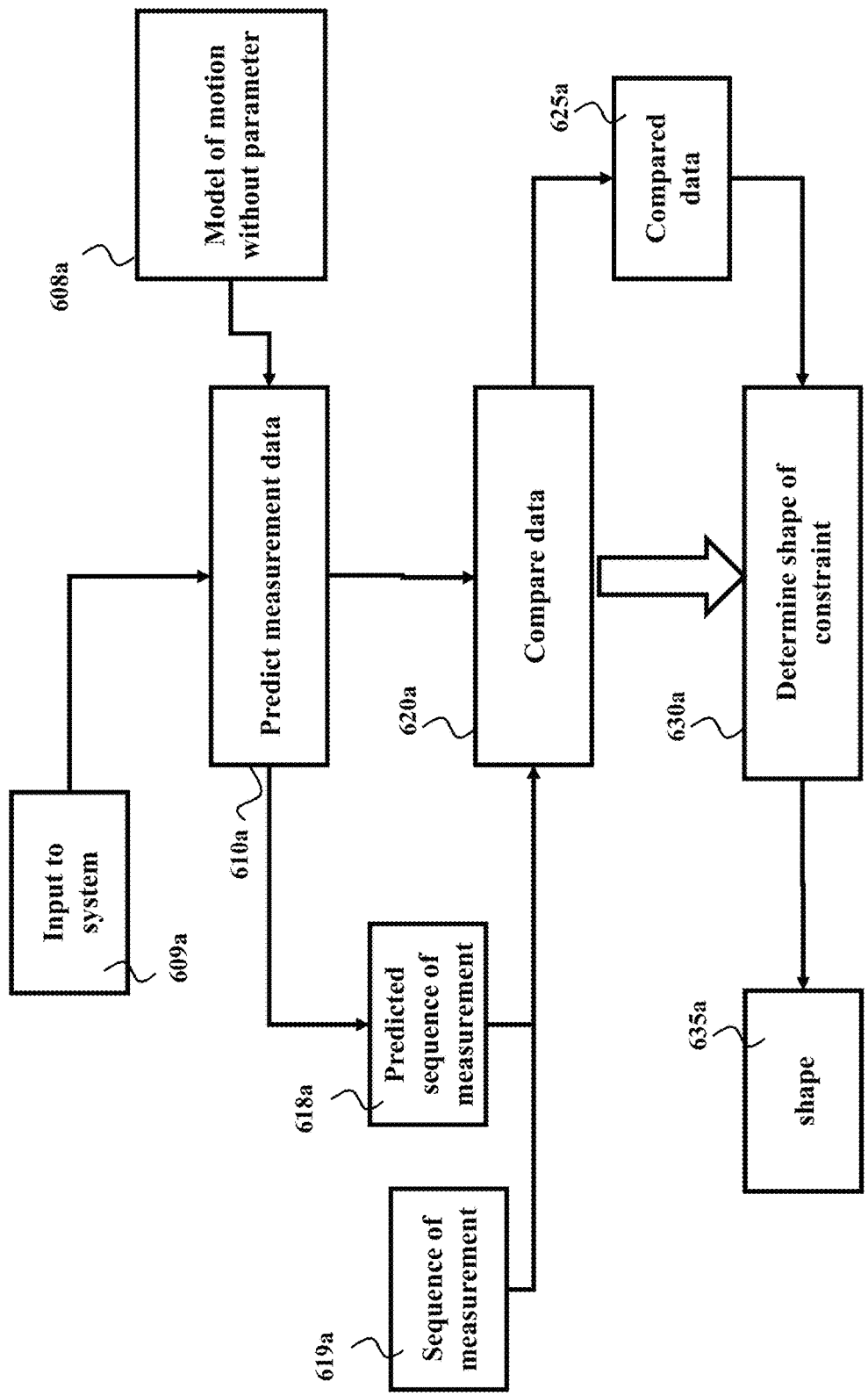
FIG. 6A shows a flowchart of a method for identifying a type of a shape of a function of the parameter conserving the structural constraint affecting the operation of the robotic system according to some embodiments.

FIG. 6A shows a flowchart of a method for identifying a type of a shape of a function of the parameter conserving the structural constraint affecting the operation of the robotic system according to some embodiments. Using a model 608*a* of the robotic system, including a motion model and a measurement model without the parameter, and the inputs 609*a* to the system, the method predicts 610*a* a sequence of measurements 618*a*. Next, using the predicted 618*a* sequence of measurements with the measured sequence 619*a* of measurements, the method compares 620*a* the measurement data and produces compared data 625*a*. For instance, the compared data 625*a* can be the difference between the measurements and predicted measurements for a sequence of measurements with different actuation. Finally, the method determines 630*a* a shape of a function of a parameter conserving the structural constraint 635*a* based on the difference of the data 625*a*.

In various embodiments, the structural constraint is determined offline, and in other embodiments, the structural constraint is determined online.

Figure 6B:
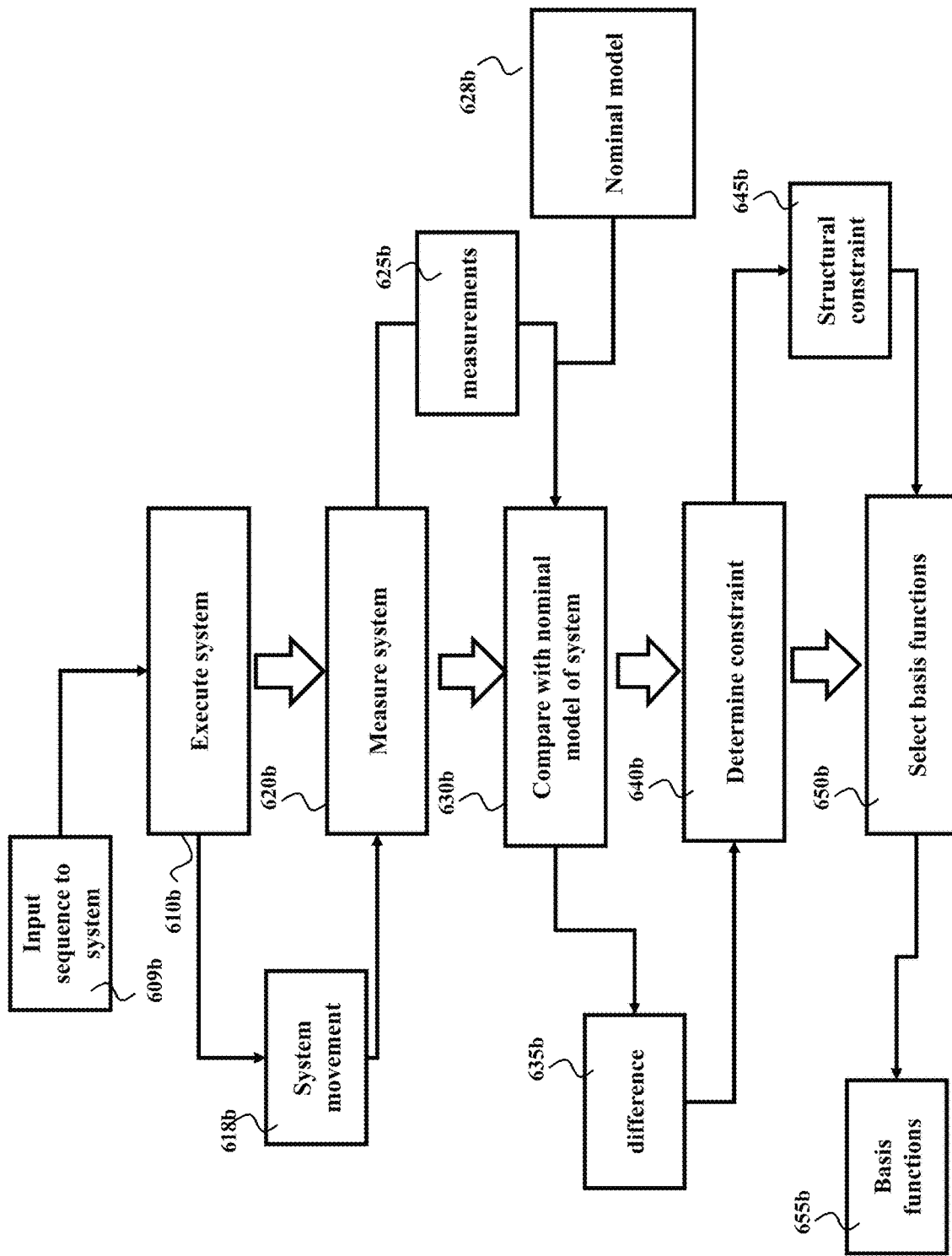
FIG. 6B shows a flowchart of a method for determining the structural constraint offline according to one embodiment.

FIG. 6B shows a flowchart of a method for determining the structural constraint offline according to one embodiment, such that the basis functions are selected offline in response to determining the structural constraint. Using inputs 609*b* to the system, the method executes 610*b* the robotic system using the inputs 609*b* resulting in a movement 618*b* of the state of the system. The inputs need to have large enough variety such that they sufficiently well excite the state space. Next, the method measures 620*b* the system resulting in a digital representation of a sequence of measurements 625*b*. Using a nominal model 628*b* without having the weighted combination of basis functions inserted into the model, the measurements 625*b* are compared 630*b* with the predicted output using the nominal model 628*b*. Using the resulting difference 635*b*, the method determines 640*b* the structural constraint 645*b* and selects 650*b* the basis functions 655*b* satisfying the structural constraint 645*b*.

Some embodiments determine the structural constraint 640*b* by determining the properties of the difference 635*b* with respect to the inputs to the system. Other embodiments classify the constraint with respect to previously tabulated structural constraints.

Figure 6C:
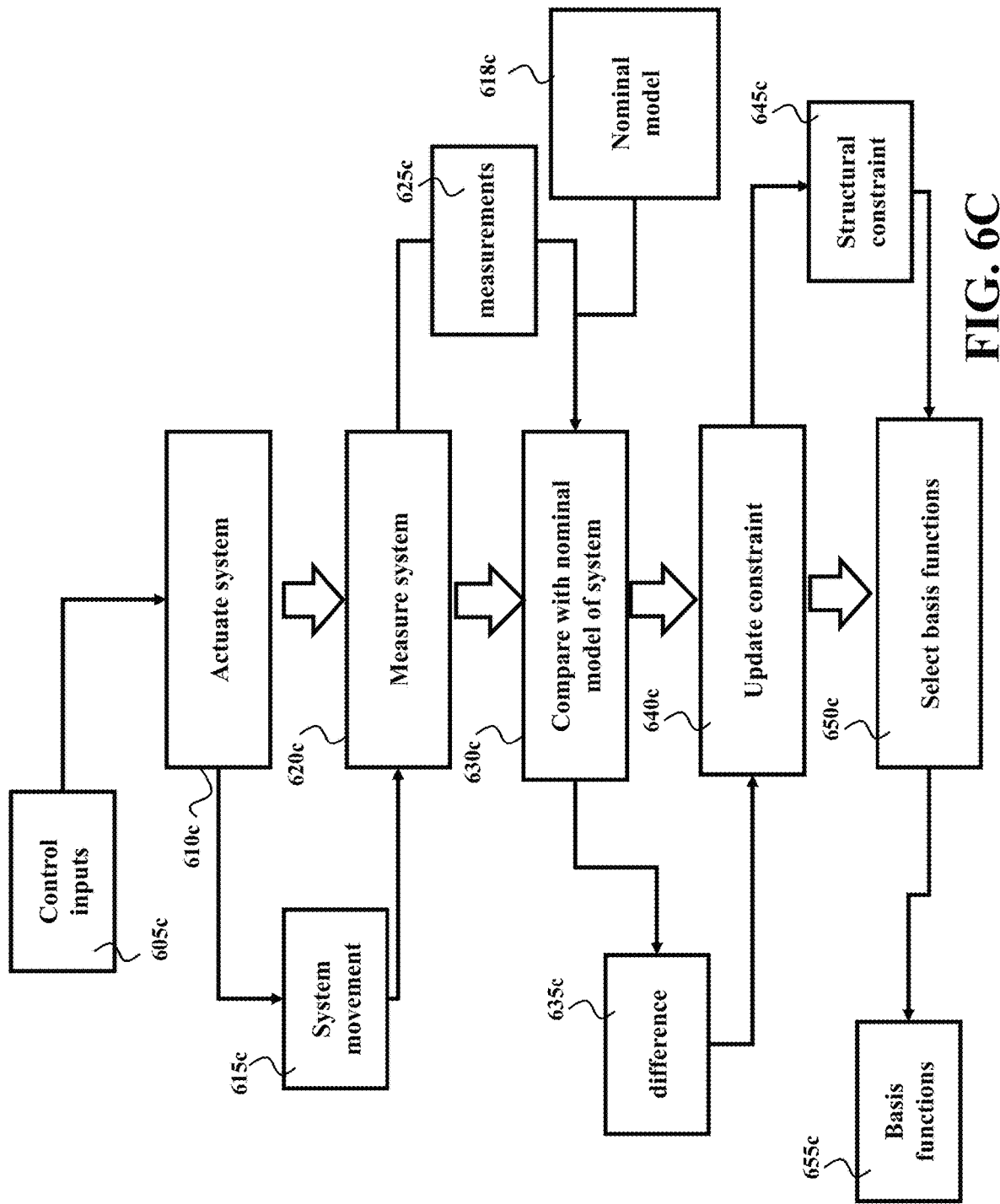
FIG. 6C shows a flowchart of one iteration of a method for determining the structural constraint online according to one embodiment.

FIG. 6C shows a flowchart of one iteration of a method for determining the structural constraint online according to one embodiment, such that the basis functions are selected online during the operation of the robotic system in response to determining the structural constraint. First, the method actuates 610*c* the robotic system using a range of control inputs 605*c*. Using the control inputs 605*c*, the method collects 620*c* a sequence of measurements 625*c* in response to the actuating the robotic system 615*c* using the control inputs. Using inputs 605*c* to the system and using a nominal model 615*c* without having the weighted combination of basis functions inserted into the model, the measurements 625*c* are compared 630*c* with the predicted output using the nominal model 618*c*. Using the resulting difference 635*c*, the method updates 640*c* the structural constraint 645*c* and selects 650*c* the basis functions 655*c* satisfying the structural constraint 645*c*.

In some embodiments, various probabilistic filters are employed to estimate the system using different structural constraints on the shape of the function of the parameter affecting the operation of the robotic system. For instance, several embodiments employ PFs having various structural constraints on the shape of the function of the parameter, and other embodiments employ KF type filters.

FIG. 6D shows a table illustrating some of the most common structural constraints used in some embodiments. For example, one embodiment actuates the system using control inputs and measure the response, resulting in a difference 635b as a function of the previous state and input to the system, resulting in a mapping as a function of the state. This mapping is compared with and matched to each constraint, and if the behavior is similar to the category of constraints, the structural constraint is determined to belong to this category.

FIG. 6E shows the table with a set of basis functions satisfying those constraints and an example of basis functions according to some embodiments.

Linear operator constraints as illustrated in FIG. 6D include a variety of constraints, e.g., divergence free vector fields, curl free vector fields, differentiation, integration, and more. For such complex constraints there is a need for a systematic procedure to determine the basis functions.

Some embodiments are based on the realization that some constraints can be written in the form $\mathcal{F}_x(f)=0$ for an operator $\mathcal{F}_x$ fulfilling $\mathcal{F}_x(\lambda_1 f_1+\lambda_2 f_2)=\lambda_1 \mathcal{F}_x(f_1)+\lambda_2 \mathcal{F}_x(f_2)$ for two functions $f_1, f_2$ where $\lambda_1, \lambda_2$ are scalar and real valued. Some examples of constraints fulfilling this are $Af=0$, modeling linear dependence between elements of the unknown function $f$; $\nabla f=0$, modeling divergence free vector fields, $\int f(x)dx$ for integration.

Other embodiments recognize that structural constraints can be interpreted as a matrix multiplication of operators. For example, a constraint can be written as $\mathcal{F}_x \mathcal{G}_x=0$ for two matrices $\mathcal{F}_x$ and $\mathcal{G}_x$, where $f=\mathcal{G}_x(g)$, where $f$ is the unknown function with structural constraint $\mathcal{F}_x(f)=0$ and $\mathcal{G}x$ is a transformation mapping a function g to $f$.

Figure 7A:
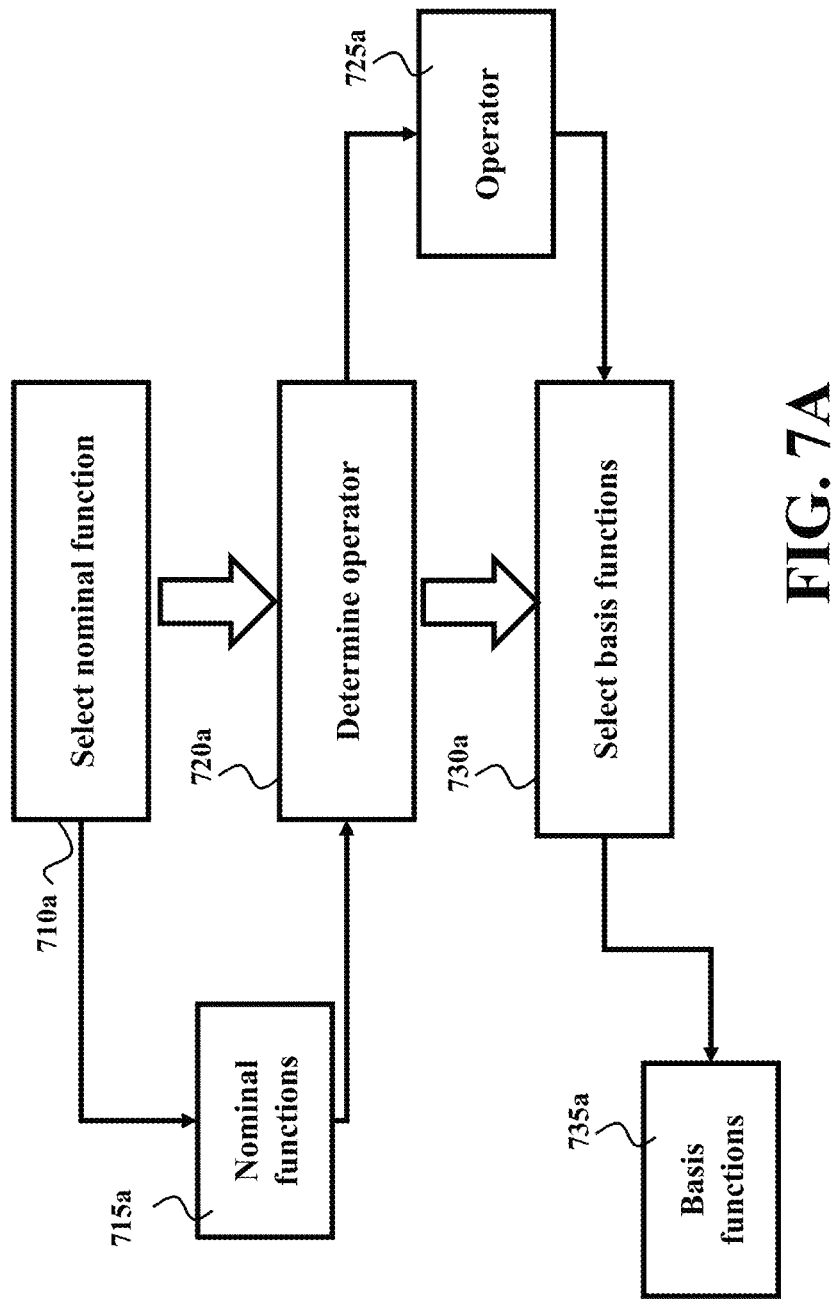
FIG. 7A shows a flowchart of a method for selecting the basis functions according to one embodiment.

Accordingly, one embodiment discloses a method for selecting the basis functions offline according to predefined rules and solution of a linear system of equations. FIG. 7A shows a flowchart of a method for selecting the basis functions according to one embodiment. The method is executed using a processor. First, the method selects 710a a nominal set of basis functions. For example, one embodiment selects 710a a nominal set of trigonometric basis functions. Using the selected 710a basis functions 715a, the method determines 720a an operator satisfying the structural constraint. Next, using the operator 725a, the method selects 730a the basis functions 735a.

FIG. 7B illustrates the fitting of the shape to the measurements according to some embodiments. In this illustration, the parameter is the tire friction that can be described by a function of the slip. To determine the shape, for the case of longitudinal tire friction, which is the tire friction in the forward direction of the tire, one embodiment actuates the vehicle using different braking and acceleration inputs. With an acceleration sensor, it is possible to measure the acceleration, which is the friction if the accelerometer is placed at the wheel, whereas otherwise it is a scaled and rotated version of the tire friction. This results in a number of measurements 710b that due to the noise in the sensor is only indicative of the friction. However, by collecting a sequence of measurements, it is possible to deduce that the tire friction function is antisymmetric.

FIG. 7C illustrates the fitting of the shape to the measurements according to one embodiment. Here, the measurements 710b and its noise characteristics have been used to determine a distribution over which the friction values can be obtained. For example, the distributions 740b and 750b have been determined. Doing this procedure for the sequence of measurements, a distribution 720c can be determined that statistically conserves the shape of the constraint.

Some embodiments are based on the understanding that to impose the structural constraint on the shape of the function of the parameter reduces a difference between the state of the robotic system predicted using the motion model having the parameter and the measured state of the robotic system.

Figure 7D:
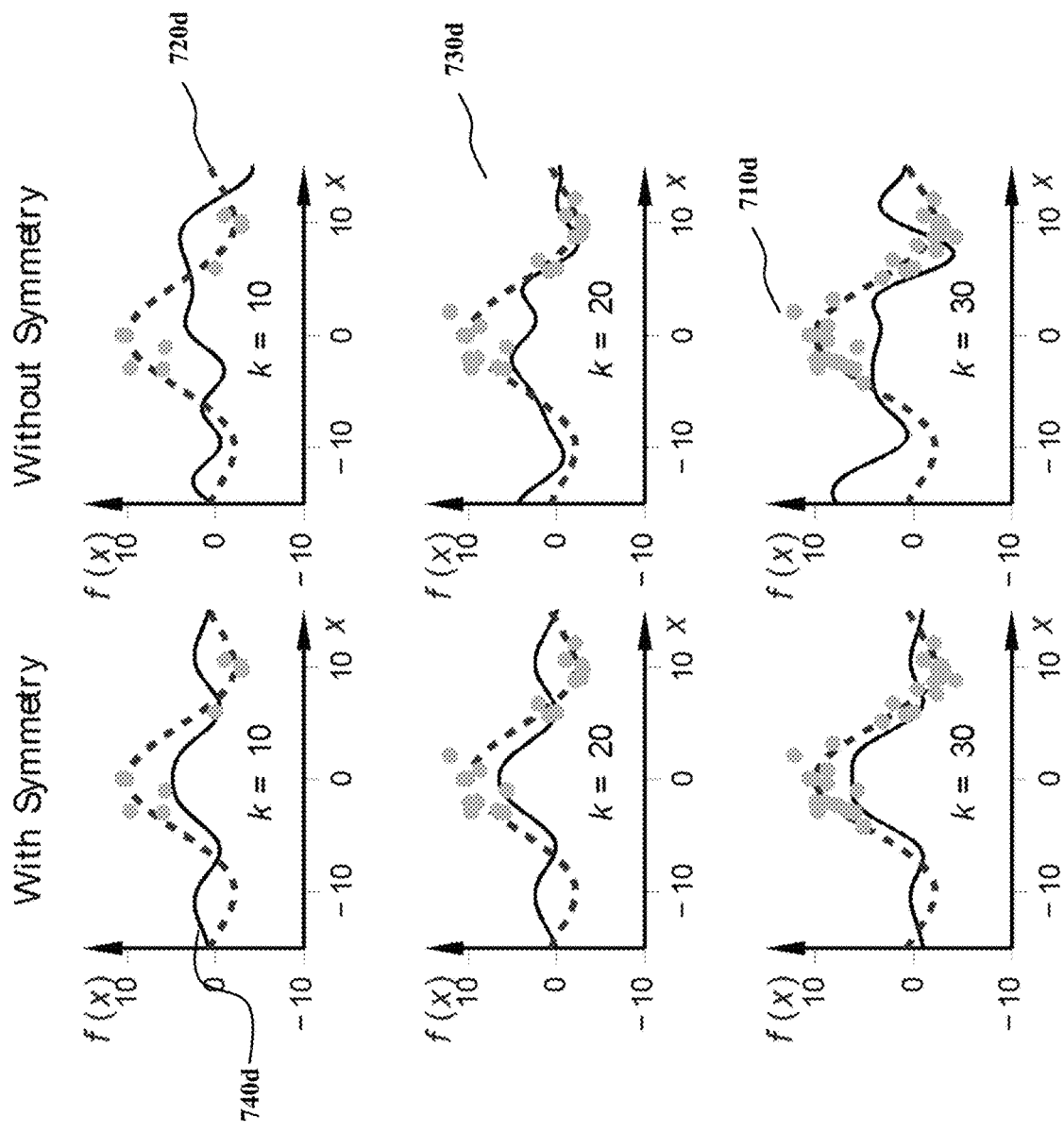
FIG. 7D shows an illustration of reducing the error due to imposing the structural constraint according to one embodiment.

FIG. 7D shows an illustration of reducing the error due to imposing the structural constraint according to one embodiment. Here, the function of the parameter 720d has a symmetric structural constraint, whose distribution 730d is estimated with and without symmetry constraint. When predicting 740d the state according to the function of the parameter, when introducing the symmetry constraint, the fitting to the measurements 710d is improved when imposing the constraint.

Figure 8A:
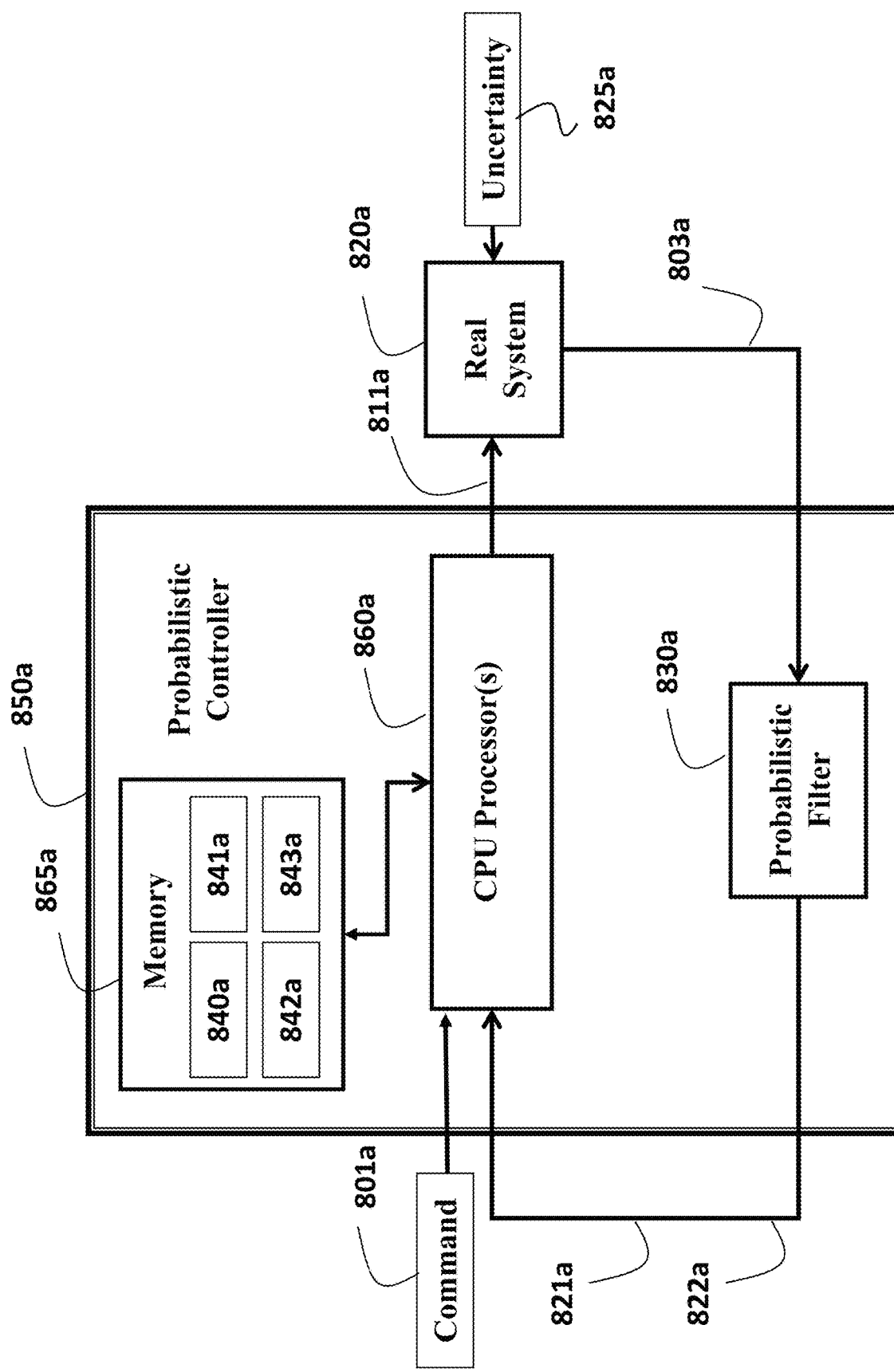
FIG. 8A shows a block diagram of a probabilistic feedback controller 850a according to some embodiments.

FIG. 8A shows a block diagram of a probabilistic feedback controller 850a according to some embodiments, which actuates the system such that the estimated state 821a of the system and output 803a follow a command 801a, given the estimated uncertain parameter 822a. The probabilistic feedback controller 850a includes a computer, e.g., in the form of a single central processing unit (CPU) or multiple CPU processors 860a connected to memory 865a for storing the model 840a, the uncertainty model 841a, e.g., in the form of a weighted set of basis functions, the constraints 842a and probabilistic chance constraints 843a on the operation of the real system 820a with uncertainty 825a. The processor(s) 860a can be a single core microprocessor, a multi-core processor, a computing cluster, a network of multiple connected processors, or any number of other configurations. The memory 865a can include random access memory (RAM), read-only memory (ROM), flash memory, or any other suitable memory system.

Figure 8B:
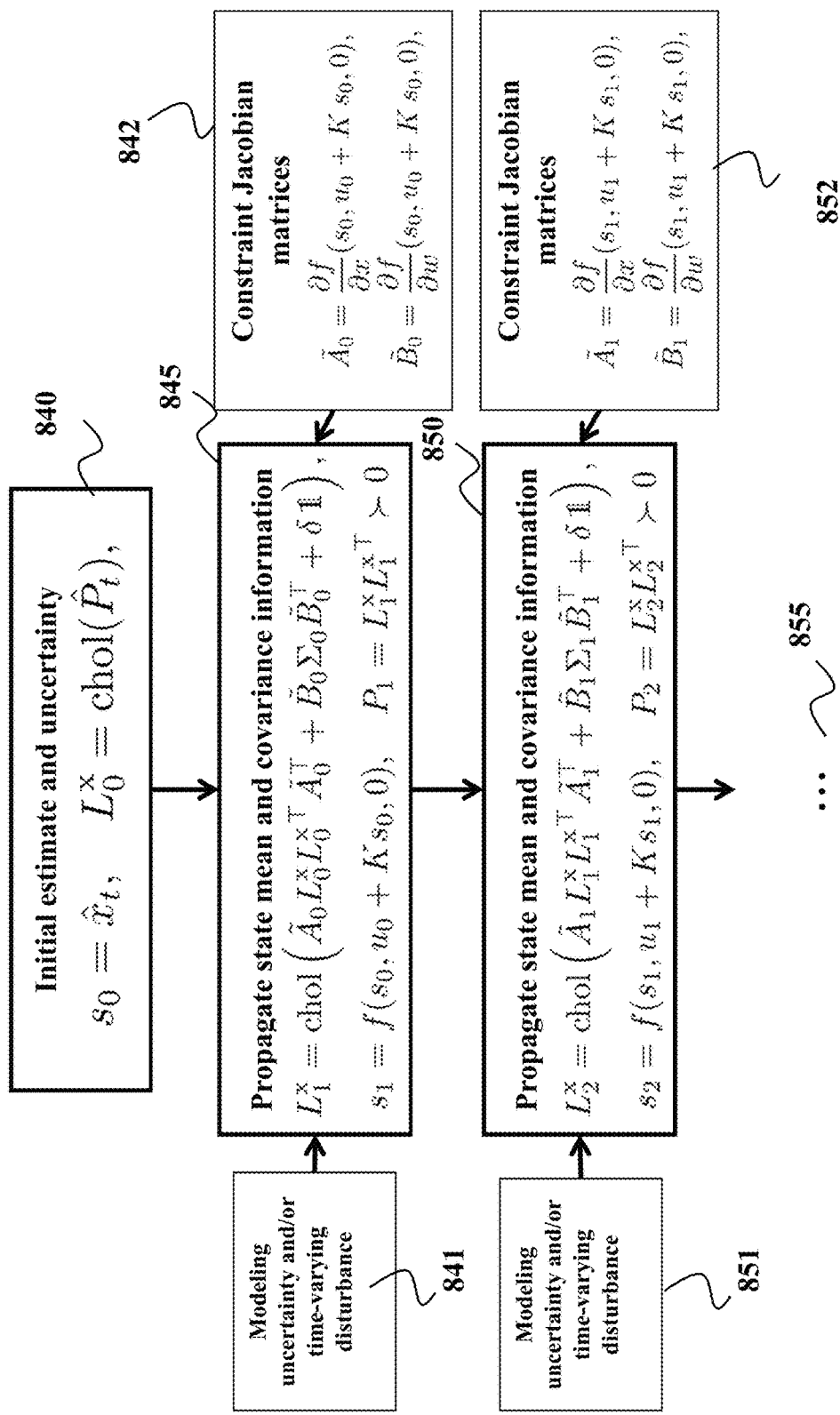
FIG. 8B shows a block diagram of a discrete-time or discretized propagation of state mean and covariance information according to one embodiment.

FIG. 8B shows a block diagram of a discrete-time or discretized propagation of state mean and covariance information according to some embodiments. The propagation is performed given an initial state estimate and corresponding uncertainty 840 and given a Gaussian approximation of the probability density function for the (time-varying) uncertainties and/or disturbances in the controlled system, using explicit linearization-based propagation equations for the discrete-time or discretized nonlinear system dynamics. In some embodiments of the invention, the discrete-time or discretized nonlinear system dynamics can be represented as $x_{k+1}=f(x_k, u_k, w_k)$, where $x_k, u_k$ and $w_k$ denote the state variables, the control inputs and the disturbance variables at time step $t_k$, respectively, and $x_{k+1}$ denotes the state variables at the next time step $t_{k+1}$. In some embodiments of the invention, the dynamical model of the controlled system can consist of a set of continuous-time differential equations, e.g., explicit and/or implicit ordinary differential equations (ODEs) or explicit and/or implicit differential-algebraic equations (DAEs). In some embodiments of the invention, the dynamical model of the controlled system can consist of a discretization of the set of continuous-time differential equations using a numerical integration method, e.g., using linear multistep methods, explicit or implicit Runge-Kutta methods, backward differentiation formulas or finite element methods.

The block diagram in FIG. 8B illustrates one or multiple steps of a linearization-based propagation of state mean and covariance information, e.g., including a first propagation step 845, followed by a propagation step 850 and potentially one or multiple additional propagation steps 855. The propagation procedure is based on an initial state estimate $s_0=\hat{x}_t$ and an initial state uncertainty, which can be represented by the state covariance $\hat{P}_t$ and/or by its Cholesky factor $L_0^x = \text{chol}(\hat{P}_t)$ such that $\hat{P}_t = L_0^x L_0^{x^T}$ or $\hat{P}_t = L_0^{x^T} L_0^x$, using either a forward or reverse Cholesky factorization, according to some embodiments of the invention. Given the initial state estimate and uncertainty 240, and given the modeling uncertainty and/or (time-varying) disturbance $w_0 \sim \mathcal{N}(0, \Sigma_0)$ 841 and given the differentiation-based constraint Jacobian matrices 842, the explicit linearization-based propagation equations can compute an approximation to the state mean and covariance information, $s_1$ and $P_1 = L_1^x L_1^{x^T}$ at the next time step 845 as follows $$L_1^x = \text{chol}(\tilde{A}_0 L_0^x L_0^{x^T} \tilde{A}_0^T + \tilde{B}_0 \Sigma_0 \tilde{B}_0^T + \delta \mathbb{1}),$$

$$s_1 = f(s_0, u_0 + K s_0, 0), P_1 = L_1^x L_1^{x^T} \succ 0$$

and the constraint Jacobian matrices 242 are defined as follows $$\tilde{A}_0 = \frac{\partial f}{\partial x}(s_0, u_0 + K s_0, 0),$$

$$\tilde{B}_0 = \frac{\partial f}{\partial w}(s_0, u_0 + K s_0, 0),$$

where the matrix K denotes a feedback gain matrix to pre-stabilize the nonlinear system dynamics and chol(•) represents a forward or reverse Cholesky factorization. Some embodiments of the invention are based on the realization that a small regularization parameter value $\delta > 0$ can be used to ensure that the Cholesky factorization operator can be defined everywhere, i.e., to ensure that a positive semi-definite matrix becomes positive definite, and to ensure that the Cholesky factorization operator can be differentiated to evaluate first and/or higher order derivatives for the implementation of the stochastic predictive controller in some embodiments of the invention.

Similarly, given the state mean and covariance information, $s_1$ and $P_1 = L_1^x L_1^{x^T}$ at one time step 845, and given the modeling uncertainty and/or (time-varying) disturbance $w_1 \sim \mathcal{N}(0, \Sigma_1)$ 851 and given the differentiation-based constraint Jacobian matrices 852, the explicit linearization-based propagation equations can compute an approximation to the state mean and covariance information, $s_2$ and $P_2 = L_2^x L_2^{x^T}$ at the next time step 850 as follows $$L_2^x = \text{chol}(\tilde{A}_1 L_1^x L_1^{x^T} \tilde{A}_1^T + \tilde{B}_1 \Sigma_1 \tilde{B}_1^T + \delta \mathbb{1}),$$

$$s_2 = f(s_1, u_1 + K s_1, 0), P_2 = L_2^x L_2^{x^T} \succ 0$$

where the constraint Jacobian matrices 852 are defined as follows $$\tilde{A}_0 = \frac{\partial f}{\partial x}(s_1, u_1 + K s_1, 0),$$

$$\tilde{B}_0 = \frac{\partial f}{\partial w}(s_1, u_1 + K s_1, 0),$$

Finally, one or multiple additional steps 855 can be performed in the discrete-time or discretized propagation of state mean and covariance information, using explicit linearization-based propagation equations for the discrete-time or discretized nonlinear system dynamics, according to some embodiments of the invention.

Figure 8C:
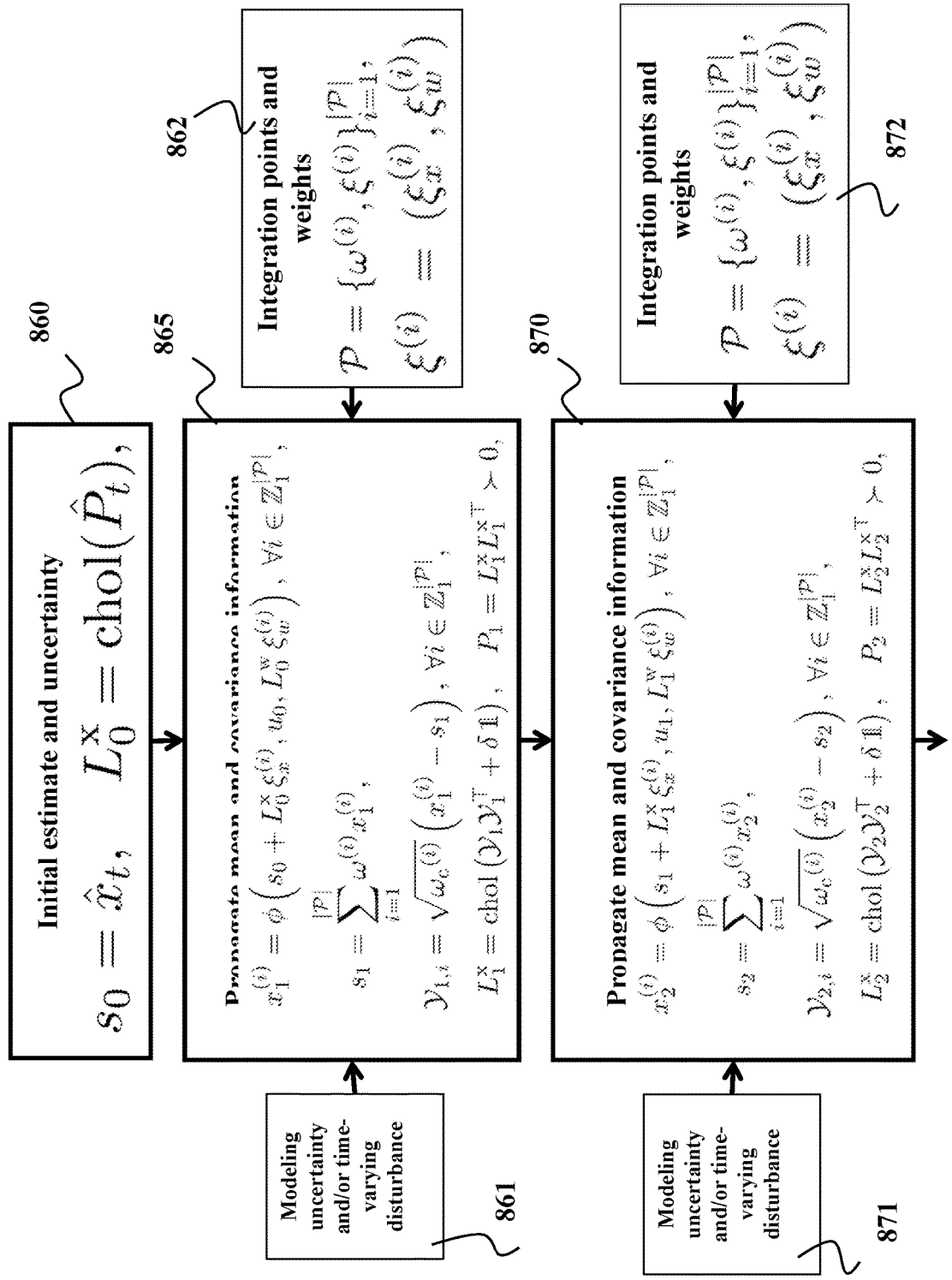
FIG. 8C shows a block diagram of a discrete-time or discretized propagation of state mean and covariance information according to another embodiment.

FIG. 8C shows a block diagram of a discrete-time or discretized propagation of state mean and covariance information, given an initial state estimate and corresponding uncertainty 860 and given a Gaussian approximation of the PDF distribution for the (time-varying) uncertainties and/or disturbances in the controlled system, using statistical linearization-based propagation equations for the discrete-time or discretized nonlinear system dynamics. Some embodiments of the invention are based on the realization that assumes density filters use a statistical linearization, based on approximated matching of one and/or multiple higher-order moment integrals, instead of an explicit linearization based on a Taylor series approximation (e.g., in the EKF). For example, in some embodiments of the invention, numerical integration or cubature rules can be used in assumed density filters to approximate the first and/or second-order moment integrals $$\mathbb{E}[x_{k+1}] = \int_{\mathbb{R}^n} F(v) p(v) dv,$$

$$\text{Cov}[x_{k+1}] = \int_{\mathbb{R}^n} (F(v) - \mathbb{E}[\cdot])(F(v) - \mathbb{E}[\cdot])^T p(v) dv,$$

given a Gaussian approximation $$p(v) \approx \mathcal{N}\left(\begin{bmatrix} \mathbb{E}[x_k] \\ 0 \end{bmatrix}, \begin{bmatrix} \text{Cov}[x_k] & 0 \\ 0 & \Sigma_k \end{bmatrix}\right)$$

of the PDF for the variables v=(x,w), which denotes the concatenation of the state x and disturbance variables w, and the function $F(v) = f(x,u,w)$ represents the discrete-time or discretized nonlinear system dynamics. In some embodiments of the invention, ADF-type moment matching is used to compute approximations of the mean $s_{k+1} \approx \mathbb{E}[x_{k+1}]$ and of the covariance $P_{k+1} \approx \text{Cov}[x_{k+1}]$, resulting in a Gaussian approximation of the conditional PDF $$p(x_{k+1}|x_k) \approx \mathcal{N}(s_{k+1}, P_{k+1})$$

where $\mathcal{N}(\cdot)$ denotes a standard normal or Gaussian distribution for the predicted state variable $x_{k+1}$ at the next time step k+1.

Some embodiments of the invention are based on the realization that unscented Kalman filtering (UKF) can be used to compute a more accurate propagation of mean and covariance information than an explicit linearization-based propagation of mean and covariance information, e.g., using extended Kalman filtering (EKF), for nonlinear system dynamics. Some embodiments of the invention are based on the realization that UKF is a special case of a more general family of linear-regression Kalman filtering (LRKF), which is part of an even more general family of Gaussian-assumed density filters (ADF) that can be used in an implementation of the stochastic predictive controller for the controlled system under uncertainty. Some embodiments of the invention are based on the realization that ADFs use a statistical linearization, based on approximated matching of one and/or multiple higher order moment integrals, instead of an explicit linearization based on a Taylor series approximation (e.g., in the EKF). Therefore, the EKF is a first-order method based on explicit linearization to handle nonlinearities, while the family of ADFs based on statistical linearization can achieve second or higher order of accuracy in the discrete-time or discretized propagation of mean and covariance information of the state variables through the nonlinear system dynamics.

Some embodiments of the invention are based on the realization that, for certain classes of problems, statistical linearization based on matching of one and/or multiple higher order moment integrals can be performed analytically, which further improves the accuracy of the propagation of mean and covariance information and therefore further improves the performance of the stochastic predictive controller for the controlled system under uncertainty.

The block diagram in FIG. 8C illustrates an example of one or multiple steps of a statistical linearization-based propagation of state mean and covariance information using ADFs, e.g., including a first propagation step 865, followed by a propagation step 870 and potentially one or multiple additional propagation steps 875. The propagation procedure is based on an initial state estimate $s_0 = \hat{x}_t$ and an initial state uncertainty 860, which can be represented by the state covariance $\hat{P}_t$ and/or by its Cholesky factor $L_0^x = \text{chol}(\hat{P}_t)$ such that $\hat{P}_t = L_0^x L_0^{xT}$ or $\hat{P}_t = L_0^{xT} L_0^x$, using either a forward or reverse Cholesky factorization, according to some embodiments of the invention. Given the initial state estimate and uncertainty 860, and given the modeling uncertainty and/or (time-varying) disturbance $w_0 \sim \mathcal{N}(0, \Sigma_0)$ 861, for which $\Sigma_0 = L_0^w L_0^{wT}$ or $\Sigma_0 = L_0^{wT} L_0^w$ based on a Cholesky factorization, and given a set of one or multiple integration points and corresponding weights $\mathcal{P} = \{\omega^{(i)}, \xi^{(i)}\}_{i=1}^{|\mathcal{P}|}$ 862, the statistical linearization-based propagation equations can compute an approximation of the state mean and covariance information, $s_1$ and $P_1 = L_1^x L_1^{xT}$ at the next time step 865 as $$x_1^{(i)} = \phi(s_0 + L_0^x \xi_x^{(i)}, u_0, L_0^w \xi_w^{(i)}), \forall i \in \mathbb{Z}_1^{|\mathcal{P}|},$$

$$s_1 = \sum_{i=1}^{|\mathcal{P}|} \omega^{(i)} x_1^{(i)},$$

$$y_{1,i} = \sqrt{\omega_c^{(i)}} (x_1^{(i)} - s_1), \forall i \in \mathbb{Z}_1^{|\mathcal{P}|},$$

$$L_1^x = \text{chol}(y_1 y_1^T + \delta \mathbb{I}), P_1 = L_1^x L_1^{xT} \succ 0,$$

where the function $\phi(s_k, u_k, w_k) = f(s_k, u_k + K s_k, w_k)$ denotes the pre-stabilized nonlinear system dynamics that are evaluated at each of the integration points $\xi^{(i)} = (\xi_x^{(i)}, \xi_x^{(i)})$ to compute the state values $x_1^{(i)}$ for $i = 1, 2, \ldots, |\mathcal{P}|$, the matrix K denotes a feedback gain matrix and $\text{chol}(\cdot)$ represents a forward or reverse Cholesky factorization. Some embodiments of the invention are based on the realization that the computed state values $x_1^{(i)}$ for each of the integration points, together with the corresponding weight values $\omega^{(i)}$ for $i = 1, 2, \ldots, |\mathcal{P}|$, can be used to compute an approximation of the state mean and covariance information, i.e., $s_1 \approx \mathbb{E}[x_1]$ and $P_1 \approx \text{Cov}[x_1]$. In some embodiments of the invention, the additional weight values $\omega_c^{(i)}$ are computed as $\omega_c^{(1)} = \omega^{(1)} + (1 - \gamma^2 + \beta)$ for a central integration point $i = 1$ and given parameter values $\gamma$ and $\beta$, and $\omega_c^{(i)} = \omega^{(i)}$ corresponding to the remaining integration points $i = 2, 3, \ldots, |\mathcal{P}|$.

Similarly, given the state mean and covariance information, $s_1$ and $P_1 = L_1^x L_1^{xT}$ at one time step 865, and given the modeling uncertainty and/or (time-varying) disturbance $w_1 \sim \mathcal{N}(0, \Sigma_1)$ 271, for which $\Sigma_1 = L_1^w L_1^{wT}$ or $\Sigma_1 = L_1^{wT} L_1^w$ based on a Cholesky factorization, and given a set of one or multiple integration points and corresponding weights $\mathcal{P} = \{\omega^{(i)}, \xi^{(i)}\}_{i=1}^{|\mathcal{P}|}$ 872, the statistical linearization-based propagation equations can compute an approximation of the state mean and covariance information, $s_2$ and $P_2 = L_2^x L_2^{xT}$ at the next time step 870 as $$x_2^{(i)} = \phi(s_1 + L_1^x \xi_x^{(i)}, u_1, L_1^w \xi_w^{(i)}), \forall i \in \mathbb{Z}_1^{|\mathcal{P}|},$$

$$s_2 = \sum_{i=1}^{|\mathcal{P}|} \omega^{(i)} x_2^{(i)},$$

$$y_{2,i} = \sqrt{\omega_c^{(i)}} (x_2^{(i)} - s_2), \forall i \in \mathbb{Z}_1^{|\mathcal{P}|},$$

$$L_2^x = \text{chol}(y_2 y_2^T + \delta \mathbb{I}), P_2 = L_2^x L_2^{xT} \succ 0,$$

Finally, one or multiple additional steps 875 can be performed in the discrete-time or discretized propagation of state mean and covariance information, using statistical linearization-based propagation equations for the discrete-time or discretized nonlinear system dynamics of the controlled system under uncertainty, according to some embodiments of the invention. In some embodiments of the invention, a different set of integration points and weights can be used in one or multiple steps of the statistical linearization-based propagation equations.

In some embodiments of the invention, the integration points, weights and parameter values can be chosen according to a spherical cubature (SC) rule to approximate the first and/or second order moment integrals, based on a set of $|\mathcal{P}| = 2n = 2(n_x + n_w)$ integration points $\Xi = [\xi^{(1)}, \xi^{(2)}, \ldots, \xi^{(2n)}]$ and weights $\Omega = [\omega^{(1)}, \omega^{(2)}, \ldots, \omega^{(2n)}]$ as follows $$\Xi = \sqrt{n} [\, \mathbb{I}_n \quad -\mathbb{I}_n \,], \Omega = \frac{1}{2n} 1_{2n}^T,$$

where $n_x$ and $n_w$ denotes the number of state variables and disturbance variables in the controlled system, respectively, and $\mathbb{I}_n$ denotes the n×n identity matrix, and $1_{2n}$ denotes a column vector of 2n elements that are equal to one. The SC rule does not include a central integration point, i.e., $\gamma = 1$ and $\beta = 0$, such that $\omega_c^{(i)} = \omega^{(i)}$ for each of the integration points $i = 1, 2, \ldots, |\mathcal{P}|$.

In some embodiments of the invention, the integration points, weights and parameter values can be chosen according to an unscented transform (UT) as used in the UKF to approximate the first and/or second order moment integrals, based on a set of $|\mathcal{P}| = 2n + 1 = 2(n_x + n_w) + 1$ integration points $\Xi = [\xi^{(1)}, \xi^{(2)}, \ldots, \xi^{(2n+1)}]$ and weights $\Omega = [\omega^{(1)}, \omega^{(2)}, \ldots, \omega^{(2n+1)}]$ as follows $$\Xi = \sqrt{(n+\lambda)} [\, 0_n \quad \mathbb{I}_n \quad -\mathbb{I}_n \,], \Omega = \frac{1}{\lambda + n}\left[\lambda \frac{1}{2} 1_{2n}^T\right],$$

where a parameter $\lambda = \gamma^2 (n+\kappa) - n$ is defined based on a parameter value $\kappa$, and $\mathbb{I}_n$ denotes the n×n identity matrix, $0_n$ denotes a column vector of n elements that are equal to zero and $1^{2n}$ denotes a column vector of 2n elements that are equal to one. The UT rule does include a central integration point for which $\xi^{(1)} = 0_n$ and $\omega_c^{(1)} = \omega^{(1)} + (1 - \gamma^2 + \beta)$. In some embodiments of the invention, the parameter values can be chosen, for example, as $$\gamma = \sqrt{\frac{3}{n}}, \beta = \frac{3}{n} - 1, \kappa = 0$$

such that $\lambda = \gamma^2 (n+\kappa) - n = 3 - n$.

Figure 9A:
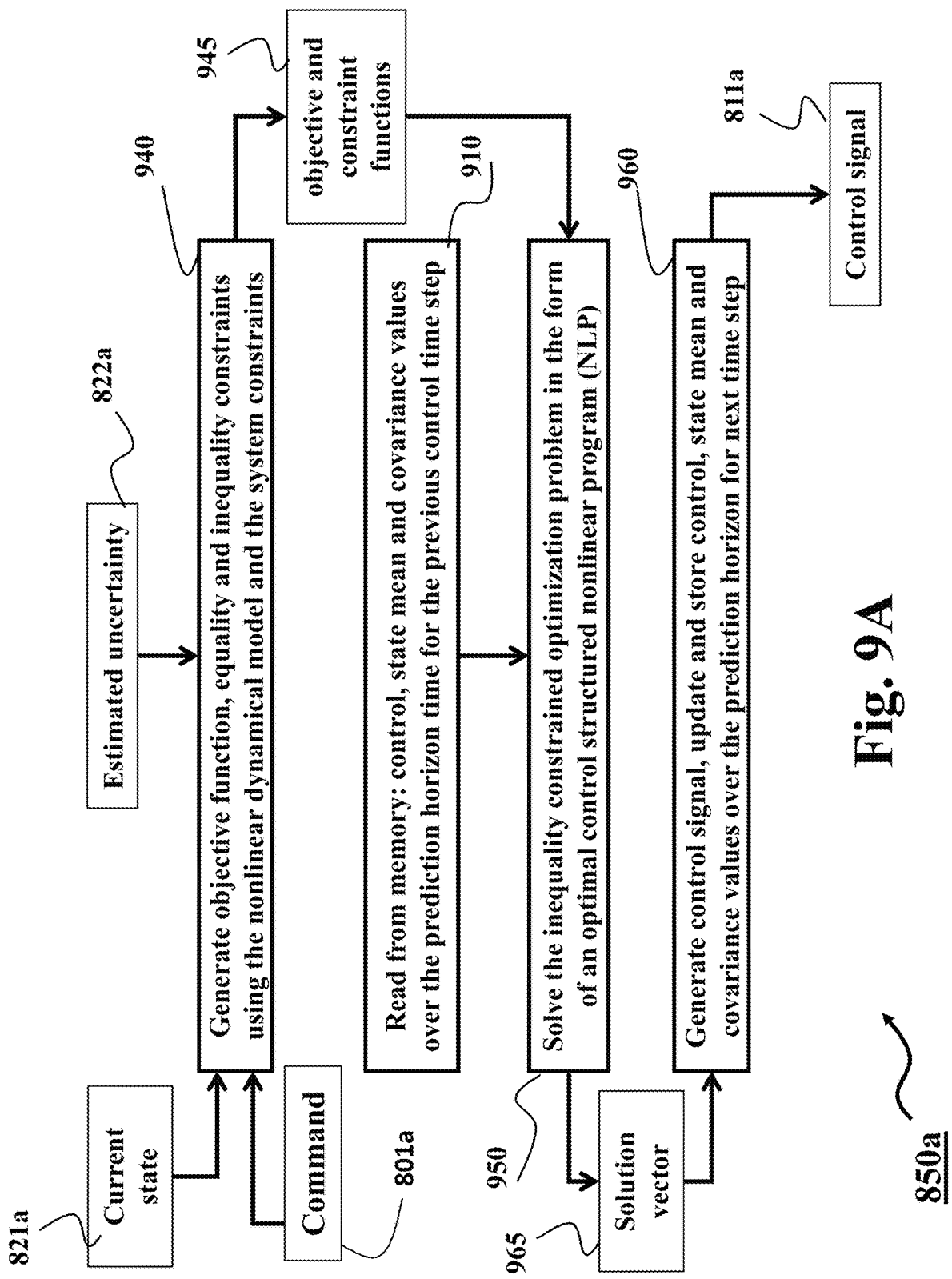
FIG. 9A shows a block diagram of a system and a method for stochastic nonlinear model predictive control (SNMPC) according to some embodiments.

FIG. 9A shows a block diagram of a system and a method for stochastic nonlinear model predictive control (SNMPC) to implement the stochastic predictive controller 850a that computes the control signal 811a, given the current state estimate of the system 821a, given the estimated uncertainty 822a and a control command 801a, according to some embodiments. Specifically, SNMPC computes a control solution, e.g., a solution vector 965 that includes a sequence of future optimal or approximately optimal control inputs over a prediction time horizon of the system 960, by solving a constrained optimization problem 950 at each control time step. The data 945 of the objective function, equality and inequality constraints in this optimization problem 950 depends on the dynamical model and system constraints 940, the current state estimate of the system 821a, the estimated uncertainty 822a and the control command 801a.

Embodiments of the invention use a direct optimal control method to formulate the continuous-time SNMPC problem as an inequality constrained nonlinear dynamic optimization problem. Some embodiments of the invention use a derivative-based optimization algorithm to solve the inequality constrained optimization problem 950 either exactly or approximately, using an iterative procedure that is based on a Newton-type method and the successive linearization of feasibility and optimality conditions for the optimization problem. Examples of such Newton-type optimization algorithms include interior point methods (IPM) and sequential quadratic programming (SQP). Some embodiments of the invention are based on the realization that the inequality constrained optimization problem 950 has the form of an optimal control structured nonlinear program (NLP), such that a structure exploiting implementation of a derivative-based optimization algorithm can be used to compute the solution vector 965 at each control time step.

In some embodiments of the invention, the solution of the inequality constrained optimization problem 950 uses the exact or approximate control inputs, state mean and/or covariance values over the prediction time horizon from the previous control time step 910, which can be read from the memory, as a solution guess in order to reduce the computational effort of solving the inequality constrained optimization problem 950 at the current control time step. This concept of computing a solution guess from the solution information at the previous control time step 910 is called warm-starting or hot-starting of the optimization algorithm and it can reduce the required computational effort of the SNMPC controller in some embodiments of the invention. In a similar fashion, the corresponding solution vector 965 can be used to update and store a sequence of exact or approximate control inputs, state mean and/or covariance values for the next control time step 960. In some embodiments of the invention, a time shifting procedure can be used, given the control inputs, state mean and/or covariance values over the prediction time horizon from the previous control time step 910, in order to compute a more accurate solution guess for the inequality constrained optimization problem 950 at the current control time step.

Figure 9B:
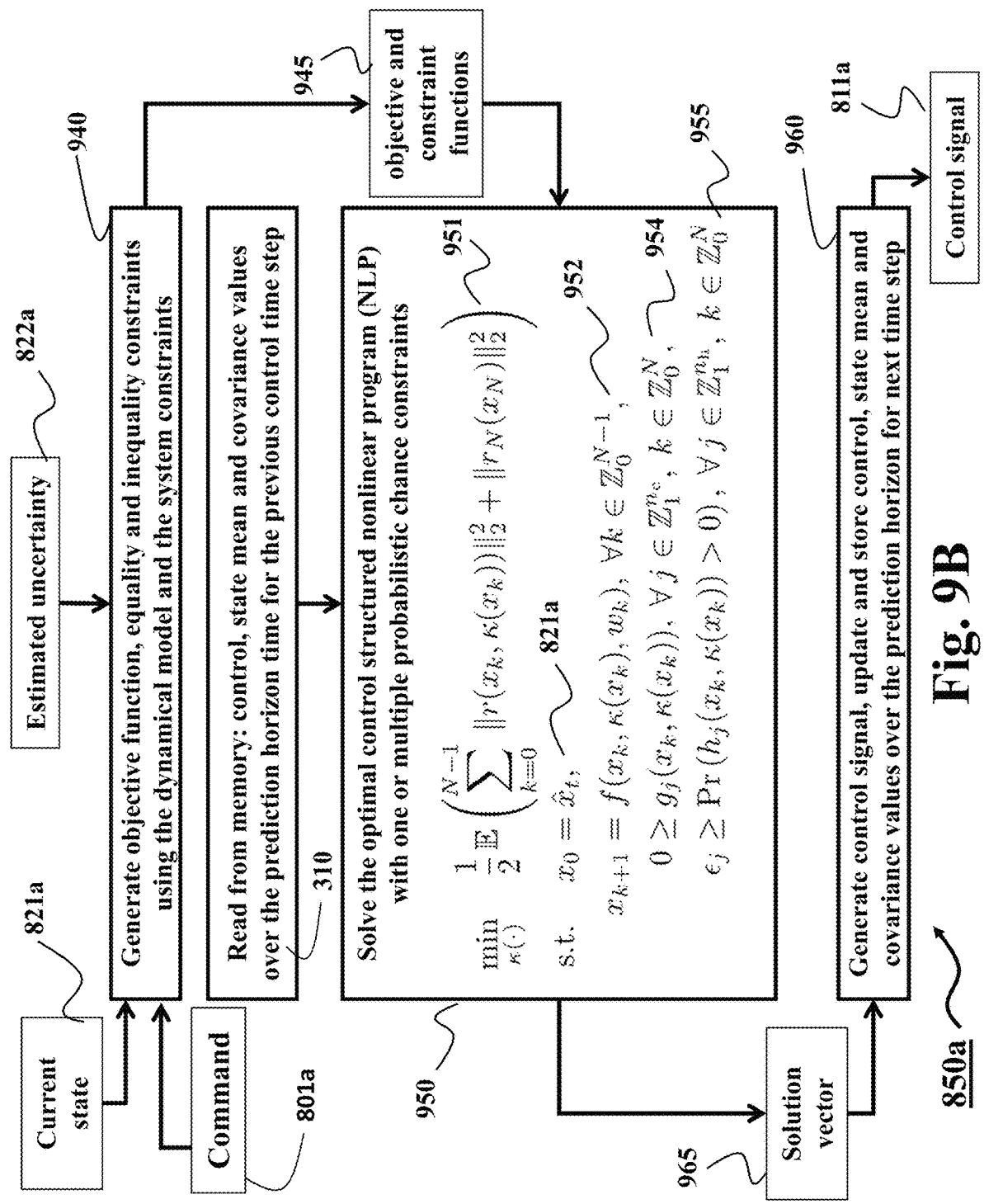
FIG. 9B shows a block diagram of an SNMPC controller that solves a constrained optimal control structured nonlinear program (OCP-NLP) according to one embodiment.

FIG. 9B shows a block diagram of an SNMPC controller that solves a constrained optimal control structured nonlinear program (OCP-NLP) 950 according to some embodiments in order to compute the control signal 811a at each control time step, given the current state estimate of the system 821a, the estimated uncertainty 822a and the control command 801a. In some embodiments of the invention, the constrained optimization problem 950 directly optimizes a time-invariant or time-varying control policy function $\kappa(\cdot)$, which can be implemented as a state-feedback or as an output-feedback predictive controller for the controlled system under uncertainty. In some embodiments of the invention, the constrained OCP-NLP 950 includes the state variables $x = [x_0, x_1, \ldots, x_N]$, where the initial state value can be defined based on the current state estimate $x_0 = \hat{x}_t$ 821a and the future state values can be predicted based on nonlinear system dynamics $f(\cdot)$ in the nonlinear equality constraints 952, depending on the control policy function $\kappa(\cdot)$ and the time-varying uncertainties and/or disturbances $w_k$ over the prediction time horizon $k = 0, 1, \ldots, N-1$.

In some embodiments of the invention, the objective function for the constrained OCP-NLP 950 can correspond to a minimization of the expected value of a sum of linear and/or nonlinear least squares stage and/or terminal cost terms $\|r_k(\cdot)\|_2^2$ for $k = 0, 1, \ldots, N$ 951. In some embodiments of the invention, the objective function 951 can correspond to a minimization or maximization of the expected value or of a worst-case value for a smooth linear or nonlinear function of the control inputs, state mean and/or covariance values over the prediction time horizon.

In some embodiments of the invention, the constrained OCP-NLP 950 can include one or multiple deterministic inequality constraints $0 \geq g_j(\cdot)$, $j = 1, 2, \ldots, n_c$ 954 that are defined by smooth linear and/or nonlinear functions g 0 of the control inputs, state mean and/or covariance values over the prediction time horizon $k = 0, 1, \ldots, N$. Some embodiments of the invention are based on the realization that one or multiple of the deterministic inequality constraints 954 can be either convex or non-convex, which may affect the computational effort that is needed to solve the constrained optimization problem 950 at each control time step. In some embodiments of the invention, the constrained OCP-NLP 950 can include one or multiple probabilistic chance constraints $\epsilon_j \geq \Pr(h_j(\cdot) > 0)$, $j = 1, 2, \ldots, n_h$ 955 that are defined by smooth linear and/or nonlinear functions $h_j(\ )$ of the control inputs, state mean and/or covariance values over the prediction time horizon $k = 0, 1, \ldots, N$. Some embodiments of the invention are based on the realization that each of the probabilistic chance constraints aims to ensure that the probability of violating the corresponding inequality constraint is below a certain probability threshold value, i.e., $\epsilon_j \geq \Pr(h_j(\cdot) > 0)$ 955.

Figure 9C:
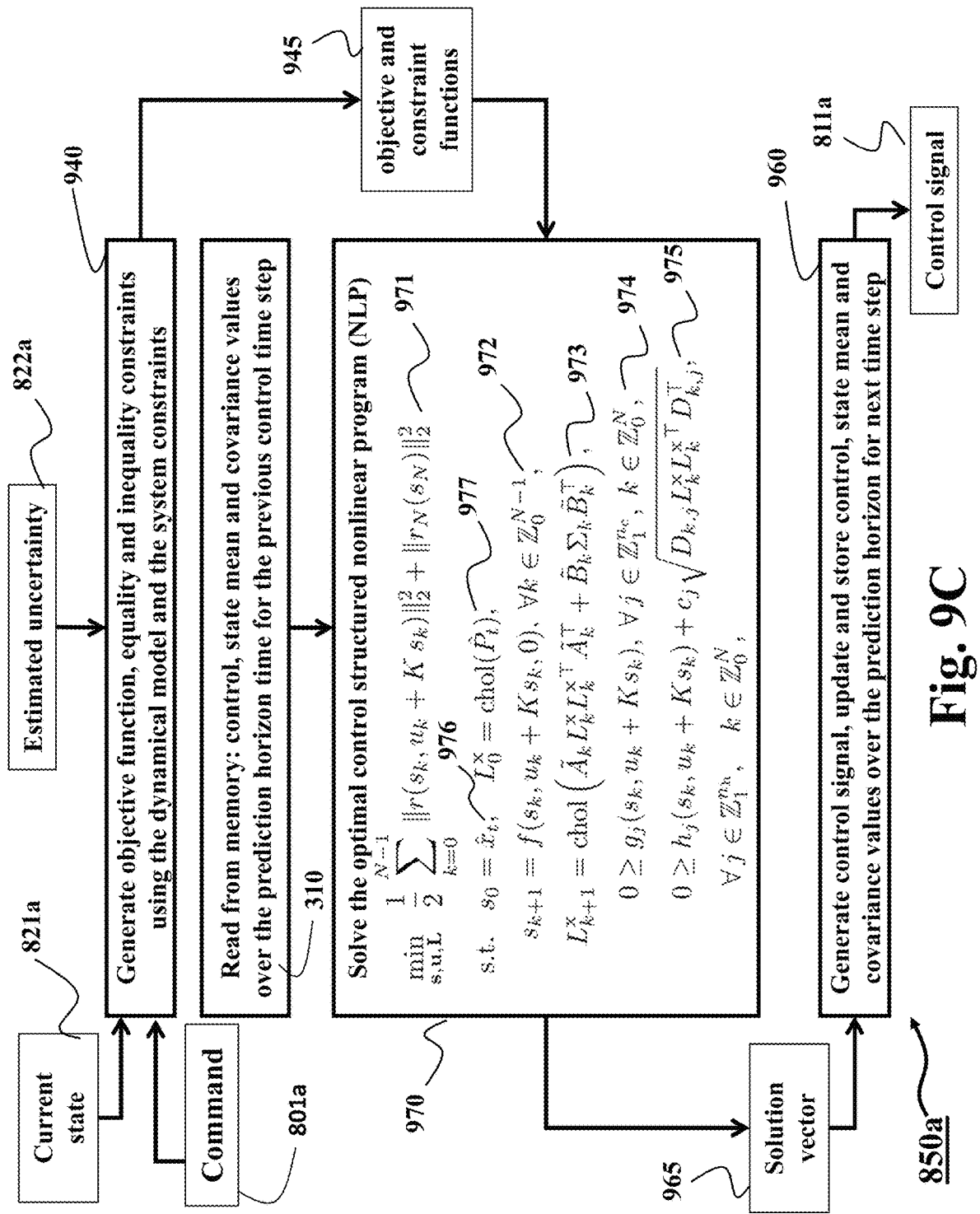
FIG. 9C shows a block diagram of an SNMPC controller that solves a constrained optimal control structured nonlinear program (OCP-NLP) according to another embodiment.

FIG. 9C shows a block diagram of an SNMPC controller that solves a constrained optimal control structured nonlinear programming problem (OCP-NLP) 970, using explicit linearization-based state mean and covariance propagation equations, in order to compute the control signal 811a at each control time step, given the current state estimate of the system 821a, the estimated uncertainty 822a and the control command 801a. The OCP-NLP 970 includes the mean state variables $s = [s_0, s_1, \ldots, s_N]$, the Cholesky factors of the state covariance matrix variables $L = [L_0^x, L_1^x, \ldots, L_N^x]$ and the control input variables $u = [u_0, u_1, \ldots, u_{N-1}]$ over the prediction time horizon as variables in the constrained optimization problem 950 that needs to be solved at each control time step:

$$\min_{s,u,L} \frac{1}{2} \sum_{k=0}^{N-1} \|r(s_k, u_k + Ks_k)\|_2^2 + \|r_N(s_N)\|_2^2$$

-continued s.t. $s_0 = \hat{x}_t$, $L_0^x = chol(\hat{P}_t)$, $s_{k+1} = f(s_k, u_k + Ks_k, 0)$, $\forall k \in \mathbb{Z}_0^{N-1}$, $L_{k+1}^x = chol\left(\tilde{A}_k L_k^x L_k^{xT} \tilde{A}_k^T + \tilde{B}_k \sum_k \tilde{B}_k^T\right)$, $0 \geq g_j(s_k, u_k + Ks_k)$, $\forall j \in \mathbb{Z}_1^{n_c}, k \in \mathbb{Z}_0^N$, $0 \geq h_j(s_k, u_k + Ks_k) + c_j \sqrt{D_{k,j} L_k^x L_k^{xT} D_{k,j}^T}$, $\forall j \in \mathbb{Z}_1^{n_h}, k \in \mathbb{Z}_0^N$, including a linear-quadratic or nonlinear objective function 971, e.g., based on a minimization of the expected value of a sum of linear and/or nonlinear least squares stage and/or terminal cost terms $\|r_k(\bullet)\|_2^2$ for k=0, 1, ..., N 971. Some embodiments of the invention are based on the current state estimate 821a in an initial mean state value constraint $s_0=\hat{x}_t$ 976, the current estimated state uncertainty in an initial state covariance constraint $L_0^x=chol(\hat{P}_t)$ 977, such that the initial state covariance reads as $P_0=\hat{P}_t=L_0^x L_0^{xT}$. Some embodiments of the invention are based on a dynamical model of the system that results in linear and/or nonlinear equality constraints 972 to compute the future mean state values over the prediction time horizon $s_1, \ldots, s_N$, and on an explicit linearization-based approximation of the uncertainty propagation through the system dynamics resulting in linear and/or nonlinear covariance propagation equations 973. In some embodiments of the invention, the covariance propagation equations 973 include a Cholesky factorization operator in order to compute the Cholesky factors for the future state covariance matrices $L_1^x, \ldots, L_N^x$, such that $P_1=L_1^x L_1^{xT}, \ldots, P_N=L_N^x L_N^{xT}$.

In some embodiments, the constrained optimization problem 370 can include constraints on a combination of control inputs, state mean and covariance variables, resulting in one or multiple linear and/or nonlinear deterministic inequality constraints 974 that are defined by smooth linear and/or nonlinear functions $g_j(\ )$ over the prediction time horizon k=0, 1, ..., N. In addition, the constrained OCP-NLP 950 can include one or multiple probabilistic chance constraints $\epsilon_j \geq Pr(h_j(\bullet)>0), j=1, 2, \ldots, n_h$ 955 that are defined by smooth linear and/or nonlinear functions $h_j(\ )$ of the control inputs, state mean and/or covariance values over the prediction time horizon k=0, 1, ..., N. In some embodiments of the invention, the latter probabilistic chance constraints can be approximated by a constraint tightening reformulation as follows $0 \geq h_j(s_k, u_k+Ks_k) + c_j \sqrt{D_{k,j} L_k^x L_k^{xT} D_{k,j}^T}$ where a back-off coefficient value $c_j>0$ is computed based on the probability threshold value $\epsilon_j>0$, the matrix $$D_{k,j} = \frac{\partial h_j}{\partial x_k}(\cdot)$$

is the constraint Jacobian, based on Cholesky factors of the state covariance matrix variables $L=[L_0^x, L_1^x, \ldots, L_N^x]$ and resulting in the additional linear and/or nonlinear tightened inequality constraints 375 over the prediction time horizon k=0, 1, ..., N.

In some embodiments of the invention, the nonlinear equality constraints 972

$s_{k+1}=f(s_k, u_k+Ks_k, 0)$ impose a discrete-time, approximate representation of the system dynamics that can be defined by a set of continuous time differential or a set of continuous time differential-algebraic equations. Examples of such a discrete-time, approximate representation of the system dynamics includes numerical simulation techniques, e.g., linear multistep methods, explicit or implicit Runge-Kutta methods, backward differentiation formulas or finite element methods. When the original dynamical model of the system is described by a set of continuous time differential equations, some embodiments of the invention discretize the system dynamics using an explicit or implicit numerical integration method 972 and the explicit linearization requires a corresponding Jacobian evaluation to construct the discrete-time or discretized covariance propagation equations 973.

Figure 9D:
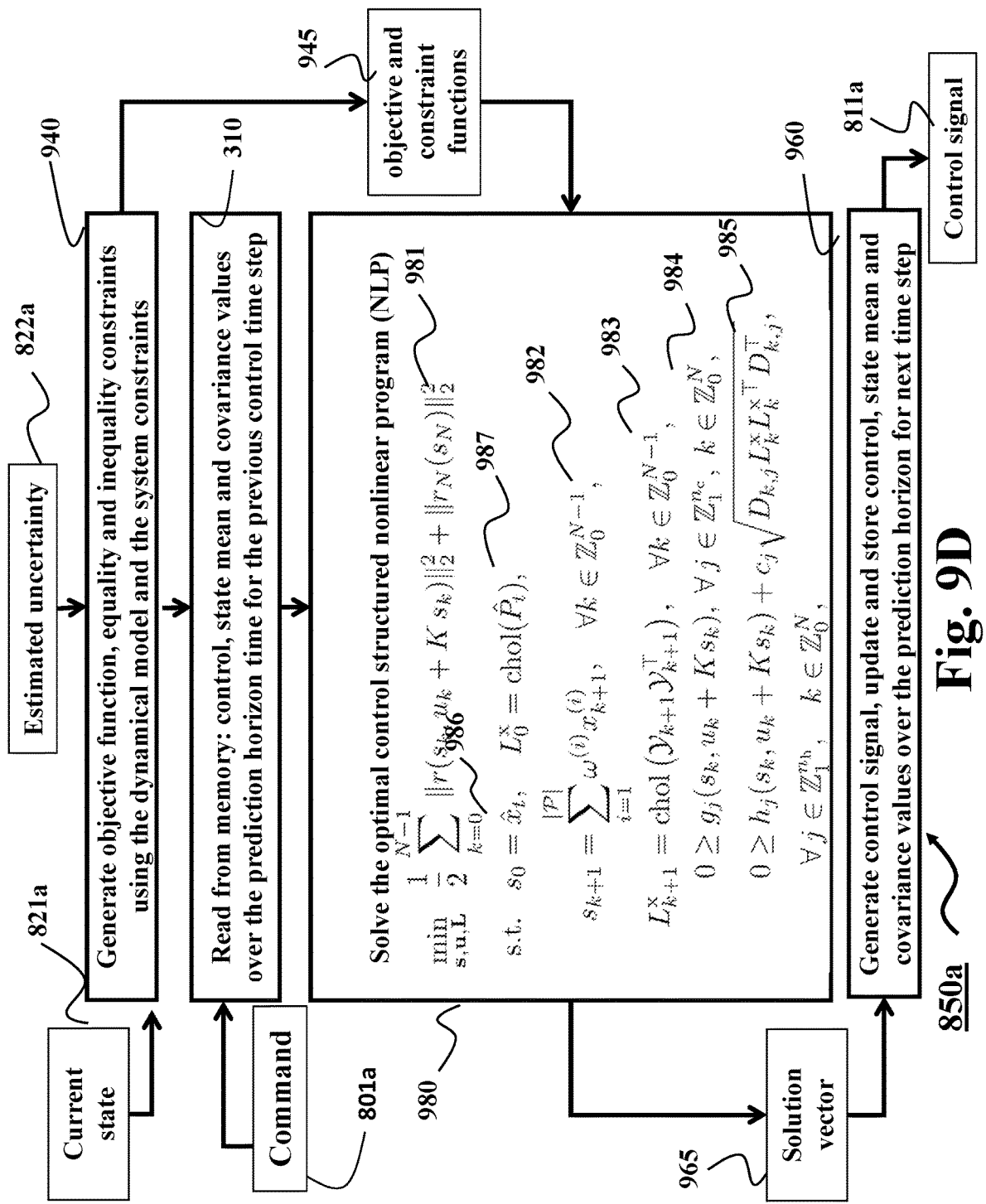
FIG. 9D shows a block diagram of an SNMPC controller that solves a constrained optimal control structured nonlinear programming problem (OCP-NLP) using statistical linearization-based state mean and covariance propagation according to some embodiments.

FIG. 9D shows a block diagram of an SNMPC controller that solves a constrained optimal control structured nonlinear programming problem (OCP-NLP) 380, using statistical linearization-based state mean and covariance propagation (e.g., using unscented Kalman filter, linear-regression Kalman filter or assumed density filter-based filtering), in order to compute the control signal 811a at each control time step, given the current state estimate of the system 821a, the estimated uncertainty 822a and the control command 101. The OCP-NLP 980 includes the mean state variables $s=[s_0, s_1, \ldots, s_N]$, the Cholesky factors of the state covariance matrix variables $L=[L_0^x, L_1^x, \ldots, L_N^x]$ and the control input variables $u=[u_0, u_1, \ldots, u_{N-1}]$ over the prediction time horizon as variables in the constrained optimization problem 950 that needs to be solved at each control time step:

$$\min_{s,u,L} \frac{1}{2} \sum_{k=0}^{N-1} \|r(s_k, u_k + Ks_k)\|_2^2 + \|r_N(s_N)\|_2^2$$

s.t. $s_0 = \hat{x}_t$, $L_0^x = chol(\hat{P}_t)$, $s_{k+1} = \sum_{i=1}^{|\mathcal{P}|} \omega^{(i)} x_{k+1}^{(i)}$, $\forall k \in \mathbb{Z}_0^{N-1}$, $L_{k+1}^x = chol(y_{k+1} y_{k+1}^T)$, $\forall k \in \mathbb{Z}_0^{N-1}$, $0 \geq g_j(s_k, u_k + Ks_k)$, $\forall j \in \mathbb{Z}_1^{n_c}, k \in \mathbb{Z}_0^N$, $0 \geq h_j(s_k, u_k + Ks_k) + c_j \sqrt{D_{k,j} L_k^x L_k^{xT} D_{k,j}^T}$, $\forall j \in \mathbb{Z}_1^{n_h}, k \in \mathbb{Z}_0^N$, including a linear-quadratic or nonlinear objective function 981, e.g., based on a minimization of the expected value of a sum of linear and/or nonlinear least squares stage and/or terminal cost terms $\|r_k(\bullet)\|_2^2$ for k=0, 1, ..., N 981. Some embodiments of the invention are based on the current state estimate 821a in an initial mean state value constraint $s_0=\hat{x}_t$ 986, the current estimated state uncertainty in an initial state covariance constraint $L_0^x=chol(\hat{P}_t)$ 987, such that the initial state covariance reads as $P_0=\hat{P}_t=L_0^x L_0^{xT}$.

In some embodiments of the invention, an assumed density filter based filtering technique is used, e.g., based on the spherical cubature (SC) rule or the unscented transform (UT) in the family of linear-regression Kalman filters, to compute the state values $x_{k+1}^{(i)}$ at each of the integration points $\Xi=[\xi^{(1)}, \xi^{(2)}, \ldots, \xi^{(|\mathcal{P}|)}]$, where $\xi^{(i)}=(\xi_x^{(i)}, \xi_w^{(i)})$, and using the corresponding weights $\Omega=[\omega^{(1)}, \omega^{(2)}, \ldots, \omega^{(|\mathcal{P}|)}]$, as follows $x_{k+1}^{(i)}=\phi(s_k+L_k^x \xi_x^{(i)}, u_k, L_k^w \xi_w^{(i)})$ for $i=1,2, \ldots, |\mathcal{P}|$ $Y_{k+1,i}=\sqrt{\omega_c^{(i)}}(x_{k+1}^{(i)}-s_{k+1})$ for $i=1,2, \ldots, |\mathcal{P}|$ where $Y_{k+1,i}$ denotes the $i^{th}$ column of the matrix $Y_{k+1}$ for each of the integration points $i=1, 2, \ldots, |\mathcal{P}|$ over the prediction time horizon $k=0, 1, \ldots, N-1$, and the function $\phi(\bullet)$ denotes the pre-stabilized dynamical model of the controlled system under uncertainty. The statistical linearization-based state mean and covariance propagation equations result in linear and/or nonlinear equality constraints 982 to compute the future mean state values over the prediction time horizon $s_1, \ldots, s_N$, and they result in linear and/or nonlinear covariance propagation equations 983, including a Cholesky factorization operator in order to compute the Cholesky factors for the future state covariance matrices $L_1^x, \ldots, L_N^x$.

In some embodiments of the invention, the constrained optimization problem 380 can include constraints on a combination of control inputs, state mean and covariance variables, resulting in one or multiple linear and/or nonlinear deterministic inequality constraints 984 that are defined by smooth linear and/or nonlinear functions $g_j(\ )$ over the prediction time horizon $k=0, 1, \ldots, N$. In addition, the constrained OCP-NLP 350 can include one or multiple probabilistic chance constraints $\in_j \geq \Pr(h_j(\bullet)>0)$, $j=1, 2, \ldots, n_h$ 955 that are defined by smooth linear and/or nonlinear functions $h_j(\ )$ of the control inputs, state mean and/or covariance values over the prediction time horizon $k=0, 1, \ldots, N$. In some embodiments of the invention, the latter probabilistic chance constraints can be approximated by a constraint tightening reformulation as follows $$0 \geq h_j(s_k, u_k + Ks_k) + c_j \sqrt{D_{k,j} L_k^x L_k^{x^T} D_{k,j}^T}$$

where a back-off coefficient value $c_j > 0$ is computed based on the probability threshold value $\in_j > 0$, the matrix $$D_{k,j} = \frac{\partial h_j}{\partial x_k}$$

$(\bullet)$ is the constraint Jacobian, based on Cholesky factors of the state covariance matrix variables $L=[L_0^x, L_1^x, \ldots, L_N^x]$ and resulting in the additional linear and/or nonlinear tightened inequality constraints 985 over the prediction time horizon $k=0, 1, \ldots, N$.

Using an approximate formulation 975 or 985 of the probabilistic chance constraints 955, based on an individual tightening for each of the inequality constraints, the resulting inequality constrained nonlinear dynamic optimization problem can be solved using a Newton-type optimization algorithm that is based on successive linearization of the optimality and feasibility conditions. Examples of such Newton-type optimization algorithms include interior point methods (IPM) and sequential quadratic programming (SQP). Some embodiments of the invention are based on the realization that an SQP algorithm solves a quadratic program (QP) approximation for the stochastic nonlinear OCP at each iteration of the SQP optimization algorithm, based on a linear-quadratic approximation of the objective function and a linearization-based approximation for the discretized system dynamics and the discrete-time covariance propagation equations and a linearization-based approximation for each of the inequality constraints and for each of the tightened probabilistic chance constraints.

In some embodiments of the invention, a stage and/or terminal cost in the objective function 951, 971 or 981 can be defined by any linear, linear-quadratic and/or nonlinear smooth function, including either convex and/or non-convex functions. The objective function 951, 971 or 981 of the stochastic optimal control problem can include a cost term corresponding to each of the time points of the prediction time horizon. In some embodiments, the objective function includes a (nonlinear) least-squares type penalization of the deviation of a certain output function of the system from a sequence of reference output values at each of the time points of the prediction time horizon, resulting in a reference tracking type formulation of the cost function in the probabilistic feedback controller 850a.

Figure 10A:
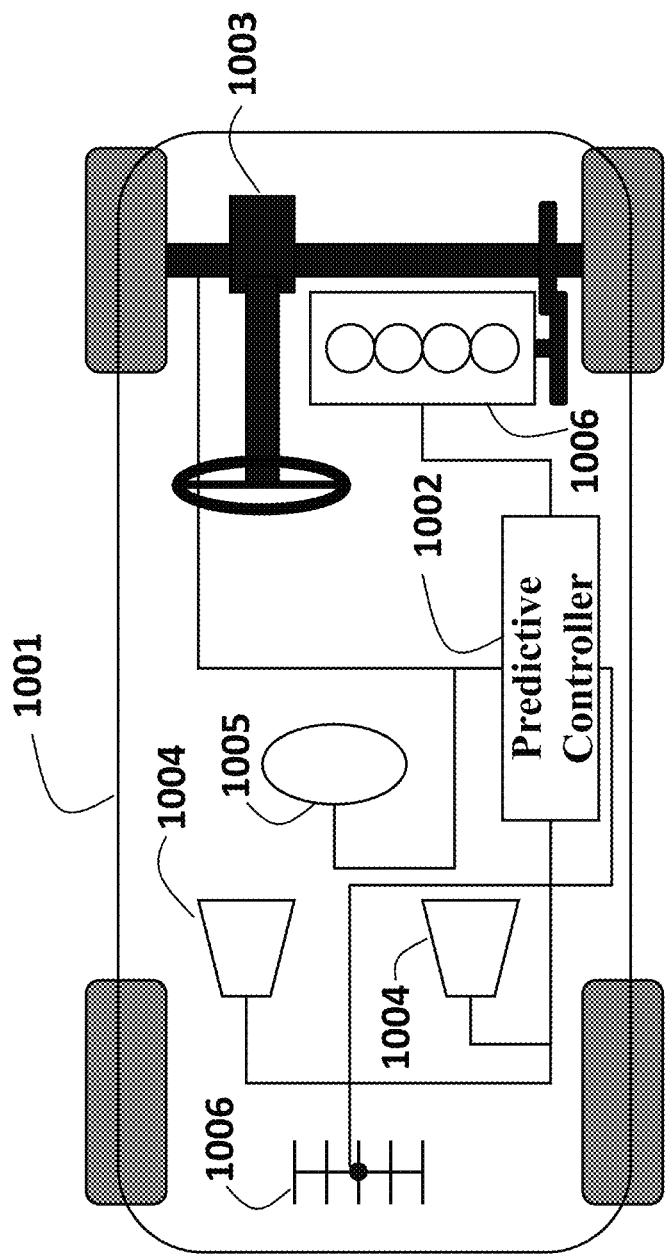
FIG. 10A shows a schematic of a vehicle including a probabilistic controller employing principles of some embodiments.

FIG. 10A shows a schematic of a vehicle 1001 including a probabilistic controller 1002 employing principles of some embodiments. As used herein, a vehicle 1001 can be any type of wheeled vehicle, such as a passenger car, bus, or rover. Also, a vehicle 1001 can be an autonomous or semi-autonomous vehicle. For example, some embodiments control the motion of the vehicle 1001. Examples of the motion include the lateral motion of the vehicle controlled by a steering system 1003 of the vehicle 1001. In one embodiment, the steering system 1003 is controlled by the controller 1002. Additionally or alternatively, the steering system 1003 can be controlled by a driver of the vehicle 1001.

The vehicle can also include an engine 1006, which can be controlled by the controller 1002 or by other components of the vehicle 1001. The vehicle can also include one or more sensors 1004 to sense the surrounding environment. Examples of the sensors 1004 include distance range finders, radars, lidars, and cameras. The vehicle 1001 can also include one or more sensors 1005 to sense its current motion quantities and internal status. Examples of the sensors 1005 include global positioning system (GPS), accelerometers, inertial measurement units, gyroscopes, shaft rotational sensors, torque sensors, deflection sensors, pressure sensor, and flow sensors. The sensors provide information to the controller 1002. The vehicle can be equipped with a transceiver 1006 enabling communication capabilities of the controller 1002 through wired or wireless communication channels.

Figure 10B:
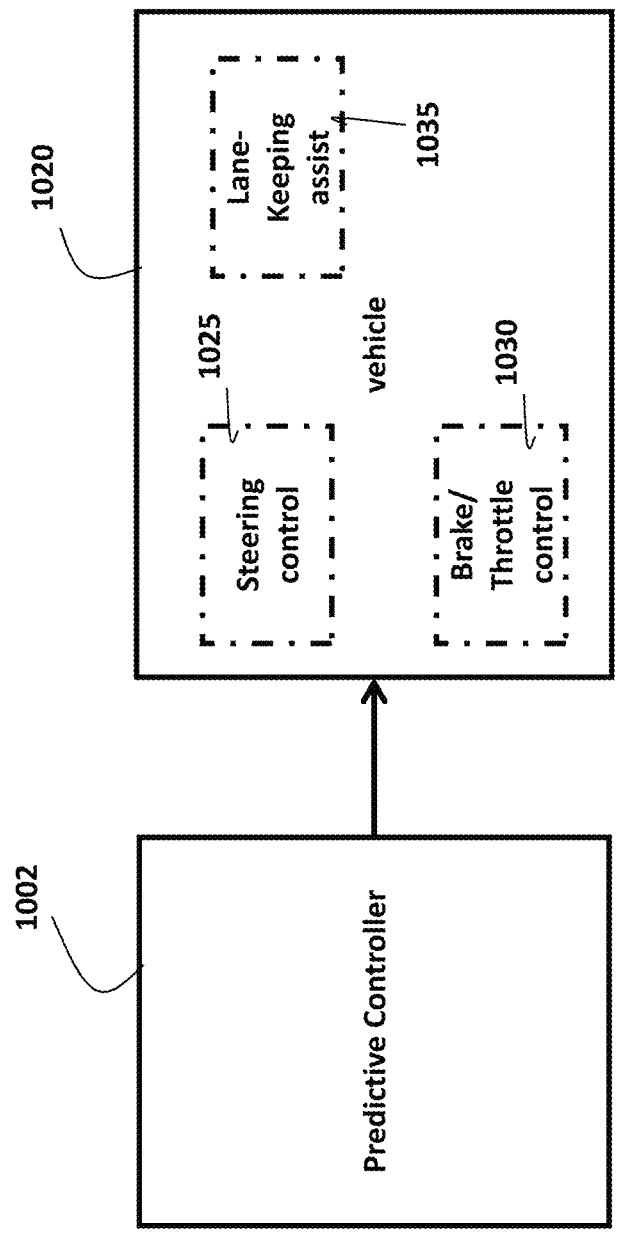
FIG. 10B shows a schematic of interaction between the predictive controller and the controller of the vehicle according to some embodiments.

FIG. 10B shows a schematic of interaction between the predictive controller 1002 and the controller 1020 of the vehicle 1001 according to some embodiments. For example, in some embodiments, the controllers 1020 of the vehicle 1001 are steering 1025 and brake/throttle controllers 1030 that control rotation and acceleration of the vehicle 1020. In such a case, the predictive controller 1002 outputs control inputs to the controllers 1025 and 1030 to control the state of the vehicle. The controller 1020 can also include high-level controllers, e.g., a lane-keeping assist controller 1035 that further processes the control inputs of the predictive controller 1002. In both cases, the controllers 1020 maps use the outputs of the predictive controller 1002 to control at least one actuator of the vehicle, such as the steering wheel and/or the brakes of the vehicle, in order to control the motion of the vehicle.

Figure 10C:
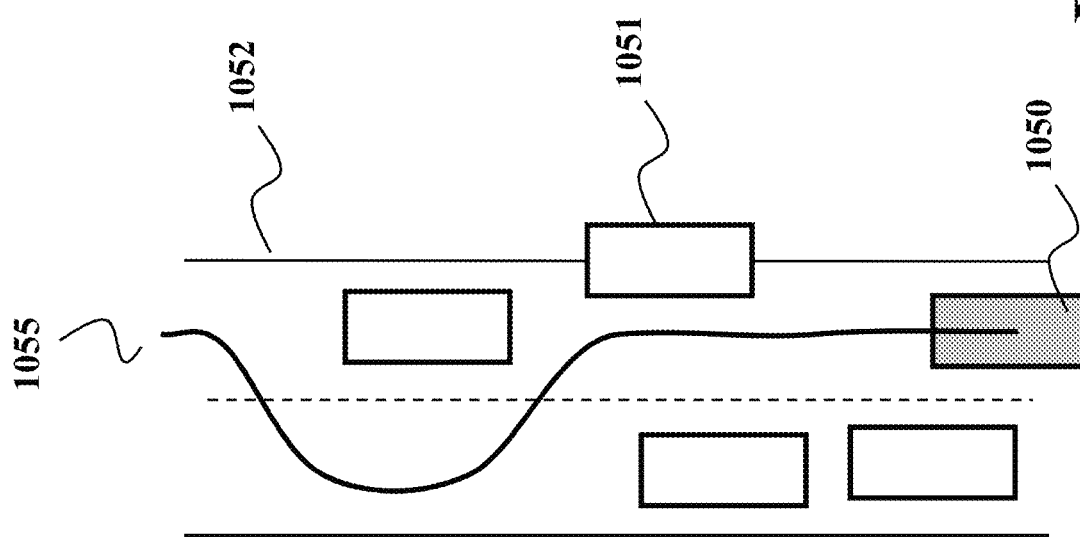
FIG. 10C shows a schematic of an autonomous or semi-autonomous controlled vehicle for which a dynamically feasible, and often optimal trajectory can be computed by using some embodiments.

FIG. 10C shows a schematic of an autonomous or semi-autonomous controlled vehicle 1050 for which a dynamically feasible, and often optimal trajectory 1055 can be computed by using some embodiments. The generated trajectory aims to keep the vehicle within particular road bounds 1052, and aims to avoid other uncontrolled vehicles, i.e., obstacles 1051 for the controlled vehicle 1050. In some embodiments, each of the obstacles 1051 can be represented by one or multiple inequality constraints in a time or space formulation of the mixed-integer optimal control problem, including one or multiple additional discrete variables for each of the obstacles. For example, based on embodiments configured to implement a mixed-integer model predictive controller, the autonomous or semi-autonomous controlled vehicle 1050 can make discrete decisions in real time such as, e.g., pass another vehicle on the left or on the right side or instead to stay behind another vehicle within the current lane of the road 1052. Embodiments of the invention are based on an SNMPC controller that directly takes into account the uncertainty about the current state and the predicted state of the vehicle 1050, the uncertainty about the parameters in the vehicle model as well as the uncertainty about the current and predicted state of the environment, e.g., including the obstacles 1051 that are within a certain distance from the current position of the autonomous or semi-autonomous controlled vehicle 1050.

Figure 10D:
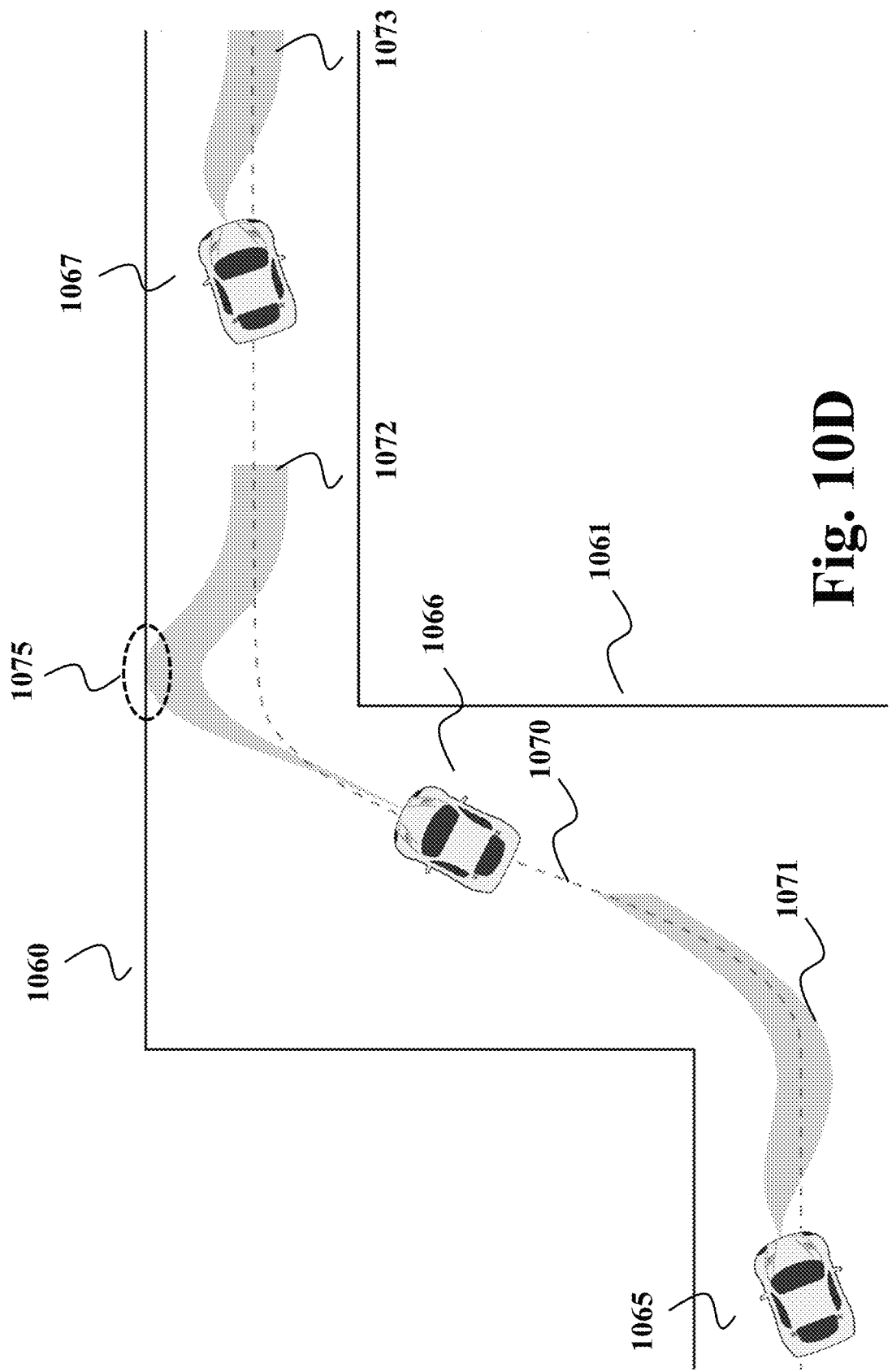
FIG. 10D shows a schematic of a vehicle that is controlled by an SNMPC controller that aims to track a dynamically feasible and optimal trajectory using embodiments of this invention.

FIG. 10D shows a schematic of a vehicle 1065 that is controlled by an SNMPC controller that aims to track a dynamically feasible and optimal trajectory 1070 of a sharp lane change maneuver within the upper 1060 and lower 1061 road bounds by using embodiments of this invention. FIG. 10D shows the vehicle position 1065, including the propagation of uncertainty for the predicted state trajectories by the SNMPC controller 1071, at a first time point, the vehicle position 1066 and corresponding propagation of predicted state uncertainty 1072 at a second time point, and the vehicle position 1067 and corresponding propagation of predicted state uncertainty 1073 at a third time point. The use of the stochastic predictive controller with probabilistic chance constraints, according to some embodiments of the invention, allows the probability of the controlled vehicle to violate the road bound constraints 1060 and/or 1061 to be below a certain probability threshold value. More specifically, for example, FIG. 10D shows that the stochastic tube of predicted state trajectories 1072 at the second time point reaches 1075 the upper road bound constraint 1060, illustrating the behavior of the stochastic predictive controller that aims to satisfy both deterministic constraints and probabilistic chance constraints for the controlled system under uncertainty.

Examples of the uncertainty for the system and its environment can include any time-varying parameters related to the friction behavior between the tires of the vehicle and the road surface, e.g., the parameters in a Pacejka tire-force model that can be learned online while controlling the vehicle. The estimated function of the parameter as well as the estimated uncertainty can be defined as time-varying and uncertain disturbance variables in the direct optimal control problem formulation of the stochastic nonlinear model predictive controller, according to embodiments of the invention. In some embodiments, the estimated parameter is the friction of a tire with a surface of a road traveled by the vehicle described by a non-linear friction function having a structural constraint of being asymmetric, such that the basis functions are selected to be only odd functions.

In some embodiments, to control the vehicle, the control inputs include commands specifying values of one or combination of a steering angle of the wheels of the vehicle and a rotational velocity of the wheels, and the measurements include values of one or combination of a rotation rate of the vehicle and an acceleration of the vehicle. Each state of the vehicle includes a velocity and a heading rate of the vehicle, such that the motion model relates the value of the control inputs to a first value of the state of the vehicle through dynamics of the vehicle at consecutive time steps, and the measurement model relates the value of the measurement to a second value of the state of the vehicle at the same time step.

FIG. 10E shows multiple vehicles driving simultaneously on the road in a road network. For example, the vehicles can be controlled to maximize a throughput, or traffic flow 1090, on the road. For example, in one embodiment the traffic flow is estimated by a set of weighted basis functions, wherein the estimated traffic flow on the road network is used to suggest routes for certain vehicles that can increase the estimated traffic flow on the road network.

Figure 11:
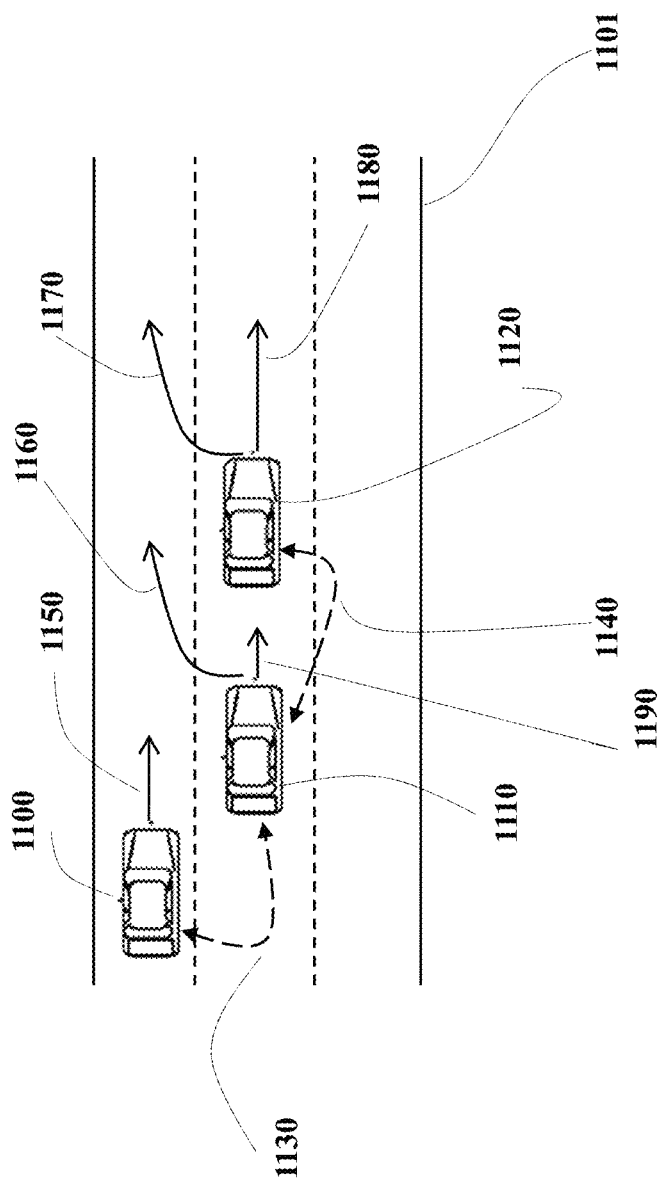

FIG. 11 shows an example of vehicles driving on a road network according to some embodiments.

In this example, multiple vehicles 1100, 1110, 1120, are moving on a given road 1101. Each vehicle can make many motions. For example, the vehicles can stay on the same path 1150, 1190, 1180, or can change paths (or lanes) 1160, 1170. Each vehicle has its own sensing capabilities, e.g., Lidars, cameras, etc. Each vehicle has the possibility to transmit and receive 1130, 1140 information with its neighboring vehicles and/or can exchange information indirectly through other vehicles via a remote server. For example, the vehicles 1100 and 1180 can exchange information through a vehicle 1110. With this type of communication network, the information can be transmitted over a large portion of the road 1101. In addition, traffic information, such as red lights, can be transmitted and received.

Some embodiments are based on the recognition that for certain types of roads, there it is equally likely that the numbers of vehicles driving in a particular direction on the road, is similar to the number of vehicles driving in the opposite direction on the road, implying an antisymmetric structural constraint. Other embodiments are based on the understanding that when there is a red light or a stop sign on the road, it implies a boundary condition, i.e., the flow at the boundary of that road segment is zero.

Figure 12A:
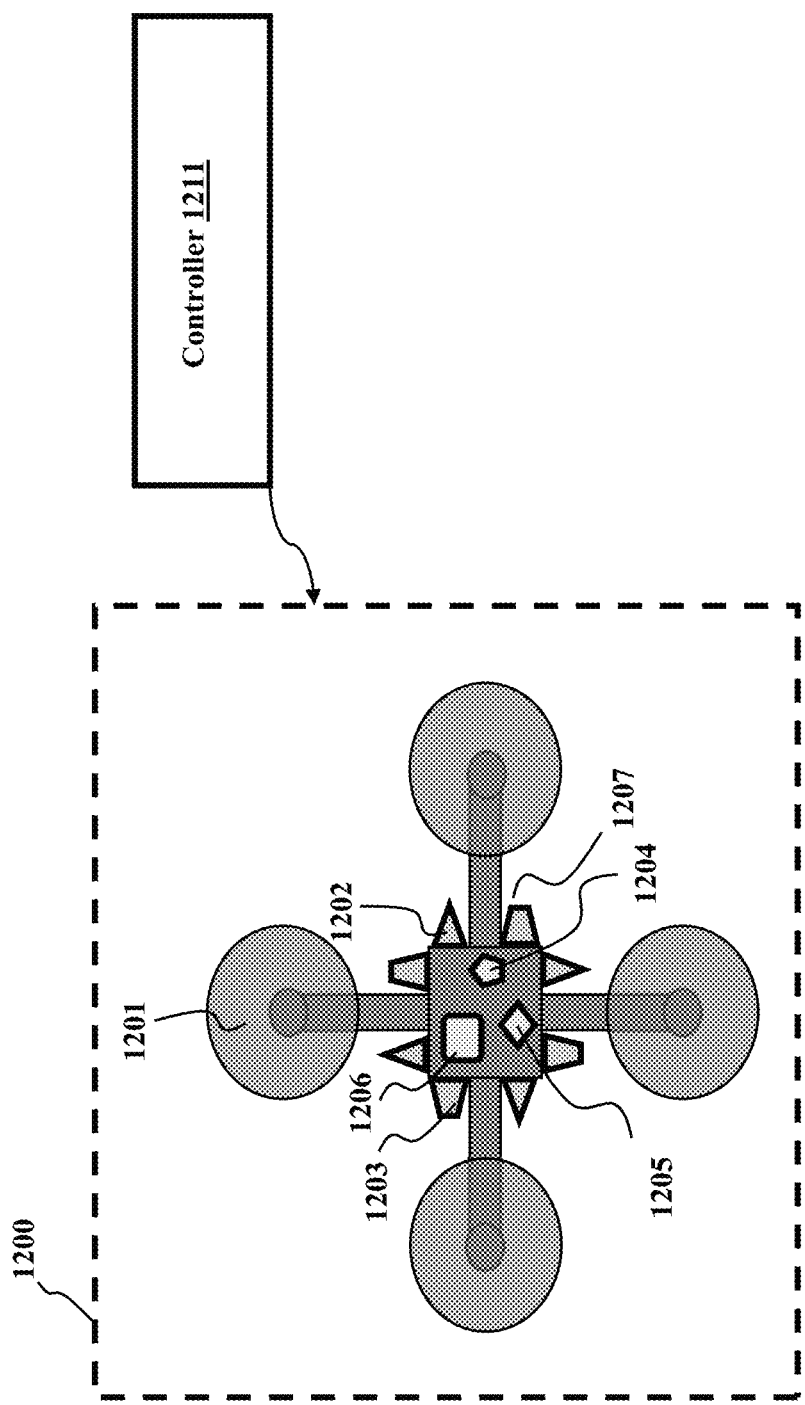
FIG. 12A illustrates a schematic of a controller for controlling a drone according to some embodiments.

FIG. 12A illustrates a schematic of a controller 1211 for controlling a drone 1200 according to some embodiments. In FIG. 12A, a schematic of a quadcopter drone, as an example of the drone 1200 in the embodiments of the present disclosure is shown. The drone 1200 includes actuators that cause motion of the drone 1200, and sensors for perceiving the environment and location of the device 1200. The rotor 1201 may be the actuator, the sensor perceiving the environment may include light detection and ranging 1202 (LIDAR) and cameras 1203. Further, sensors for localization may include GPS 1204. Such sensors may be integrated with an inertial measurement unit (IMU) that can measure the acceleration, rotation rate, and magnetic field. The drone 1200 also includes a communication transceiver 1205, for transmitting and receiving information, and a control unit 1206 for processing data obtained from the sensors and transceiver 1205, for computing commands to the actuators 1401, and for computing data transmitted via the transceiver 1205. In addition, it may include an estimator 1207 tracking the state of the drone.

Further, based on the information transmitted by the drone 1200, a controller 1211 is configured to control motion of the drone 1200 by computing a motion plan for the drone 1200. The motion plan for the drone 1200 may comprise one or more trajectories to be traveled by the drone. In some embodiments, there are one or multiple devices (drones such as the drone 2400) whose motions are coordinated and controlled by the controller 1211. Controlling and coordinating the motion of one or multiple devices corresponds to solving a mixed-integer optimization problem.

In different embodiments, controller 1211 obtains parameters of the task from the drone 1200 and/or remote server (not shown). The parameters of the task include the state of the drone 1200, but may include more information. In some embodiments, the parameters may include one or a combination of an initial position of the drone 1200, a target position of the drone 1200, a geometrical configuration of one or multiple stationary obstacles defining at least a part of the constraint, geometrical configuration, and motion of moving obstacles defining at least a part of the constraint. The parameters are submitted to a motion planner to obtain an estimated motion trajectory for performing the task, where the motion planner is configured to output the estimated motion trajectory for performing the task.

Figure 12B:
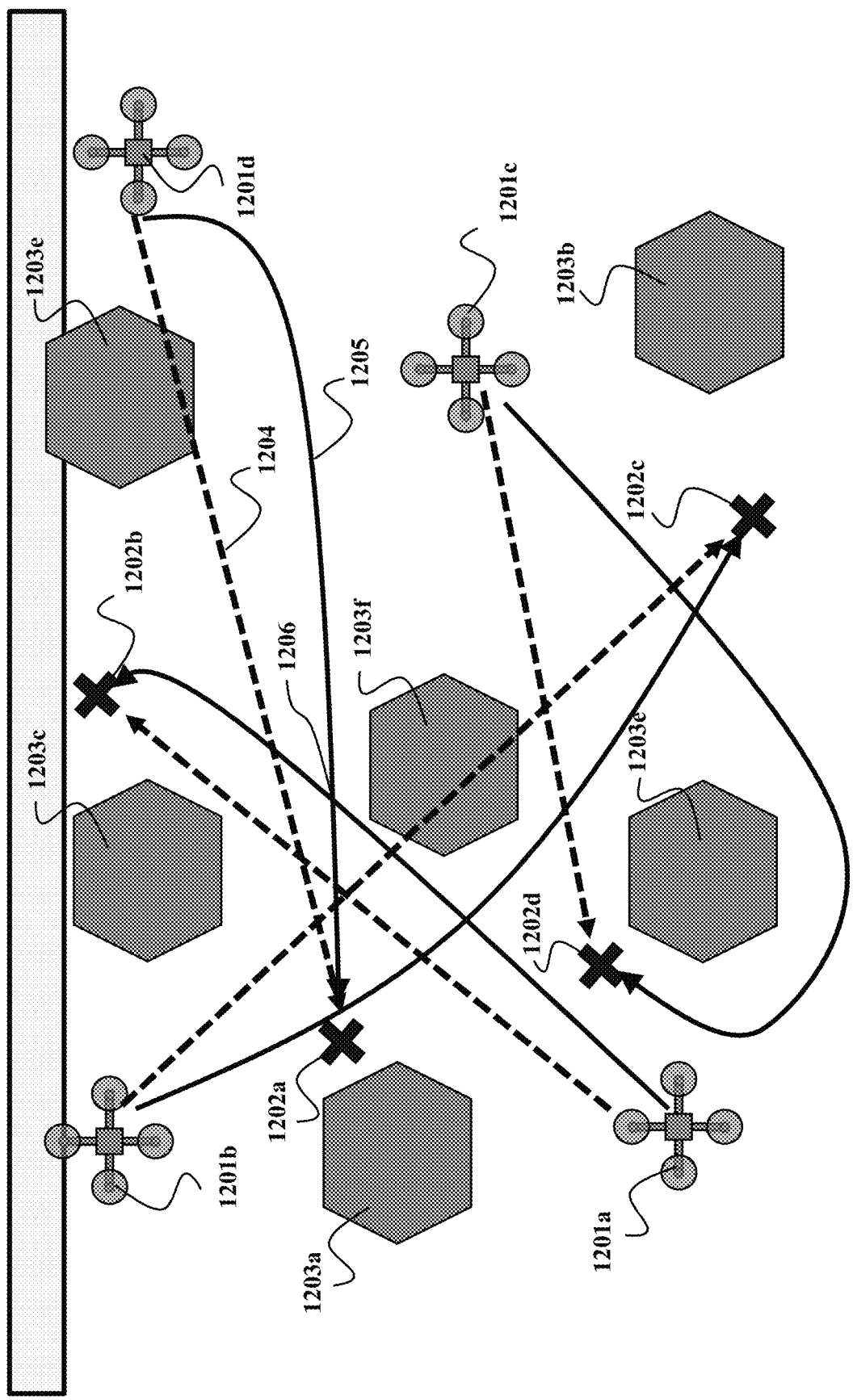
FIG. 12B illustrates a multi-device motion planning problem according to some embodiments of the present disclosure.

FIG. 12B illustrates a multi-device motion planning problem according to some embodiments of the present disclosure. In FIG. 12B, there is shown multiple devices (such as a drone 1201b, a drone 1201a, a drone 1201c, and a drone 1201d) that are required to reach their assigned final positions 1202c, 1202b, 1202b, and 1202d. There is further shown an obstacle 1203a, an obstacle 1203b, an obstacle 1203c, an obstacle 1203d, an obstacle 1203e, and an obstacle 1403f in the surrounding environment of the drones 1201a-1201d. The drones 1201a-1201d are required to reach their assigned final positions 1202a-1202d while avoiding the obstacles 1203a-1203f in the surrounding environment. Simple trajectories (such as a trajectory 1204 as shown in FIG. 142) may cause collisions. Accordingly, embodiments of the present disclosure compute trajectories 1205 that avoid obstacles 1203a-1203f and avoid collision between drones 1201a-1201d, which can be accomplished by avoiding overlaps of the trajectories, or by ensuring that if multiple trajectories overlap 1206, the corresponding drones reach the overlapping points at time instants in a future planning time horizon that are sufficiently separated.

The drones need to navigate indoors using various sensing information. Some embodiments are based on that indoor environments cause anomalies in the magnetic field, which can be used to navigate indoors. Other embodiments recognize that positioning using the magnetic field does not require additional infrastructure other than an IMU, and line of sight, such as when using radar/lidar, is not needed.

Some embodiments utilize that the magnetic field is curl free, which means $\nabla \times H = 0$ for a magnetic field H. Some embodiments are based on the understanding that the curl-free constraint is a linear operator constraint $\mathcal{F}f=0$ for an operator $\mathcal{F}$ and function $f$. For instance, referring to FIG. 7A, some embodiments select 710a the nominal functions 715a as sine functions and the determined 720a operator 725a is $$\mathcal{F} = \begin{bmatrix} 0 & -\frac{\partial}{\partial x_3} & \frac{\partial}{\partial x_2} \\ \frac{\partial}{\partial x_3} & 0 & -\frac{\partial}{\partial x_1} \\ -\frac{\partial}{\partial x_2} & \frac{\partial}{\partial x_1} & 0 \end{bmatrix},$$

resulting in a combination of sine and cosine functions when $f$ is a nominal sine basis function.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

The invention claimed is:

1. A probabilistic feedback controller for controlling an operation of a robotic system using a probabilistic filter subject to a structural constraint on an operation of the robotic system, comprising: at least one processor; and a memory having instructions stored thereon that, when executed by the at least one processor, cause the controller to:

collect digital representations of a sequence of measurements of a state of a robotic system at different instances of time indicative of a structural constraint on a shape of a function of a parameter affecting the operation of the robotic system;

execute a probabilistic filter configured to recursively estimate a distribution of a current state of the robotic system given a previous state of the robotic system based on a motion model of the robotic system perturbed by stochastic process noise and a measurement model of the robotic system perturbed by stochastic measurement noise, wherein one or a combination of the motion model, the process noise, the measurement model, and the measurement noise includes the parameter having an uncertainty modeled as a time-varying Gaussian process represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions, wherein the probabilistic filter recursively updates both the distribution of the current state of the robotic system and the Gaussian distributions of the weights of the basis functions, and wherein each of the basis function is selected to satisfy the structural constraint indicated by the sequence of measurements of the state of a robotic system; and execute a control action determined based on an estimate of the distribution of the current state of the robotic system to change the current state of the robotic system according to a control objective.

2. The probabilistic feedback controller of claim 1, wherein each measurement in the sequence of measurements of the state of the robotic system relates to a value of the parameter through one or a combination of the motion model and the measurement model, such that the sequence of measurements of the state of the robotic system relates to a sequence of values of the parameters statistically conserving the structural constraint on the shape of the function of the parameter.

3. The probabilistic feedback controller of claim 2, wherein smoothed representation of data fitted into the sequence of values of the parameters includes a function having a shape conserving the structural constraint.

4. The probabilistic feedback controller of claim 2, wherein statistical properties of the sequence of values of the parameters relies on the structural constraint.

5. The probabilistic feedback controller of claim 2, wherein imposing the structural constraint of the shape of the function of the parameter reduces a difference between the state of the robotic system predicted using the motion model having the parameter and the measured state of the robotic system.

6. The probabilistic feedback controller of claim 1, wherein the structural constraint is determined offline based on experimental or simulation data of the operation of the robotic system, such that the basis functions are selected offline in response to determining the structural constraint.

7. The probabilistic feedback controller of claim 1, wherein the structural constraint is determined online during the control of the robotic system, such that the basis functions are selected during the operation of the robotic system in response to determining the structural constraint.

8. The probabilistic feedback controller of claim 7, wherein to select the basis functions, the processor is configured to
actuate the robotic system using a range of control inputs to collect training measurements of the state of the robotic system;
estimate the state of the robotic system caused by the actuation with the range of control inputs using different probabilistic filters with different structural constraints on the shape of the function of the parameter affecting the operation of the robotic system;
select the structural constraint from the probabilistic filter that estimates the training measurements best according to a cost function; and
select the basis functions conforming to the selected structural constraint.

9. The probabilistic feedback controller of claim 7, wherein to select the basis functions, the processor is configured to
actuate the robotic system using a range of control inputs to collect training measurements of the state of the robotic system;
estimate the state of the robotic system caused by the actuation with the range of control inputs using a probabilistic filter without a nominal function of the parameter;
determine a pattern of distribution of data points of differences between the training measurements and corresponding estimation of the state of the robotic system;
transform the pattern into the structural constraint.

10. The probabilistic feedback controller of claim 9, wherein the pattern is represented as a system of equations dependent on the parameter, such that the basis functions enabling a solution of the system of equations satisfy the structural constraint.

11. The probabilistic feedback controller of claim 1, wherein the probabilistic filter is a Kalman filter with the motion model including the parameter inserted into the Kalman filter allowing the probabilistic filter to perform a dual update of the state of the robotic system and the time-varying Gaussian process.

12. The probabilistic feedback controller of claim 1, wherein the probabilistic filter is a particle filter with the motion model including the parameter associated with each particle filter allowing the probabilistic filter to perform a dual update of the state of the robotic system and the time-varying Gaussian process.

13. The probabilistic feedback controller of claim 1, wherein to satisfy the structural constraint each of the basis functions is selected to be an odd function.

14. The probabilistic feedback controller of claim 1, wherein to satisfy the structural constraint each of the basis functions is selected to be an even function.

15. The probabilistic feedback controller of claim 1, wherein the robotic system includes a vehicle traveling on a road having an uncertain road-surface condition modeled as the time-varying Gaussian process represented by a weighted combination of odd basis functions.

16. The probabilistic feedback controller of claim 15, wherein the function of the parameter is a friction function, and the shape of the friction function is asymmetric.

17. The probabilistic feedback controller of claim 1, wherein the robotic system includes multiple vehicles forming an uncertain traffic flow modeled as the time-varying Gaussian process across different segments, wherein each segment is represented by a weighted combination of odd or even basis functions.

18. The probabilistic feedback controller of claim 1, wherein the robotic system includes a set of drones controlled by a magnetic field represented by a nonlinear function having a structural constraint of being curl-free, such that the basis functions are selected as a combination of sine and cosine basis functions.

19. A method for controlling an operation of a robotic system using a probabilistic filter subject to a structural constraint on an operation of the robotic system, wherein the method uses a processor coupled with stored instructions implementing the method, wherein the instructions, when executed by the processor carry out steps of the method, comprising:
collecting digital representations of a sequence of measurements of a state of a robotic system at different instances of time indicative of a structural constraint on a shape of a function of a parameter affecting the operation of the robotic system;
executing a probabilistic filter configured to recursively estimate a distribution of a current state of the robotic system given a previous state of the robotic system based on a motion model of the robotic system perturbed by stochastic process noise and a measurement model of the robotic system perturbed by stochastic measurement noise, wherein one or a combination of the motion model, the process noise, the measurement model, and the measurement noise includes the parameter having an uncertainty modeled as a time-varying Gaussian process represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions, wherein the probabilistic filter recursively updates both the distribution of the current state of the robotic system and the Gaussian distributions of the weights of the basis functions, and wherein each of the basis function is selected to satisfy the structural constraint indicated by the sequence of measurements of the state of a robotic system; and executing a control action determined based on an estimate of the distribution of the current state of the robotic system to change the current state of the robotic system according to a control objective.

20. A non-transitory computer readable storage medium embodied thereon a program executable by a processor for performing a method, the method comprising:

collecting digital representations of a sequence of measurements of a state of a robotic system at different instances of time indicative of a structural constraint on a shape of a function of a parameter affecting the operation of the robotic system;

executing a probabilistic filter configured to recursively estimate a distribution of a current state of the robotic system given a previous state of the robotic system based on a motion model of the robotic system perturbed by stochastic process noise and a measurement model of the robotic system perturbed by stochastic measurement noise, wherein one or a combination of the motion model, the process noise, the measurement model, and the measurement noise includes the parameter having an uncertainty modeled as a time-varying Gaussian process represented as a weighted combination of time-varying basis functions with weights defined by corresponding Gaussian distributions, such that a time-varying mean of the Gaussian process is a function of the basis functions modified with means of the corresponding Gaussian distributions, and a time-varying variance of the Gaussian process is a function of the basis function modified with variances of the corresponding Gaussian distributions, wherein the probabilistic filter recursively updates both the distribution of the current state of the robotic system and the Gaussian distributions of the weights of the basis functions, and wherein each of the basis function is selected to satisfy the structural constraint indicated by the sequence of measurements of the state of a robotic system; and executing a control action determined based on an estimate of the distribution of the current state of the robotic system to change the current state of the robotic system according to a control objective.

\* \* \* \* \*